(12) United States Patent
Arai et al.

(10) Patent No.: US 6,820,446 B2
(45) Date of Patent: Nov. 23, 2004

(54) SEWAGE DISPOSAL AGENT, SEWAGE PURIFIER, WASHING MACHINE WITH PURIFIER, AND SEWAGE PURIFYING METHOD

(75) Inventors: Nobushige Arai, Osaka (JP); Hirofumi Yoshikawa, Osaka (JP); Shinya Takagi, Osaka (JP); Ichiro Ohshima, Osaka (JP); Rie Hiramoto, Osaka (JP); Mugihei Ikemizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 282 days.

(21) Appl. No.: 10/031,084

(22) PCT Filed: May 28, 2001

(86) PCT No.: PCT/JP01/04471

§ 371 (c)(1),
(2), (4) Date: Jan. 16, 2002

(87) PCT Pub. No.: WO01/91879

PCT Pub. Date: Dec. 6, 2001

(65) Prior Publication Data

US 2002/0121484 A1 Sep. 5, 2002

(30) Foreign Application Priority Data

| May 29, 2000 | (JP) | 2000-157849 |
| Jun. 8, 2000 | (JP) | 2000-172317 |
| Sep. 5, 2000 | (JP) | 2000-267899 |
| Oct. 25, 2000 | (JP) | 2000-325146 |
| Nov. 7, 2000 | (JP) | 2000-338464 |
| Dec. 6, 2000 | (JP) | 2000-371198 |
| Jan. 11, 2001 | (JP) | 2001-3596 |
| Feb. 2, 2001 | (JP) | 2001-26808 |

(51) Int. Cl.$^7$ .................................. D06B 23/20

(52) U.S. Cl. ........................ 68/13 R; 68/18 R; 68/207; 68/902; 210/206

(58) Field of Search .................... 68/12.01, 12.12, 68/12.13, 12.18, 13 R, 18 R, 207, 902; 210/709, 143, 199, 206

(56) References Cited

U.S. PATENT DOCUMENTS

| 3,841,116 A | * | 10/1974 | Klein et al. ............... 68/12.13 |
| 3,871,820 A | * | 3/1975 | Stewart et al. ............... 8/139 |
| 4,005,009 A | | 1/1977 | Kinoshita et al. |
| 4,108,768 A | * | 8/1978 | Sebelik et al. ............. 210/705 |
| 4,198,294 A | * | 4/1980 | Deane ....................... 210/650 |
| 4,293,416 A | * | 10/1981 | Keoteklian ................. 210/208 |
| 4,610,792 A | * | 9/1986 | Van Gils et al. ........... 210/639 |
| 5,055,184 A | * | 10/1991 | Carpenter et al. ......... 210/109 |
| 5,531,865 A | * | 7/1996 | Cole ......................... 205/751 |
| 5,531,905 A | * | 7/1996 | Dobrez et al. ............. 210/709 |
| 5,647,977 A | * | 7/1997 | Arnaud ..................... 210/167 |
| 6,159,376 A | * | 12/2000 | Lahti ........................ 210/665 |
| 6,306,303 B1 | * | 10/2001 | Goebel et al. ............. 210/622 |
| 6,458,268 B1 | * | 10/2002 | Grandprey et al. ........ 210/96.1 |

FOREIGN PATENT DOCUMENTS

| DE | 33 44 275 | * | 12/1983 |
| DE | 34 10 747 | * | 9/1985 |
| GB | 234346 | * | 5/2000 |

(List continued on next page.)

*Primary Examiner*—Frankie L. Stinson
(74) *Attorney, Agent, or Firm*—Birch, Stewart, Kolasch & Birch, LLP

(57) ABSTRACT

A polluted water purifier for collecting a pollutant present in polluted water by flocculating the pollutant with a flocculant has a mixer 5 for mixing the polluted water with the flocculant F and air, an agitator 18 for agitating the polluted water, containing the flocculant F and the air, that flows into a cylindrical agitation chamber 6 along the inner surface thereof by making the polluted water into a spiraling stream so that the flocks formed by the flocculant F hold bubbles, and a separator 10 and 19, connected to the agitator 18, for temporarily storing the polluted water and for separating the flocks holding the bubbles.

43 Claims, 31 Drawing Sheets

FOREIGN PATENT DOCUMENTS

| | | |
|---|---|---|
| JP | 49-49468 A | 5/1974 |
| JP | 50-122055 A | 9/1975 |
| JP | 51-119160 A | 10/1976 |
| JP | 53-42278 A | 4/1978 |
| JP | 54-139264 A | 10/1979 |
| JP | 55-18286 A | 2/1980 |
| JP | 5-921198 * | 4/1993 |
| JP | 7-241592 * | 9/1995 |
| JP | 07-299469 A | 11/1995 |
| JP | 9-141016 A | 6/1997 |
| JP | 11-70302 A | 3/1999 |
| JP | 11-216483 A | 8/1999 |
| JP | 2000-84291 | 3/2000 |
| JP | 2001-104997 * | 4/2001 |

* cited by examiner

| | SURFACTANT CONCENTRATION IN WATER DISCHARGED IN FINAL DEWATERING(ppm) | TURBIDITY (NTU) |
|---|---|---|
| CONVENTIONAL RINSING | 35 | 10.2 |
| PURIFIED-WATER RINSING | 20 | 1.5 |

FIG. 33

| FLOCCULANT WATER SOLUTION | FLOCCULANT | BASICITY | CONCENTRATION (ON AN Al$_2$O$_3$ BASIS) |
|---|---|---|---|
| TAKIBINE#1500 | PAC | 83 | 23.2% |
| TAKIBINE#100 | AlCl$_3$ | 0 | 11.5% |

FIG. 34

| | FLOCCULANT WATER SOLUTION | PAC:AlCl$_3$ (RATIO BY WEIGHT ON AN Al$_2$O$_3$ BASIS) | AMOUNT NEEDED (ON AN Al$_2$O$_3$ BASIS) | COLD WATER |
|---|---|---|---|---|
| COMPARATIVE EXAMPLE 1 | RE-1 | 1:0 | 230mg/L | ○ |
| PRACTICAL EXAMPLE 1 | SA-1 | 6:1 | 216mg/L | ○ |
| PRACTICAL EXAMPLE 2 | SA-2 | 2:1 | 202mg/L | ○ |
| PRACTICAL EXAMPLE 3 | SA-3 | 2:3 | 90mg/L | ○ |
| COMPARATIVE EXAMPLE 2 | RE-2 | 0:1 | 60mg/L | × |

FIG. 35

| PAC ADDED (mL/L) | HCl ADDED (mL/L) | WASTEWATER pH | SURFACTANT REMOVAL RATE (%) |
|---|---|---|---|
| 1.75 | 0 | 5.5 | 96.0 |
| 1.75 | 0.25 | 4.3 | 97.6 |
| 1.75 | 0.5 | 3.6 | 97.9 |

SEWAGE DISPOSAL AGENT, SEWAGE PURIFIER, WASHING MACHINE WITH PURIFIER, AND SEWAGE PURIFYING METHOD

This application is the national phase under 35 U.S.C. §371 of PCT International Application No. PCT/JP01/04471 which has an International filing date of May 28, 2001, which designated the United States of America.

TECHNICAL FIELD

The present invention relates to a wastewater treatment agent for flocculating the pollutants contained in polluted water. The present invention relates also to a polluted water purifier and a polluted water purifying method for flocculating and thereby removing the pollutants contained in polluted water. The present invention relates also to a washing machine with a purifier which permits washing using washing wastewater after removing the pollutants contained therein.

BACKGROUND ART

Conventionally, polluted water such as wastewater from a washing machine is drained without any treatment. Synthetic detergent contains, as its main ingredient, an anion surfactant (surface-active agent) such as linear sodium alkylbenzenesulfonate (LAS) or an alkylsulfuric ester, which is relatively poorly biodegradable and thus contributes more to water pollution in rivers than soap.

Today, the washing wastewater drained from households is considered to contribute most to water pollution. For this reason, from the viewpoint of protecting the environment, it is desirable to reduce the concentration of pollutants such as a surfactant contained in washing wastewater and purify it before draining it.

To cope with this, for example, Japanese Patent Application Laid-Open No. H9-182896 discloses a washing machine in which a divalent metal chloride is added to washing wastewater so that a surfactant precipitates as a result of salting-out and then the washing wastewater is filtered to remove the precipitate. In this washing machine, as the washing wastewater used in washing is circulated, a flocculant such as calcium chloride is added thereto. The flocculant causes the dirt and detergent contained in the washing wastewater to flocculate and form flocks, and, as the washing wastewater is circulated, it is filtered to remove the flocks and is thereby purified. The washing wastewater thus purified is then used as rinsing water in a rinsing process.

On the other hand, Japanese Patent Application Laid-Open No. H10-118390 discloses a washing machine in which the pollutants such as a surfactant contained in washing wastewater is removed by being made to flocculate and precipitate by electrolysis In this washing machine, a treatment bath having a positive and a negative electrode is provided in the middle of the drainage path of washing wastewater. The washing wastewater is electrolyzed in the treatment bath, and metal cations are produced therein, which cause the dirt and detergent to flocculate and precipitate as flocks. The flocks are then removed, so that purified washing wastewater is drained from the treatment bath.

However, according to the method disclosed in Japanese Patent Application Laid-Open No. H9-182896 mentioned above, since the washing wastewater is purified as it is circulated, the flocculant dissolved in it flows into the washing tub. This causes the dirt and detergent to flocculate and form flocks inside the washing tub. These flocks adhere back to the laundry and are difficult to remove.

Where washing wastewater is cold, aluminum chloride ($AlCl_3$) is widely used as a flocculant. Since $AlCl_3$ is an inorganic flocculant with a relatively low molecular weight, whereas it effectively makes small molecules of a surfactant precipitate as flocks, the flocks thus produced tend to be extremely fine particles.

To filter out and remove such fine particles, it is necessary to use a filter with fine pores, which is prone to be clogged. Thus, to prevent a significant drop in the volume of water treated resulting from an increased loss in pressure, the filter needs to be maintained frequently as by replacement or reverse-flow cleaning.

This problem can be overcome by using a polymer flocculant with high basicity such as polyaluminum chloride (PAC). A polymer flocculant tends to make a surfactant in a solution precipitate as larger flocks, and thus excels $AlCl_3$ in flocculating/removing a surfactant.

However, chelates of PAC with high basicity have high molecular weights, and are thus ineffective against surfactant components having small molecules and dissolved in water. Thus, PAC needs to be added in large amounts, which tends to cause secondary pollution. Therefore, it is vital to reduce the amount of flocculant used without lowering washing performance.

Moreover, PAC exhibits poor solubility in water and poor preservation stability under cold conditions. It is therefore unsuitable for the treatment of washing wastewater in winter. Thus, a wastewater treatment agent is sought that permits pollutants composed of organic substances to flocculate for easy collection under cold conditions.

On the other hand, according to the method disclosed in Japanese Patent Application Laid-Open No. H10-118390 mentioned above, pollutants (a surfactant) are made to precipitate by electrolysis, and the resulting flocks are separated and removed. Therefore, when washing wastewater contains a surfactant in a high concentration, it takes a relatively long time to produce a precipitate, and the operation of the washing machine is thereby hindered.

Thus, to increase the volume of washing wastewater that can be treated so as to ensure smooth operation of the washing machine, it is necessary to secure an extra space where to store washing wastewater temporarily inside the body of the washing machine. This makes the washing machine larger, and makes it difficult to secure the space in which to install it. Moreover, it is difficult to exercise control so as to make pollutants and metal cations react in equivalent amounts, and thus it is impossible to flocculate dirt and detergent to a sufficient degree.

DISCLOSURE OF THE INVENTION

An object of the present invention is to provide an easy-to-maintain polluted water purifier that permits easy separation and removal of dirt and detergent flocks, and to provide a washing machine provided with such a polluted water purifier. Another object of the present invention is to provide a polluted water purifier and a polluted water purifying method that achieve a satisfactory purifying effect with a reduced amount of flocculant. Another object of the present invention is to provide a wastewater treatment agent that permits efficient removal of pollutants composed of organic substances from cold wastewater.

To achieve the above objects, according to the present invention, a wastewater treatment agent flocculates a surfactant component present in wastewater with a primary flocculant composed of a high-molecular-weight inorganic flocculant or a mixture of a high-molecular-weight inorganic flocculant and a low-molecular-weight inorganic flocculant and makes the resulting flocks grow larger with a secondary flocculant composed of a high-molecular-weight organic flocculant.

According to the present invention, a polluted water purifier for collecting a pollutant present in polluted water by flocculating the pollutant with a flocculant, or a washing machine incorporating such a purifier, is provided with: a mixer for mixing the polluted water with the flocculant and air; an agitator for agitating the polluted water, containing the flocculant and the air, that flows into a cylindrical agitation chamber along the inner surface thereof by making the polluted water into a spiraling stream so that the flocks formed by the flocculant hold bubbles; and a separator, connected to the agitator, for temporarily storing the polluted water and for separating the flocks holding the bubbles.

According to the present invention, a polluted water purifier for collecting a pollutant present in polluted water by flocculating the pollutant with a flocculant, or a washing machine incorporating such a purifier, is provided with: a polluted water thank for storing the polluted water, a first mixer for mxiing the polluted water a primary flocculant to produce primary flocks; a second mixer for mixing the polluted water containing the primary flocks with a secondary flocculant and air to produce secondary flocks; an agitator for agitating the polluted water containing the flocculant and the air so as to make the secondary flocks grow larger; and a separator for separating the secondary flocks thus grown. Here, the polluted water tank, the first mixer, the second mixer, the agitator, separator are coupled in this order to form a circulation path that leads back to the polluted water tank.

According to the present invention, a polluted water purifier for collecting a pollutant present in polluted water by flocculating the pollutant with a flocculant, or a washing machine incorporating such a purifier, is provided with: an aspirator for sucking in the flocculant and air to mix the flocculant and the air with the polluted water and thereby produce flocks holding bubbles; and a separator for separating the flocks holding the bubbles from the polluted water.

According to the present invention, a polluted water purifier for collecting a pollutant present in polluted water by flocculating the pollutant with a flocculant, or a washing machine incorporating such a purifier, is provided with: a pH value controller for lowering the pH value of the polluted water by adding an acid to the polluted water.

According to the present invention, a washing machine incorporating a purifier is provided with a water tub having the shape of a bottomed cylinder and a polluted water purifier that collects a pollutant present in washing wastewater by flocculating the pollutant to produce flocks and then separating the flocks by filtering the flocks out with a separator. Here, the separator is fitted detachably to the water tub.

According to the present invention, a washing machine incorporating a purifier is provided with a water tub having the shape of a bottomed cylinder and a polluted water purifier that collects a pollutant present in washing wastewater by flocculating the pollutant to produce flocks and then separating the flocks by filtering the flocks out with a separator. Here, the separator is fitted detachably so as to cover the water tub from above an opening thereof According to the present invention, a washing machine incorporating a purifier is provided with a polluted water purifier for purifying polluted water drained from a washing tub by removing a pollutant present in the polluted water. Here, halfway through a washing process, washing water is circulated from the washing tub through the polluted water purifier back to the washing tub.

According to the present invention, a washing machine incorporating a purifier and provided with a washing process for removing dirt on laundry with washing water containing a detergent and a first rinsing process for removing the detergent from the laundry is provided with: a reservoir section for storing the drained washing water; and a polluted water purifier for purifying the washing water by collecting a pollutant present in the washing water stored in the reservoir section by flocculating the pollutant. Here, the washing water used in the washing process and rinsing water used in the first rinsing process is stored together in the reservoir section and is purified simultaneously by the polluted water purifier.

According to the present invention, a washing machine incorporating a purifier and provided with a washing process for removing dirt on laundry with washing water containing a detergent and a first rinsing process for removing the detergent from the laundry, is provided with: a reservoir section for storing the drained washing water; and a polluted water purifier for purifying the washing water by collecting a pollutant present in the washing water stored in the reservoir section by flocculating the pollutant. Here, the washing water used in the washing process is purified by the polluted water purifier and is then used in the first rinsing process, and then rising water used in the first rinsing process is purified by the polluted water purifier.

According to the present invention, a method of purifying polluted water by collecting a pollutant present in the polluted water by flocculating the pollutant with a flocculant includes a step of lowering the pH value of the polluted water by adding an acid to the polluted water.

BRIEF DESCRIPTION OF DRAWINGS

FIG. 33 is a table showing the characteristics of the flocculants used in purification experiments conducted with the invention.

FIG. 34 is a table showing the results of purification experiments conducted with flocculants embodying the invention.

FIG. 35 is a table showing the results of purification experiments conducted with an acid according to the invention.

BEST MODE FOR CARRYING OUT THE INVENTION

<First Embodiment>

Figure 1:
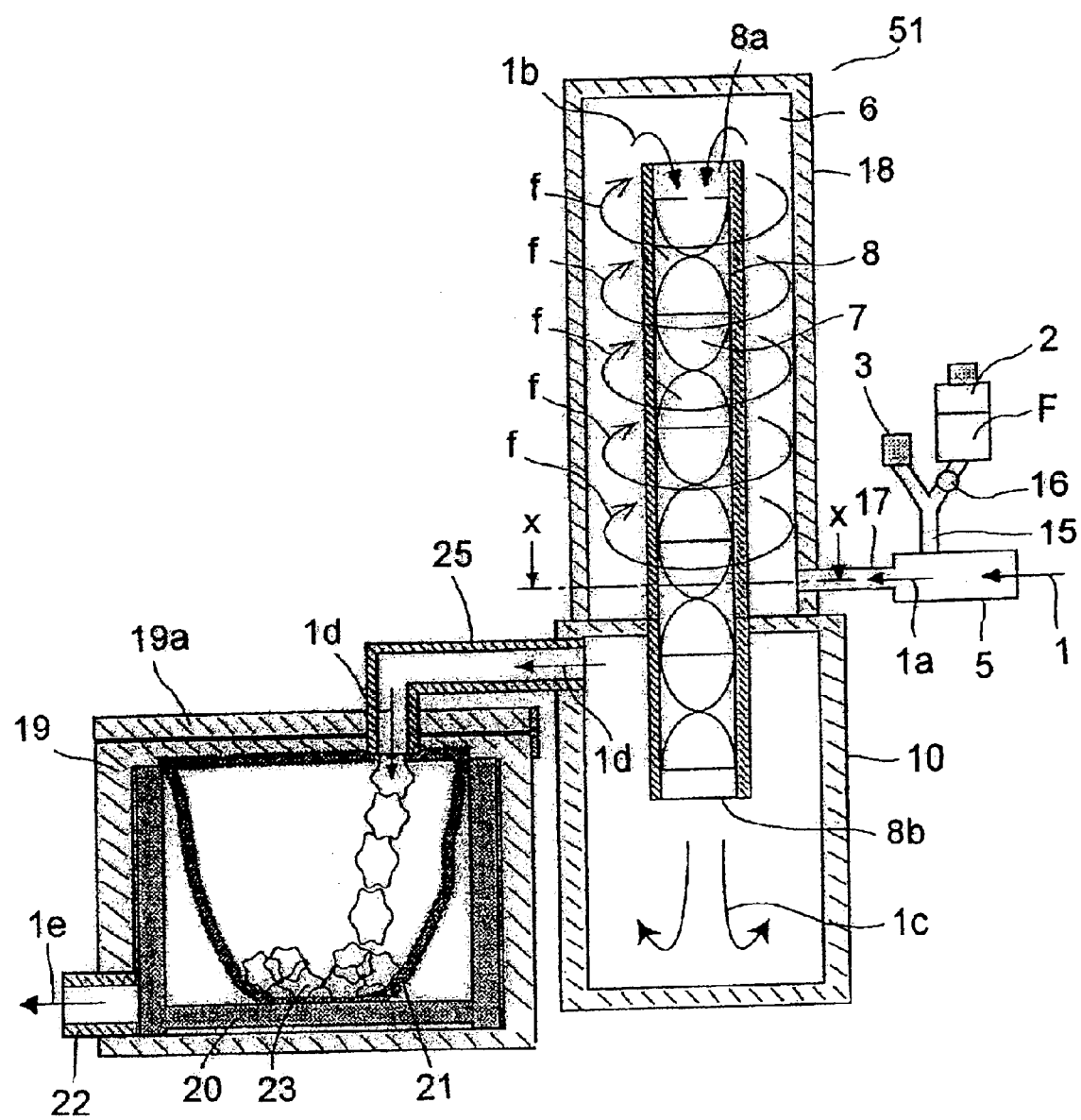
FIG. 1 is a sectional view showing the polluted water purifier of a first embodiment of the invention.

Hereinafter, embodiments of the present invention will be described with reference to the drawings. FIG. 1 shows the structure of the polluted water purifier of a first embodiment. The polluted water purifier 51 is composed of an aspirator 5, an agitation cylinder 18, a reservoir section 10, and a filtering section 19 coupled in series.

Figure 2:
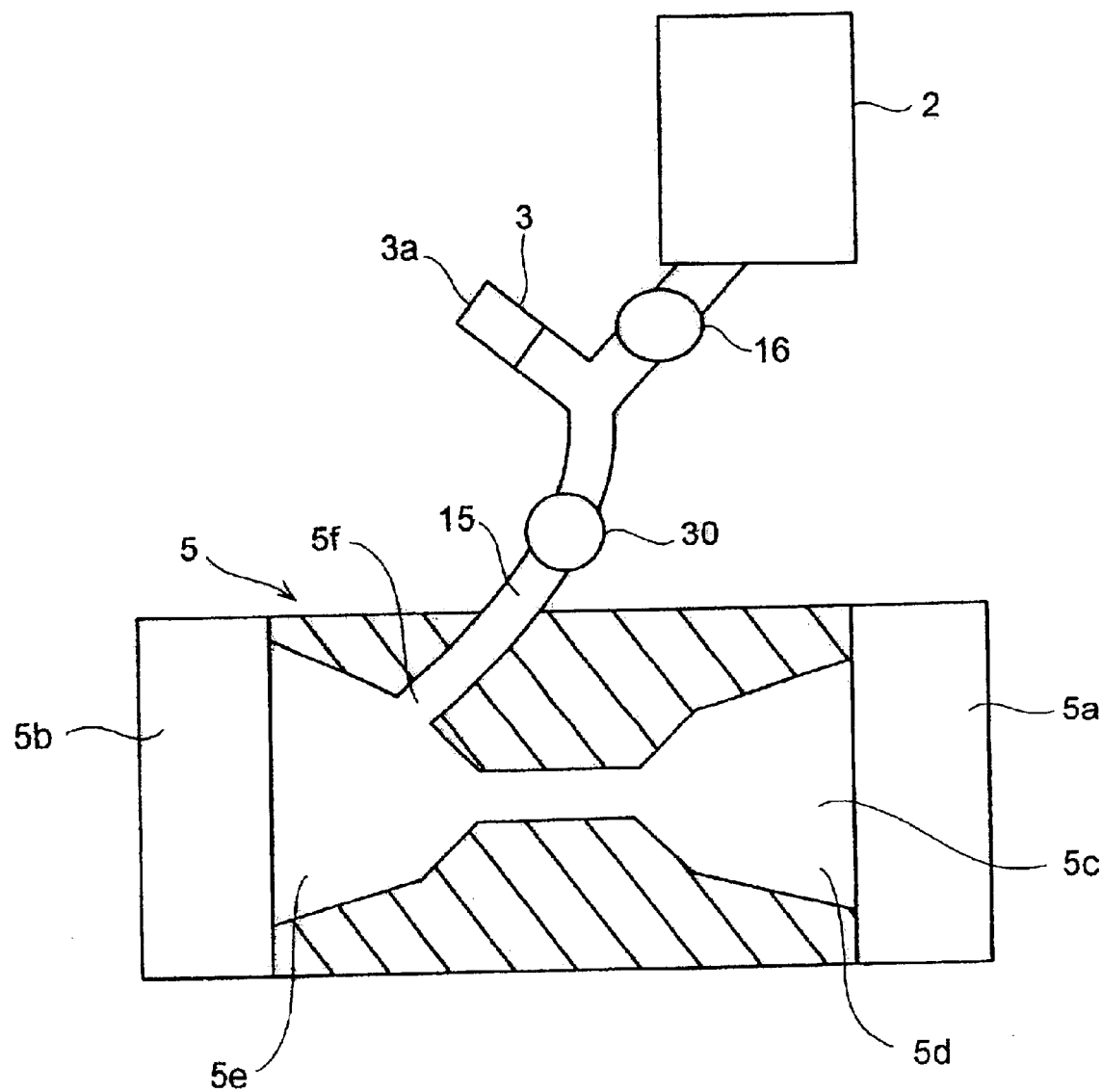
FIG. 2 is a sectional view showing the aspirator of the polluted water purifier of the first embodiment.

FIG. 2 is a sectional view showing the aspirator 5. Inside the aspirator 5 is formed a flow passage 5c, into which polluted water flows through an inlet 5a and out of which the polluted water flows through an outlet 5b. The flow passage 5c is formed as a Venturi tube having a narrowing portion 5d of which the cross section decreases in the direction in which the polluted water introduced through the inlet 5a flows and a widening portion 5e of which the cross section increases toward the outlet 5b. In the widening portion 5e is formed an opening that serves as a suction inlet 5f, and a suction pipe 15 that communicates with the suction inlet 5f is formed so as to penetrate the aspirator 5 and extend outward.

The other end of the suction pipe 15 is bifurcated into two branches. The end of one branch is connected through a flow control valve 16 to a flocculant tank 2 in which a flocculant F (see FIG. 1) is stored. In the other branch is arranged an air filter 3 having an air inlet 3a. As will be described later, as polluted water 1 (see FIG. 1) containing pollutants is introduced through the inlet 5a, air and the flocculant F are sucked into the aspirator 5. On the aspirator 5 side of the branch point of the suction pipe 15, a check valve 30 is provided. Instead of the aspirator 5, an air pump may be used.

Figure 3:
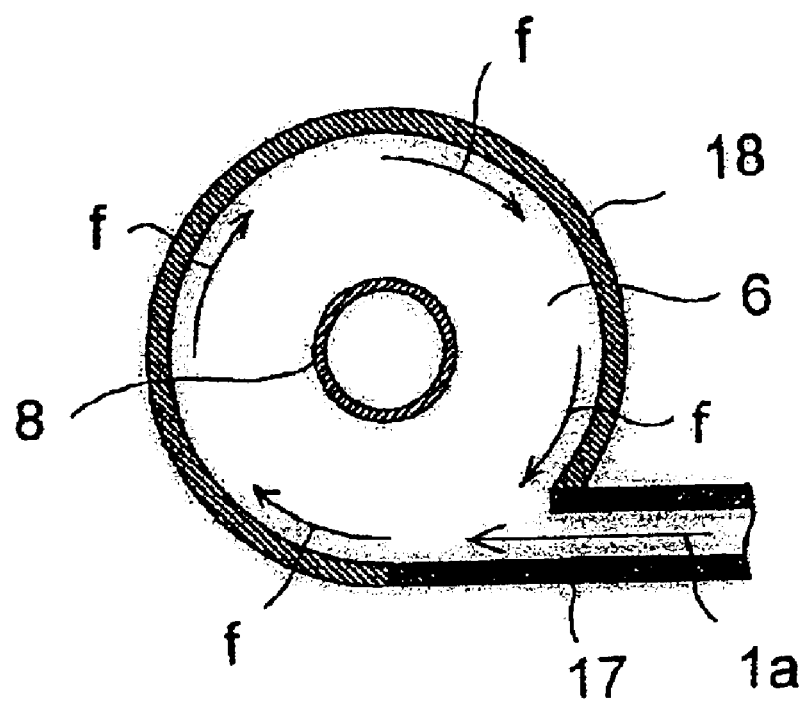
FIG. 3 is a sectional view taken along line x-x shown in FIG. 1.

In FIG. 1, to the outlet 5b of the aspirator 5, one end of an introduction pipe 17 is connected. The other end of the introduction pipe 17 is connected to the agitation cylinder 18. The agitation cylinder 18 is cylindrical in shape, and is closed at the top to form an agitation chamber 6. FIG. 3 shows a cross section along line x-x. The introduction pipe 17 is connected to the agitation cylinder 18 so as to be tangential to the circular horizontal section of the agitation chamber 6. Thus, the polluted water 1a introduced through the introduction pipe 17 into the agitation chamber 6 is made into a spiraling water stream "f" that spirals along the inner wall of the agitation chamber 6, and it is agitated as it rises inside the agitation chamber 6.

Substantially at the center inside the agitation cylinder 18 is vertically arranged a mixing cylinder 8 having a relatively small internal diameter, both ends open, and a predetermined length. Inside the mixing cylinder 8, a spiral fin 7 is arranged.

The spiral fin 7 is composed of a plurality of cells coupled together. Each cell is a plate-shaped member of which the length-width ratio is about 1.5:1 to 1:1, with opposite sides thereof twisted at 180°. Thus, a spiral passage is formed inside the mixing cylinder 8. There is no limitation on the number of cells coupled together. The spiral fin 7 is made of metal, resin, or the like, and preferably of resin because it is easier to mold.

The entrance 8a of the mixing cylinder 8, i.e. the top end thereof, is located close to the ceiling surface of the agitation cylinder 18, so that the polluted water 1b that has risen inside the agitation chamber 6 in the form of a spiraling water stream "f" then flows into the mixing cylinder 8 through the entrance 8a. The polluted water 1b that has flowed into the mixing cylinder 8 flows down naturally along the surface of the spiral fin 7.

Below the agitation cylinder 18, the cylindrical reservoir section 10, having a larger internal diameter than the agitation cylinder 18, is provided substantially coaxially with the agitation cylinder 18, with a separation wall interposed. The mixing cylinder 8 protrudes into the reservoir section 10, so that the polluted water 1b that has flowed down the mixing cylinder 8 is stored temporarily in the reservoir section 10. To the top end of the reservoir section 10, one end of a coupling pipe 25 is connected.

The other end of the coupling pipe 25 is connected to the filtering section 19. The filtering section 19 is box-shaped, and has the top thereof closed with an openable lid 19a. Inside the filtering section 19 is detachably arranged a dewatering basket 20 formed out of metal mesh and shaped so as to fit the inner walls of the filtering section 19. Inside the dewatering basket 20 is held a bag-shaped net 21 formed out of a water-transmitting washing net or the like. In a lower portion of a side face of the filtering section 19 is provided a drain pipe 22 through which the purified water that has passed through the net 21 is drained.

Making the filtering section 19 detachable from the coupling pipe 25 makes it possible to detach the filtering section 19 from the polluted water purifier 51 as required to maintain the filtering section 19 as by cleaning it. This helps alleviate the shortening of the life of the product.

In the polluted water purifier 51 structured as described above, polluted water 1 containing pollutants such as a surfactant is introduced into the aspirator 5 by a pressure-feeding means (not shown) such as a pump. Inside the aspirator 5, as the polluted water passes therethrough, a suction force appears in the suction inlet 5f (see FIG. 2). As a result, through the suction pipe 15, the flocculant F from the flocculant tank 2 and the air from the air filter 3 are mixed with the polluted water 1. Thus, the pollutants such as a surfactant present in the polluted water flocculate and form flocks. Here, the amount of flocculant F mixed can be adjusted adequately by varying the opening of the flow control valve 16 according to the flow rate of the polluted water 1.

As the flocculant added here, it is possible to use an inorganic flocculant, such as polyaluminum chloride (PAC) or aluminum sulfate, as is typically used for the purification of polluted water in general. Alternatively, to obtain larger flocks, an organic polymer flocculant, such as polyacrylamide may be used.

In this embodiment, an inorganic flocculant is added to polluted water 1 beforehand in an unillustrated bath, and then the polluted water 1 is fed under pressure to the aspirator 5. Moreover, in the flocculant tank 2, a polymer flocculant is stored as the flocculant F that is mixed together with air with the polluted water 1.

Inside the aspirator 5, a guide (not shown) may be provided so as to make the stream of polluted water rotate. Making the stream of polluted water rotate at the narrowing portion 5d helps reduce the resistance that the polluted water receives when entering the aspirator 5 through the inlet 5a. Moreover, making the stream of polluted water rotate at t e widening portion 5e helps prompt the agitation of the flocculant, air, and polluted water. This makes it possible to obtain harder, larger flocks.

The polluted water 1a mixed with the flocculant F and air is introduced, as described earlier, through the introduction pipe 17 into the agitation cylinder 18. The polluted water 1a is made into a spiraling water stream "f" that spirals along the inner surface of the agitation chamber 6, and it is agitated as it rises inside the agitation chamber 6. In this way, the polluted water 1a is agitated quickly.

Under this agitation and the action of the flocculant F, the pollutants present in the polluted water 1a, such as a surfactant and dirt components separated from laundry, flocculate and form flocks of tens to hundreds of micrometers across. The polluted water 1b containing the flocks then flows into the mixing cylinder 8 through the entrance 8a, and flows down naturally along the surface of the spiral fin 7.

As the polluted water 1a is made into a spiraling water stream and is thereby agitated inside the agitation chamber 6, centrifugal force causes air, which is light, to concentrate around the outer peripheral surface of the mixing cylinder 8, and thereby separates the flocks from the air. However, as the polluted water 1b is passed inside the mixing cylinder 8, the air and the flocks present in the polluted water 1b are mixed evenly. This helps the flocks to hold bubbles and thereby grow larger inside the mixing cylinder 8. The spiral fin 7 may be omitted; however, its provision is preferable, because it helps prompt the agitation of the air and the flocks.

Then, through the exit 8b of the mixing cylinder 8, the polluted water 1c containing the flocks that have grown larger by holding bubbles flows down into the reservoir section 10, where the polluted water 1c is accumulated. Here, under the influence of gravity, the polluted water 1c gushes down in the form of a jet. Therefore, if the polluted water 1c is fed directly to a filter or the like to remove the flocks therefrom, the grown flocks are crushed back into fine particles by the jet. By temporarily storing the polluted water 1c in the reservoir section 10 to buffer the force of the jet, it is possible to carry the grown flocks to the filtering section 19 without crushing them.

When the polluted water 1c is accumulated to close to the full level inside the expansion space 10, it overflows, so that the polluted water 1d containing the flocks 23 flows through the coupling pipe 25 into the filtering section 19. The polluted water 1d containing the flocks 23 is filtered by the net 21 and thereby the flocks 23 are separated therefrom. Thus, purified water 1e cleared of the flocks 23 is drained through the dewatering basket 20 and the drain pipe 22 to outside.

When the flocks 23 accumulated in the net 21 amount to a predetermined volume, the flocks 23 can be disposed of by opening the lid 19a of the filtering section 19 and taking out the net 21. Simultaneously, the dewatering basket 20 can also be taken out, and therefore, by cleaning the net 21 and the dewatering basket 20 as required, it is possible to keep the inside of ht filtering section 19 hygienic.

It is preferable to treat the inner wall of the drain path leading from the aspirator 5 to the coupling pipe 25 with non-adhesion treatment such as fluorine coating. This makes it possible to prevent the flocks from adhering to the inner wall of the drain path as polluted water containing them passes therethrough. This eliminates the need to clean the inside of the drain path even after repeated purification of polluted water, and thus helps alleviate the trouble on the part of the user.

An example will be presented below of the results of experiments in which wastewater from a washing machine was purified with the polluted water purifier 51 of this embodiment. In the polluted water purifier 51, the agitation cylinder 18 was 50 mm across×200 mm high, the mixing cylinder 8 was 20 mm across×360 mm high, and the reservoir section 10 was 66 mm across×250 mm high. To this polluted water purifier 51, polluted water was fed at a flow rate of about 4.8 L/min, and, with the polluted water, air sucked in at a flow rate of 3 L/min was mixed.

As a surfactant, a household powder detergent manufactured by Kao Corp., Japan, sold under the trade name "Attack," was mixed with tap water to prepare polluted water with an initial pollutant concentration of 240 ppm and a turbidity, which is an indicator of transparency, of 100 NTU. Moreover, before the polluted water flows into the aspirator 5, it was mixed with an inorganic flocculant. As this inorganic flocculant, a 33% water solution of polyaluminum chloride (the type PAC300A manufactured by Taki Chemical Co., Ltd., Japan) was used, and 1.7 mL of it was mixed with every 1 L of the polluted water.

Moreover, a 0.3% water solution of a nonionic polymer flocculant (the type N110 manufactured by Toagosei Co., Ltd., Japan) was stored in the flocculant tank 2, and 4.0 mL of it was mixed with every 1 L of the polluted water. Under these conditions, the purified water 1e drained through the drain pipe 22 had a surfactant concentration of about 8 ppm and a turbidity of 1 to 2 NTU. Thus, satisfactory purifying performance was achieved.

<Second Embodiment>

Figure 4:
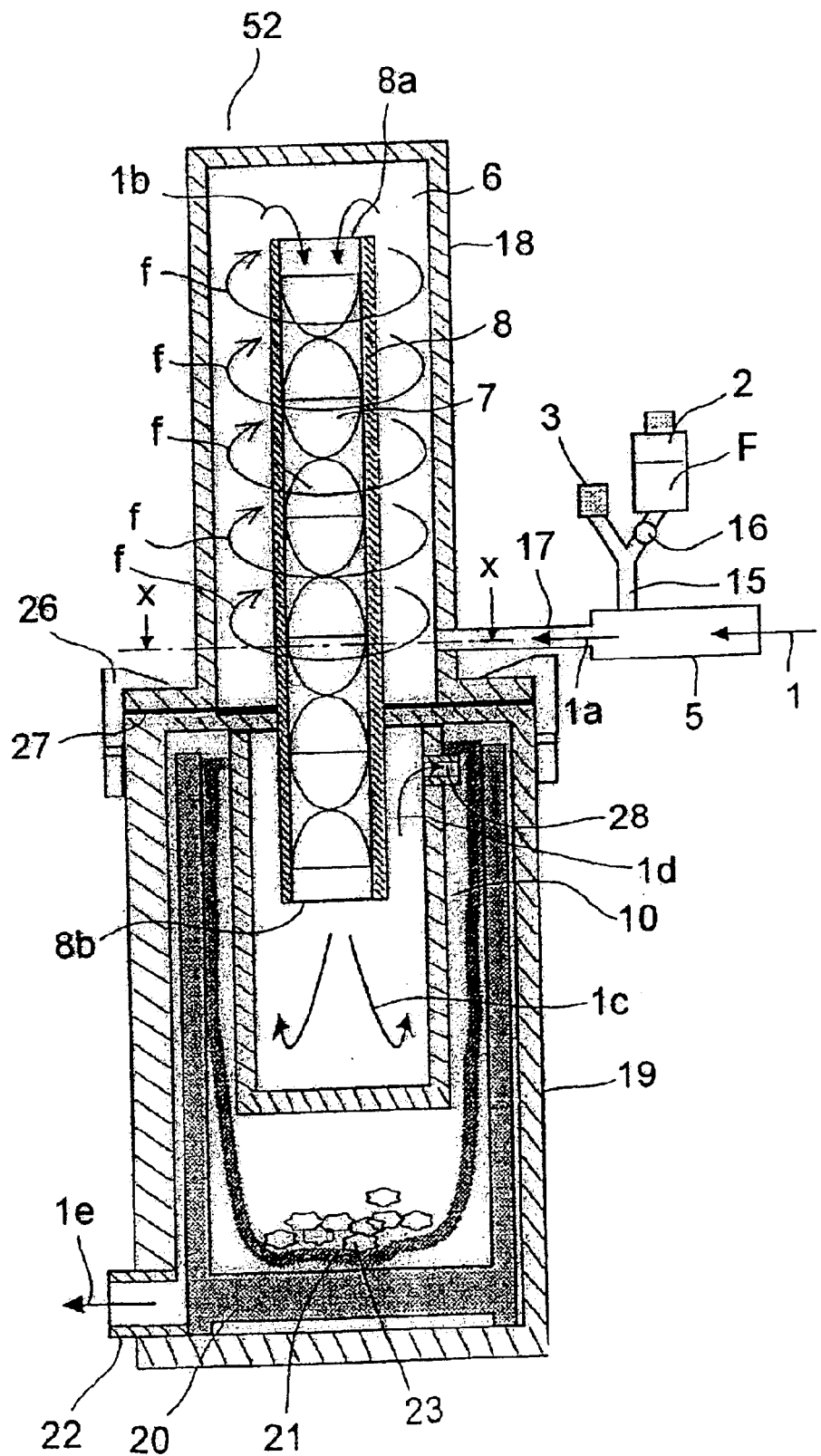
FIG. 4 is a sectional view showing the polluted water purifier of a second embodiment of the invention.

FIG. 4 is a sectional view showing the polluted water purifier of a second embodiment. For convenience' sake, such members as have their counterparts in the first embodiment shown in FIG. 1 described earlier are identified with the same reference numerals. In the polluted water purifier 52 of this embodiment, the filtering section 19 is arranged so as to enclose the reservoir section 10, and is fitted integrally but detachably to the agitation cylinder 18 with hook-type clamps 26. This makes the polluted water purifier 52 one in which all the processes of polluted water treatment are integrated together.

Between the top face of the filtering section 19 and the bottom face of the agitation cylinder 18, a gasket 27 for preventing water leakage is arranged except where the mixing cylinder 8 lies. The reservoir section 10 is fixed to the top face of the filtering section 19 with adhesive or the like. The reservoir section 10 and the filtering section 19 communicate with each other through a discharge pipe 28 provided in an upper portion of the peripheral surface of the reservoir section 10. In other respects, the structure here is the same as in the first embodiment.

In the polluted water purifier 52 structured as described above, as in the first embodiment, polluted water 1 containing pollutants such as a surfactant is introduced into the aspirator 5 by a pressure-feeding means (not shown) such as a pump. As a result, through the suction pipe 15 communicating with the flow passage 5c, the flocculant F from the flocculant tank 2 and the air from the air filter 3 are mixed with the polluted water 1.

The polluted water 1a mixed with the flocculant F and air is introduced through the introduction pipe 17 into the agitation cylinder 18. The polluted water 1a is made into a spiraling water stream "f" that spirals along the inner surface of the agitation chamber 6, and it is agitated as it rises inside the agitation chamber 6. Under this agitation and the action of the flocculant F, the pollutants present in the polluted water 1a, such as a surfactant and dirt components separated from laundry, flocculate and form flocks of tens to hundreds of micrometers across. The polluted water 1b containing the flocks then flows into the mixing cylinder 8 through the entrance 8a, and flows down naturally along the surface of the spiral fin 7.

Then, through the exit 8b of the mixing cylinder 8, the polluted water 1c containing the flocks that have grown larger by holding bubbles flows down into the reservoir section 10, where the polluted water 1c is accumulated. When the polluted water 1c is accumulated to close to the full level inside the expansion space 10, it overflows, so that the polluted water 1d containing the flocks 23 flows through the discharge pipe 28 into the filtering section 19. The polluted water 1d containing the flocks 23 is filtered by the net 21 and thereby the flocks 23 are separated therefrom. Thus, purified water 1e cleared of the flocks 23 is drained through the dewatering basket 20 and the drain pipe 22 to outside.

When the flocks 23 accumulated in the net 21 amount to a predetermined volume, the flocks 23 can be disposed of by releasing the clamps 26 to unlock the filtering section 19 and then taking out the net 21 out of the filtering section 19 thus detached. Simultaneously, by taking out also the dewatering basket 20, it is possible to clean the net 21 and the dewatering basket 20 as required.

In this embodiment, it is possible to achieve the same effects as in the first embodiment, and in addition, by integrally providing the agitation cylinder 18 and the filtering section 19, it is possible to make the polluted water purifier 52 compact. This permits the polluted water purifier 52 to be incorporated even in a small space inside a household washing machine or the like for the purification of washing wastewater.

<Third Embodiment>

Figure 5:
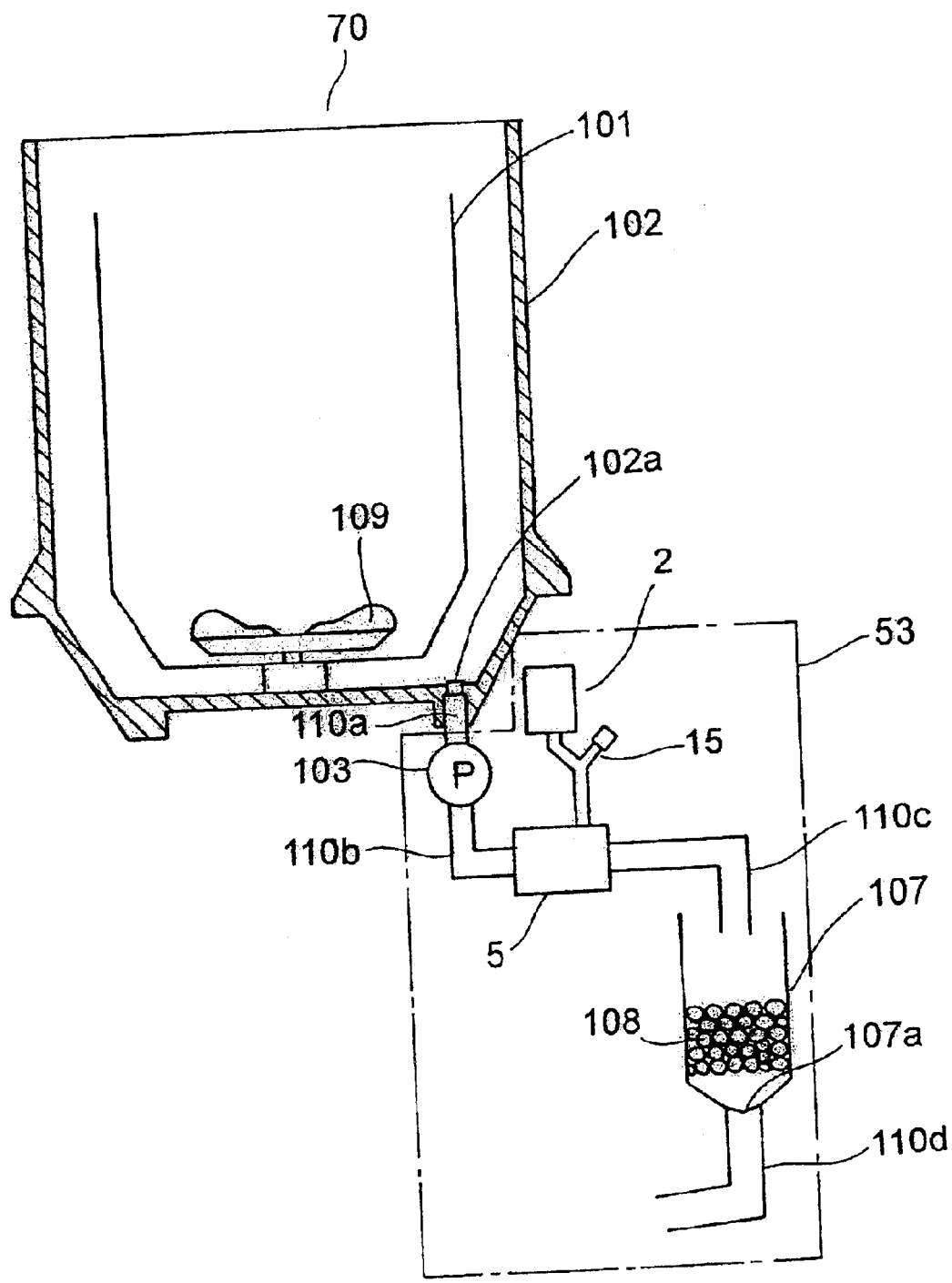
FIG. 5 is a schematic sectional view showing the washing machine incorporating a polluted water purifier of a third embodiment of the invention.

FIG. 5 is a schematic sectional view showing a washing machine incorporating the polluted water purifier of a third embodiment. For convenience' sake, such members as find their counterparts in the first and second embodiments shown in FIGS. 1 to 4 described earlier are identified with the same reference numerals. In this washing machine 70, a washing tub 101 is rotatable arranged inside a water tub 102. At the bottom of the washing tub 101 is provided a rotatable pulsator 109 that agitates laundry such as a piece of clothing with washing water during washing. In the bottom of the water tub 102 is provided a drain outlet 102a, to which a drain pipe 110a is connected. Through the drain pipe 110a, the water tub 102 communicates with a polluted water purifier 53 provided on the downstream side of the drain outlet 102a.

The polluted water purifier 53 has a pump 103, an aspirator 5, and a filtering device 107 arranged in this order from the upstream side thereof. The pump 103 and the aspirator 5 are connected together by a drain pipe 110b. From the aspirator 5 runs a drain pipe 110c through which washing wastewater, as polluted water, flows into the filtering device 107. From the filtering device 107 runs a drain pipe 110d through which the washing wastewater that has flowed out of the filtering device 107 through the drain outlet thereof 107a is drained to outside. Inside the filtering device 107, a granular filtering material 108 such as granules of sand, ceramic, or resin is placed.

The aspirator 5 has the same structure as the one, shown in FIG. 2, used in the first embodiment. Thus, as polluted water passes through the aspirator 5, the flocculant and air are sucked into the aspirator 5 from the flocculant tank 2 and the suction pipe 15 connected to the aspirator 5 and are mixed with the polluted water.

In the washing machine 70 incorporating the polluted water purifier 53 structured as described above, as the pump 103 is driven, polluted water, i.e. washing wastewater, flows through the drain outlet 102a of the water tub 102 into the drain pipe 110a. Through the drain pipe 110a and the drain pipe 110b, the polluted water is introduced into the aspirator 5. As the polluted water passes through the aspirator 5, the flocculant and air are sucked into the aspirator 5 from the flocculant tank 2 and the air filter 3 respectively.

Here, a predetermined amount of flocculant can be supplied by adjusting a flow control valve 116. Moreover, leaving the air inlet 3a open to the atmospheric pressure makes it possible to suck in both the flocculant and air. The flocculant and the air thus sucked in pass through the suction inlet 5f, then through the check valve 30, and are then mixed with the polluted water passing through the aspirator 5. The pollutants such as a surfactant present in the washing wastewater flocculate and form flocks.

The flocks formed in the aspirator 5 flow together with the polluted water into the filtering device 107. The flocks are filtered out by the filtering material 108, and are thereby separated. Thus, purified water cleared of the flocks is drained through the drain outlet 107a of the filtering device 107 and the drain pipe 110d.

An example will be presented below of the results of experiments in which washing wastewater was purified with the washing machine 70 incorporating the polluted water purifier 53 of this embodiment. It is to be noted that, in the aspirator 5, it is possible to vary the degree of vacuum at the suction inlet 5f by controlling the shapes of the narrowing portion 5d and the widening portion 5e and the flow rate of the polluted water passing through the flow passage 5c. Thus, it is possible to freely adjust the amounts of flocculant and air sucked in to the desired amounts as required.

Polluted water was fed to the polluted water purifier 53 by the pump 103 at a flow rate of 5 L/min, and, with the polluted water, air sucked in at a flow rate of 3 L/min was mixed. As a surfactant, a household powder detergent manufactured by Kao Corp., Japan, sold under the trade name "Attack," was mixed with tap water to prepare polluted water with a standard concentration (with a surfactant concentration of 242 mg/L). As the flocculant, a 33% water solution of polyaluminum chloride (the type PAC300A manufactured by Taki Chemical Co., Ltd., Japan) was used, and the aspirator 5 was adjusted so that 2 mL (10 mL/min) of the flocculant was mixed with every 1 L of the polluted water. As a result, 97% of the surfactant components were found to be removed.

This removal rate is comparable to that achieved in a case where a mixing bath is provided separately and a flocculant is added therein, where polluted water is stored and agitated with a propeller fan. Thus, the method adopted in this embodiment has the advantage of offering such a removal rate without the need for a mixing bath. Moreover, the flocks formed float on water, and therefore, in a case where the water is filtered as it flows down as by natural filtration, as long as the flow rate is adequate, filtration proceeds with the flocks floating near the water surface inside the filtering device 107. Thus, cake-like flocks accumulate on the filtering material 108 and thereby prevent the lowering of the flow rate. Moreover, the flocks can be removed easily from the filtering material 108, and therefore the filtering material 108 can be regenerated easily by cleaning or the like.

A mixed solution of an inorganic and organic flocculants may be added from the flocculant tank 2. Under the same conditions as described above, further experiments were conducted by using, as the flocculants, a PAC reagent manufactured by Kishida Chemical Co., Ltd., Japan, and a cationic polymer flocculant, the type C-009P, manufactured by Sanyo Chemical Industries Co., Ltd., Japan. The flocculant solution was prepared so as to have a PAC concentration of 300 g/L and a C-009P concentration of 10 g/L. For comparison, experiments were conducted also with a flocculant solution that has a PAC concentration of 300 g/L but that does not contain C-009P.

When 1.5 mL of the mixed solution of PAC and C-009P was added to every 1 L of a detergent fluid, the surfactant was removed with a removal rate of 95%. By contrast, with the solution containing PAC alone, addition of 1.5 mL thereof resulted in a removal rate of 93%. As for the size of the flocks formed, whereas 80% or more of the flocks formed with the solution containing PAC alone were 300 $\mu$m across or smaller, 80% or more of the flocks formed with the mixed solution were 300 $\mu$m across or larger, that is, most of the flocks grew larger.

This makes it even easier for the filtering device 107 to filter out and collect the flocks. In this case, as the polymer flocculant that is mixed with the inorganic flocculant PAC, it is preferable to use a cationic or nonionic flocculant that is unlikely to react with PAC, which is cationic.

<Fourth Embodiment>

Figure 6:
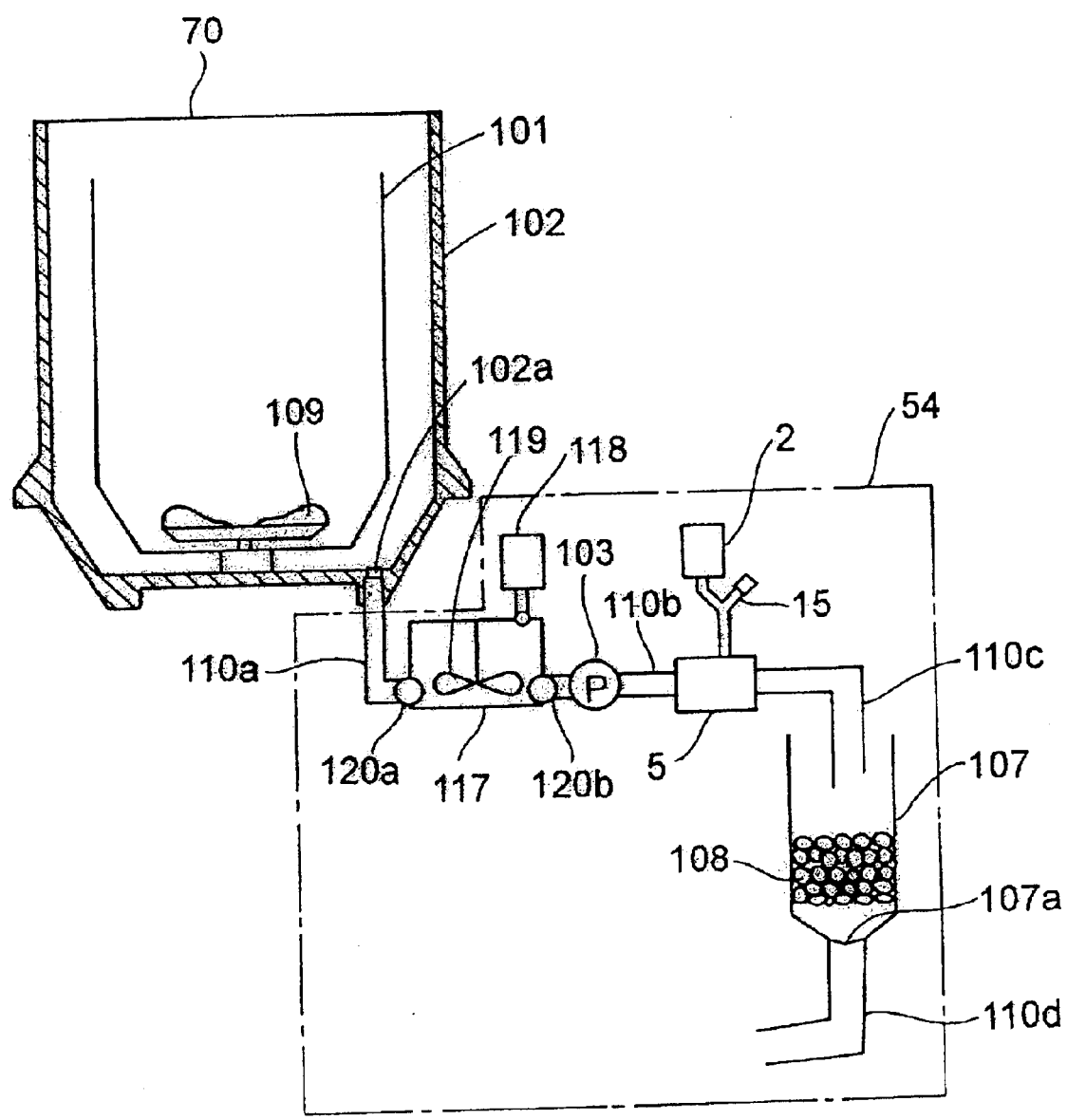
FIG. 6 is a schematic sectional view showing the washing machine incorporating a polluted water purifier of a fourth embodiment of the invention.

FIG. 6 is a schematic sectional view of the washing machine incorporating the polluted water purifier of a fourth embodiment. For convenience' sake, such members as find their counterparts in the third embodiment shown in FIG. 5 described above are identified with the same reference numerals. In the polluted water purifier 54 of this embodiment, the drain pipe 110a connected to the water tub 102 is connected through a flow control valve 120a to a mixing bath 117. To the downstream side of the mixing bath 117 is connected, through a flow control valve 120b, a pump 103 and an aspirator 5, which has the same structure as that used in the third embodiment.

To the mixing bath 117, an auxiliary flocculant tank 118 in which a water solution of a flocculant is stored is fitted so as to communicate therewith. Inside the mixing bath 117 is provided an agitating means 119, such as a propeller fan, for agitating polluted water together with the flocculant from the auxiliary flocculant tank 118. In other respects, the structure here is the same as in the third embodiment, and therefore overlapping explanations will not be repeated.

In the washing machine 70 incorporating the polluted water purifier 54 structured as described above, polluted water, i.e. washing wastewater, flows, under its own weight, through the drain outlet 102a of the water tub 102 and the drain pipe 110a into the mixing bath 117. Here, if the downstream-side flow control valve 120b is closed, by closing the upstream-side flow control valve 120a a predetermined time thereafter, a predetermined volume of polluted water is stored in the mixing bath 117.

After the predetermined volume of polluted water has been stored in the mixing bath 117, the flocculant is added thereto from the auxiliary flocculant tank 118. Moreover, the agitating means 119 is driven, so that the polluted water having the flocculant added thereto is agitated in the mixing bath 117. As a result, the pollutants such as a surfactant present in the polluted water flocculate and form primary flocks.

When the pump 103 is driven with the downstream-side flow control valve 120b open, the polluted water containing the primary flocks flows into the aspirator 5. The aspirator 5, as in the third embodiment, sucks in the flocculant stored in the flocculant tank 2 and air, and thus the first flocks grow larger by holding bubbles and thereby form secondary flocks.

The secondary flocks, together with the polluted water, flow into the filtering device 107, where the secondary flocks are filtered out by the filtering material 108 and are thereby separated. Thus, purified water cleared of the secondary flocks is drained through the drain outlet 107a of the filtering device 107 and the drain pipe 110d.

Where, as in this embodiment, flocculants are mixed at two locations, i.e. in the mixing bath 117 located upstream and in the aspirator 5 located downstream, using flocculants having characteristics suitable at each location helps make the flocks grow even larger. Specifically, in the mixing bath 117 located upstream, it is preferable to use a flocculant that makes water-soluble organic substances such as a surfactant precipitate as flocks, for example an inorganic flocculant such as PAC or a cationic polymer flocculant. On the other hand, in the aspirator 5 located downstream, it is preferable to use a flocculant that effectively makes the fine primary flocks formed in the mixing bath 117 and other fine insoluble suspended particles flocculate and grow larger, for example an anionic or nonionic polymer flocculant.

An example will be presented below of the results of experiments in which washing wastewater was purified with the washing machine incorporating the polluted water purifier 54 of this embodiment. The experiments were conducted under the same conditions as in the third embodiment. Specifically, the flow rate of polluted water was 5 L/min, the flow rate of air sucked in was 3 L/min, and the concentration of the surfactant was 242 mg/L. Moreover, in the mixing bath 117, as a flocculant, 2 mL of a 33% water solution of polyaluminum chloride (the type PAC300A manufactured by Taki Chemical Co., Ltd., Japan) was mixed with every 1 L of the wastewater, which was then agitated for 30 seconds at 100 rpm and then for 30 seconds at 40 rpm. To the aspirator 5, a 0.3% water solution of a nonionic polymer flocculant (the type N110 manufactured by Toagosei Co., Ltd., Japan) was supplied so that 4.2 mL of it was mixed with every 1 L of the polluted water. As a result, 97% of the surfactant present in the polluted water was found to be removed.

When PAC is used as the flocculant that is mixed upstream, cationic primary flocks are formed. Therefore, an anionic polymer flocculant is typically used downstream. In the experiments described above, however, more emphasis was placed on the removal of the surfactant, and therefore an excess amount of PAC was added. This made the pH value of the polluted water lower, and thus a nonionic polymer flocculant was recognized to be more effective than an anionic flocculant.

Moreover the secondary flocks formed were larger and harder than those obtained in a case where the same two flocculants (PAC300A and N110) were added in the mixing bath. Specifically, whereas 90% or more of the flocks formed by using the mixing bath alone were 500 $\mu$m across or smaller, 95% or more of the flocks formed by using both the mixing bath 117 and the aspirator 5 as in this embodiment were 500 $\mu$m across or larger.

<Fifth Embodiment>

Figure 7:
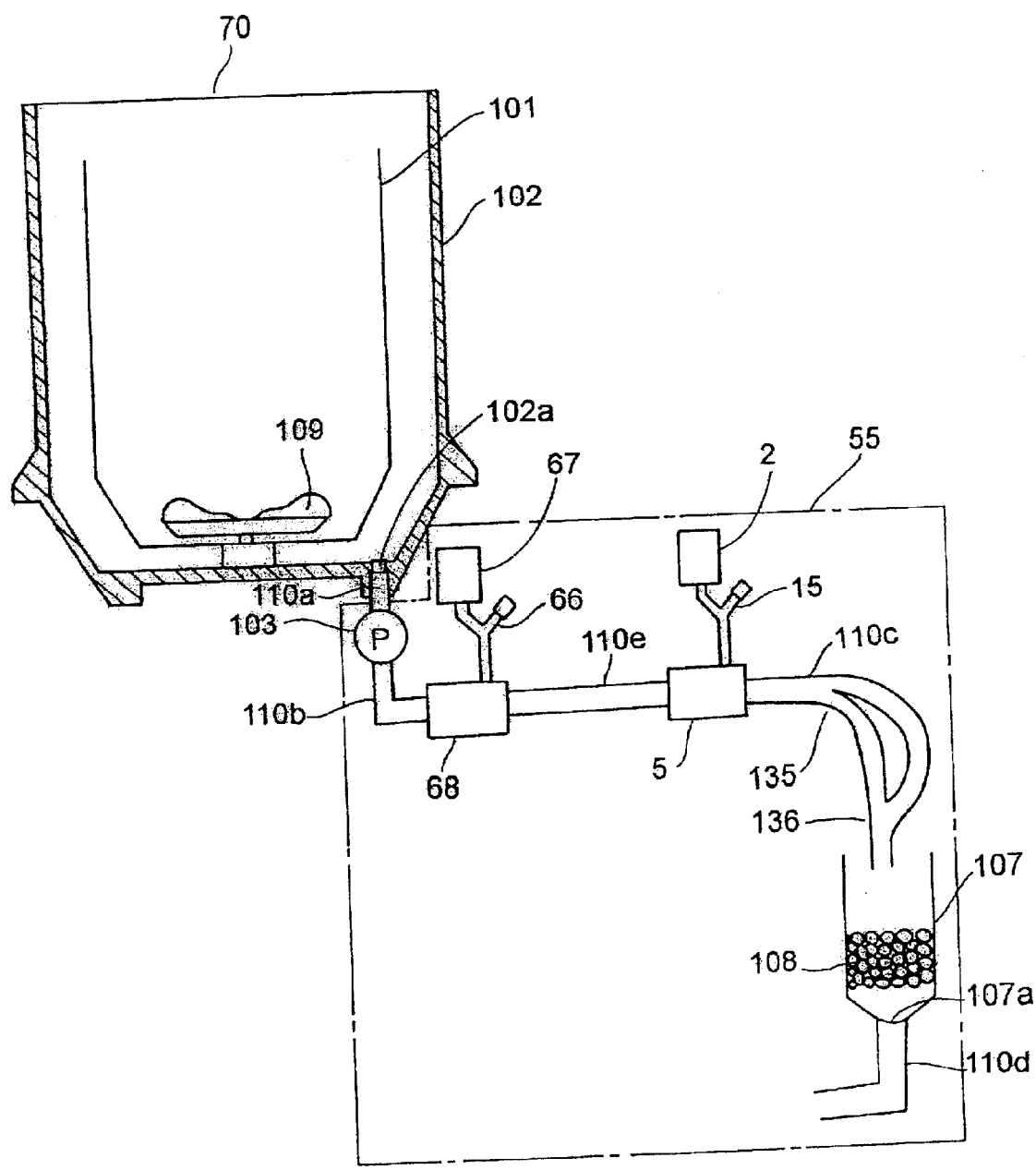
FIG. 7 is a schematic sectional view showing the washing machine incorporating a polluted water purifier of a fifth embodiment of the invention.

FIG. 7 is a schematic sectional view showing a washing machine incorporating the polluted water purifier of a fifth embodiment. For convenience' sake, such members as find their counterparts in the third embodiment shown in FIG. 5 described earlier are identified with the same reference numerals. In the polluted water purifier 55 of this embodiment, the drain pipe 110a running from the water tub 102 of the washing machine 70 is connected to the pump 103, and the pump 103 is connected through the drain pipe 110b to an auxiliary aspirator 68. The auxiliary aspirator 68 is connected through a drain pipe 110e to an aspirator 5, which has the same structure as that used in the third embodiment.

The auxiliary aspirator 68 has a structure similar to that of the aspirator 5, and an auxiliary flocculant tank 67 and a suction pipe 66 are fitted thereto. Thus, as polluted water passes through the auxiliary aspirator 68, a flocculant and air are sucked into the auxiliary aspirator 68. Moreover, the drain pipe 110c that guides the polluted water from the aspirator 5 to the filtering device 107 is bifurcated into two branches having different lengths on the way, and these two branches merge before reaching the filtering device 107. In other respects, the structure here is the same as in the third embodiment.

In the washing machine 70 incorporating the polluted water purifier 55 structured as described above, as the pump 103 is driven, polluted water, i.e. washing wastewater, flows through the drain outlet 102a of the water tub 102 into the drain pipe 110a. Through the drain pipes 110a and 110b, the polluted water is introduced into the auxiliary aspirator 68. The auxiliary aspirator 68 sucks in the flocculant from the auxiliary flocculant tank 67 and air through the suction pipe 66.

The flocculant and the air sucked in are mixed with the polluted water passing through the auxiliary aspirator 68. The pollutants such as a surfactant present in the washing wastewater flocculate and form primary flocks. Here, as the flocculant, as in the fourth embodiment, an inorganic flocculant such as PAC or a cationic polymer flocculant is used.

The polluted water containing the primary flocks flows through the drain pipe 110e into the aspirator 5. The aspirator 5, as in the third and fourth embodiments, sucks in the flocculant from the flocculant tank 2 and air, and thus the primary flocks grow larger by holding bubbles and thereby form secondary flocks. Here, as the flocculant, as in the fourth embodiment, an anionic or nonionic polymer flocculant is used.

The polluted water containing the secondary flocks that has flowed from the aspirator into the drain pipe 110c divides into two flows at the branch point 135. In general, a polymer flocculant is highly viscous, and therefore, even when it is blown with air into a flow of water, it tends to cause portions of the flow where the polymer flocculant is present to separate from portions thereof where no flocculant is present (i.e. only air is present).

Such separation is remarkable particularly in a case where, as in this embodiment, a flocculant is introduced into an aspirator. This problem can be solved by branching part of the drain pipe 110c into flow paths having different lengths, because doing so produces an effect of agitation, which makes the distribution of the flocculant in the flow of water even and prompts the formation of the secondary flocks.

The polluted water that has passed the confluence 136 of the drain pipe 110c then flows into the filtering device 107, where the secondary flocks are filtered out by the filtering material 108 and are thereby separated. Thus, purified water cleared of the secondary flocks is drained through the drain outlet 107a of the filtering device 107 and the drain pipe 110d.

An example will be presented below of the results of experiments in which washing wastewater was purified with the washing machine incorporating the polluted water purifier 55 of this embodiment. The experiments were conducted under the same conditions as in the fourth embodiment. Specifically, the flow rate of polluted water was 5 L/min, and the concentration of the surfactant was 242 mg/L. Moreover, in the auxiliary aspirator 68, as a flocculant, 2 mL of a 33% water solution of polyaluminum chloride (the type PAC300A manufactured by Taki Chemical Co., Ltd., Japan) was mixed with every 1 L of the wastewater, which was then agitated for 30 seconds at 100 rpm and then for 30 seconds at 40 rpm.

To the aspirator 5, a 0.3% water solution of a nonionic polymer flocculant (the type N110 manufactured by Toagosei Co., Ltd., Japan) was supplied so that 4.2 mL of it was mixed with every 1 L of the polluted water. Moreover, the degree of vacuum in the aspirator 5 located downstream was set higher than that in the auxiliary aspirator 68 located upstream. Thus, the auxiliary aspirator 68 sucked in air at a flow rate of 0.5 L/min, and the aspirator 5 sucked in air at a flow rate of 3 L/min. As a result, 90% or more of the secondary flocks were 500 μm across or larger, and 97% of the surfactant present in the polluted water was found to be removed.

In this embodiment, two types of flocculant can be added to washing wastewater without using a mixing bath 117 as used in the fourth embodiment. In a case where the target to be treated is a surfactant, when the flocculant is added, if a large volume of air is blown in together, there is a risk of foams foaming. To avoid this, the degree of vacuum in the auxiliary aspirator 68 located upstream is kept lower to reduce the volume of air sucked in. Thus, flocks that hold bubbles and thus show a striking tendency to float up are formed mainly by the air sucked in by the aspirator 5 located downstream.

Moreover, whereas flocks that are formed by using a mixing bath alone settle down, in this embodiment, a polymer flocculant is added together with air to polluted water inside an aspirator. Thus, when flocks are formed, air is blown into them, so that, in the filtering device 107, the flocks can be separated by letting them float up. Even in a mixing bath, flocks can be mixed with air by providing an aerating device, but this requires an extra air pump.

Moreover, it is generally considered that, the smaller the size of bubbles, the more of them are likely to attach to flocks, and thus the more effective the bubbles are in letting the flocks float up. When an aerating device is used, even if fine bubbles are formed, they combine together and grow larger before spreading all over the bath. This is less likely to happen in this embodiment, where the formation of flocks and the formation of bubbles take place simultaneously in the aspirator 5. Furthermore, the surfactant components that have remained in the washing wastewater without forming flocks tend to be captured by the bubbles. Thus, mixing air with flocks by an aspirator 5 is particularly advantageous to the removal of a surfactant.

<Sixth Embodiment>

Figure 8:
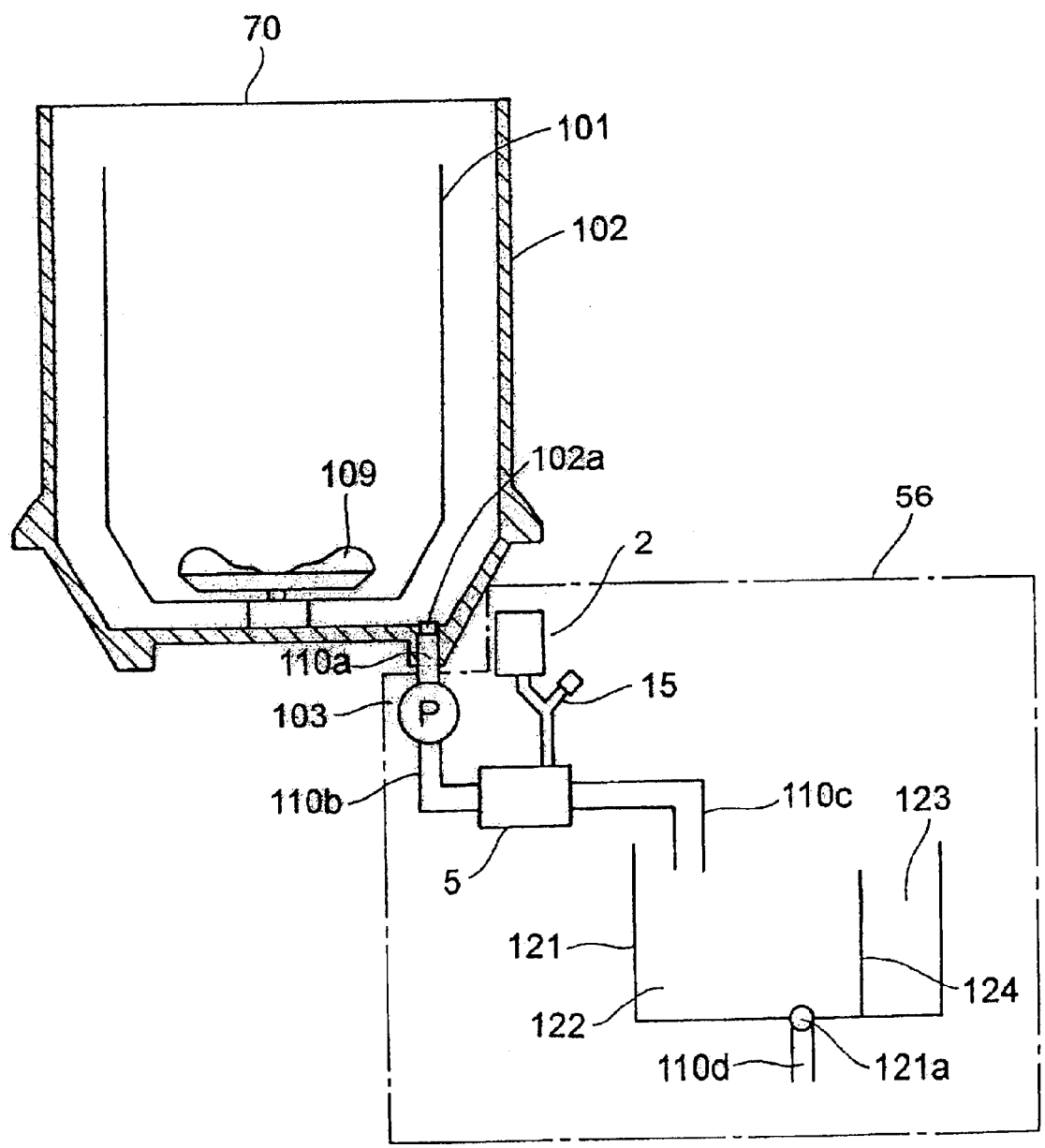
FIG. 8 is a schematic sectional view showing the washing machine incorporating a polluted water purifier of a sixth embodiment of the invention.

FIG. 8 is a schematic sectional view showing a washing machine incorporating the polluted water purifier of a sixth embodiment. For convenience' sake, such members as find their counterparts in the third embodiment shown in FIG. 5 described earlier are identified with the same reference numerals. In the polluted water purifier 56 of this embodiment, instead of the filtering device 107 used in the third embodiment, a float separation bath 121 is used. In other respects, the structure here is the same as in the third embodiment, and therefore overlapping explanations will not be repeated.

The inside of the float separation bath 121 is divided by a separation wall 124 into a separating/draining portion 122 and a flock collecting portion 123. The separating/draining portion 122 receives polluted water containing flocks that tend to float up. The flock collecting portion 123 collects the separated flocks. The separating/draining portion 122 has a drain valve 121a provided at the bottom thereof. When the drain valve 121a is opened, the washing wastewater is drained through the drain pipe 110d.

In the washing machine 70 incorporating the polluted water purifier 56 structured as described above, as the pump 103 is driven, polluted water, i.e. washing wastewater, flows through the drain outlet 102a of the 102 into the drain pipe 110a. Through the drain pipe 110a and the drain pipe 110b, the polluted water is introduced into the aspirator 5. The aspirator 5 sucks in the flocculant from the flocculant tank 2 and air through the suction pipe 15.

The flocculant and the air sucked in are mixed with the polluted water passing through the aspirator 5. The pollutants such as a surfactant present in the washing wastewater from the washing machine flocculate and form flocks. The polluted water containing the flocks continuously flows into the separating/draining portion 122 of the float separation bath 121. When a predetermined volume of polluted water has been stored in the separating/draining portion 122, the flocks, which tend to float up, flow over the separation wall 124 and are collected in the flock collecting portion 123. The water purified by being separated from the flocks in this way is drained through the drain valve 121a and the drain pipe 110d.

Separating flocks by using the filtering device 107 (see FIG. 5) of the third embodiment results in flocks caught inside the filtering material 108 (see FIG. 5) and building up on top thereof. This requires that the filtering device 107 be maintained frequently to remove Using the filtering device 107 (see FIG. 5) of the third embodiment to separate flocks results in flocks caught inside the filtering material 108 (see FIG. 5). Moreover, to remove flocks that build up on top, the filtering material 108 requires troublesome maintenance such as cleaning and replacement. By contrast, in this embodiment, the required maintenance involves simply removing the flocks collected in the flock collecting portion 123. This greatly reduces the trouble of maintenance. It is to be understood that the polluted water purifiers 54 and 55 of the fourth and fifth embodiments may be provided with a float separation bath 121 instead of the filtering device 107.

<Seventh Embodiment>

Figure 9:
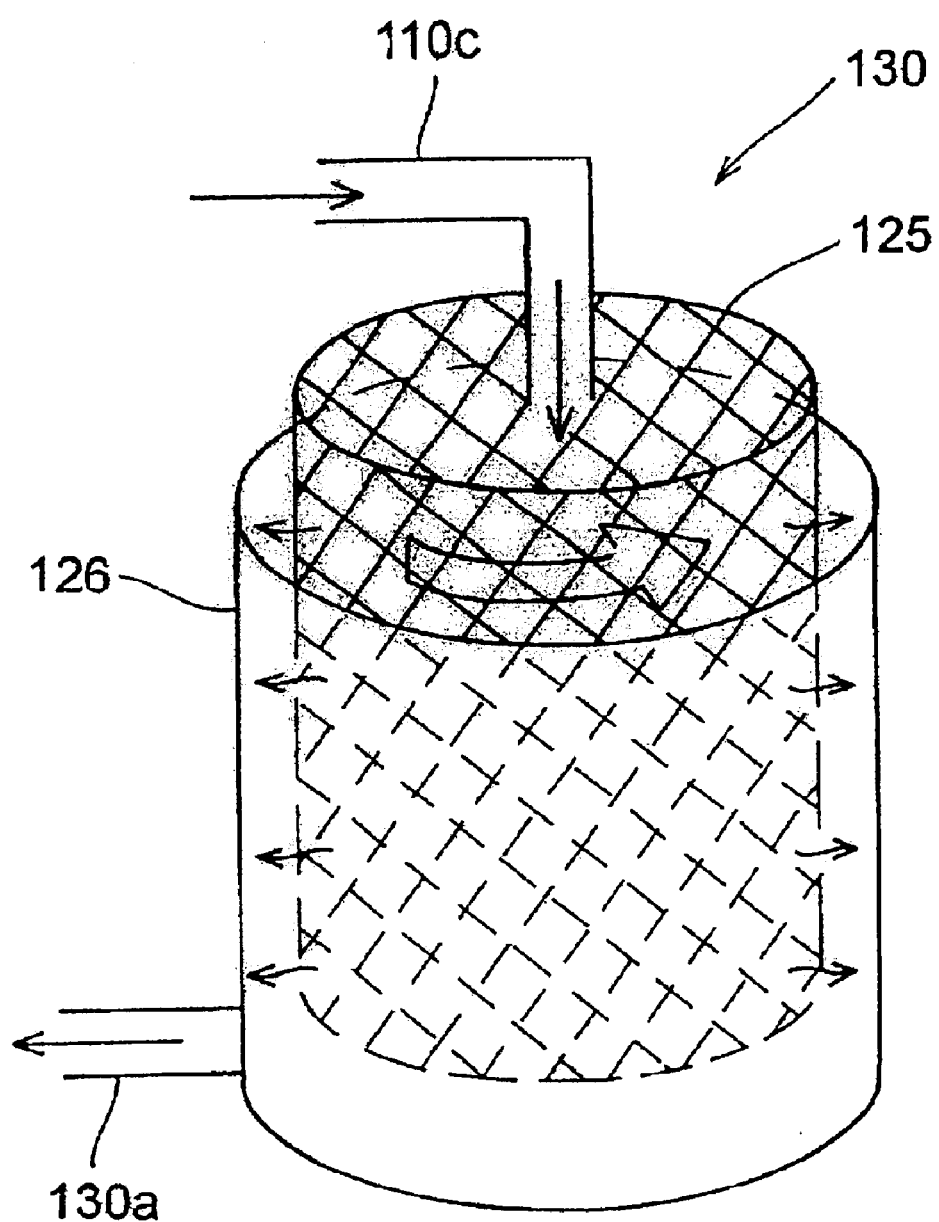
FIG. 9 is a perspective view showing the centrifugal force filtering device of the washing machine incorporating a polluted water purifier of a seventh embodiment of the invention.
Figure 10:
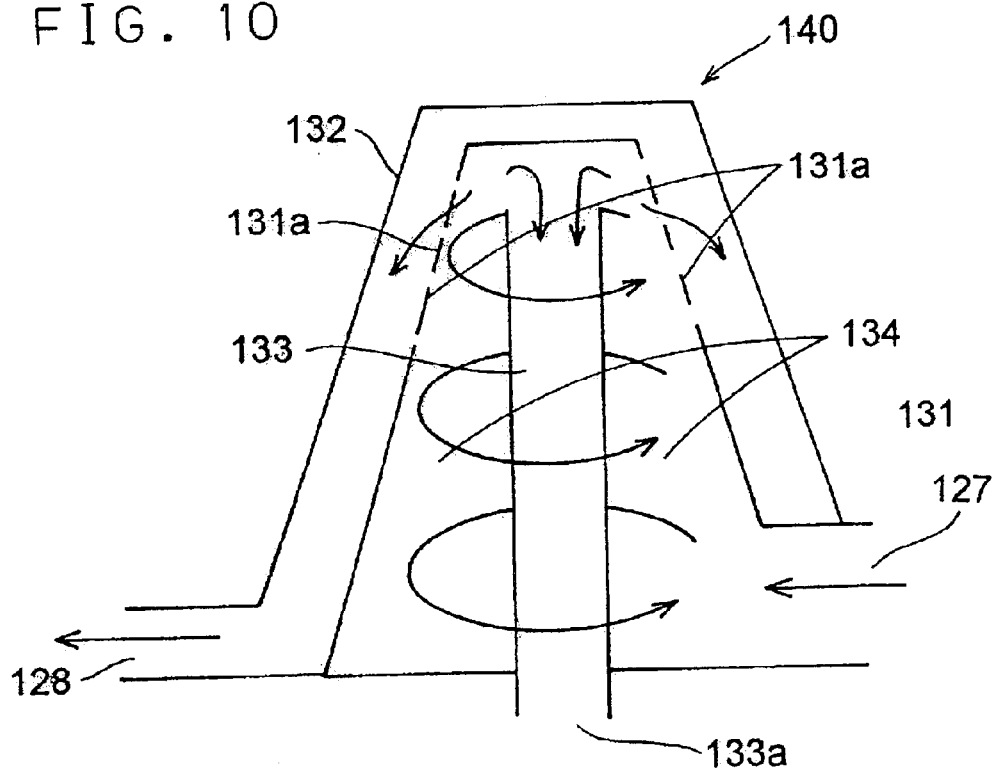
FIG. 10 is a side sectional view showing the centrifugal force filtering device of the washing machine incorporating a polluted water purifier of an eighth embodiment of the invention.

Next, a seventh embodiment will be described. In this embodiment, in the polluted water purifier 56 of the sixth embodiment described above and shown in FIG. 8, a centrifugal force filtering device 130 as shown in FIG. 9 is used instead of the float separation bath 121. In other respects, the structure here is the same as in the sixth embodiment. The centrifugal force filtering device 130. The centrifugal force filtering device 130 is composed of an outer cylinder 126 that is cylindrical in shape and that has a drain outlet 130a formed in the peripheral surface thereof at the bottom and a filtering cylinder 125 that is rotatably provided inside the outer cylinder. The peripheral surface of the filtering cylinder 125 is formed into mesh so as to pass water and keep solid components inside and thereby separate and collect them.

The polluted water that has passed through the aspirator 5 (see FIG. 8) and that now contains flocks flows through the drain pipe 110c into the rotating filtering cylinder 125 from above. The polluted water is filtered by the filtering cylinder 125 and is then drained through the drain outlet 130a. Since the filtering cylinder 125 is rotating, centrifugal force appears in the polluted water containing the flocks. The flocks are lighter than water, and therefore they concentrate in a central portion of the filtering cylinder 125 and become sparse in a peripheral portion. This prevents the flocks from adhere to and thereby clogging the peripheral surface of the filtering cylinder 125.

Moreover, the flocks that have been separated by being filtered out generally contain much water, and they can be dewatered by rotating the filtering cylinder 125 at a high rotation rate. In this case, to achieve sufficient dewatering, a rotation rate of several hundred rpm is necessary. The filtering cylinder 125 may be driven by the motor (not shown) that drives the pulsator 109 of the washing machine 70 or the washing tub 101 (see FIG. 8 for both). This eliminates the need to provide a separate power source, and thus helps reduce costs. It is to be understood that, in the polluted water purifiers 53 to 55 of the third to fifth embodiments (see FIGS. 5 to 7), a centrifugal force filtering device 130 may be provided instead of the filtering device 107.

With the polluted water purifier 54 of the fourth embodiment, with the filtering device 107 thereof replaced with a centrifugal force filtering device 130, experiments were conducted under the same conditions as the experiments conducted with the fourth embodiment to check how the flocks were filtered out. The filtering cylinder 125 was formed out of metal mesh having meshes of 180 μm, and was rotated at 260 rpm. The results showed that filtering was achieved faster than in a case where the filtering cylinder 125 was not rotated. Thereafter, dewatering was performed with the filtering cylinder 125 rotated at 900 rpm, resulting in the water content of the flocks that had been filtered out reducing from 95%, as achieved when dewatering was not performed, to 85%.

<Eighth Embodiment>

Figure 12:
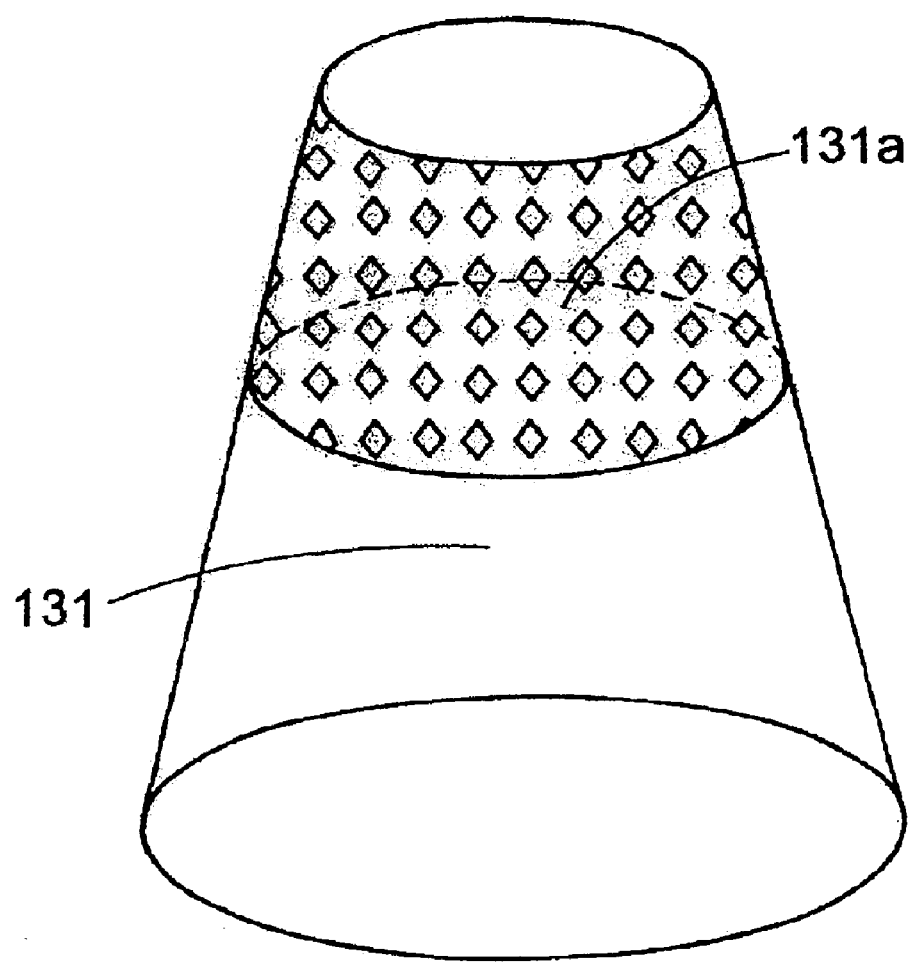
FIG. 12 is a perspective view showing the inner cylinder of the centrifugal force filtering device of the washing machine incorporating a polluted water purifier of the eighth embodiment of the invention.

Next, an eighth embodiment will be described. In this embodiment, in the polluted water purifier 56 of the sixth embodiment described earlier and shown in FIG. 8, a centrifugal force separator 140 is used instead of the float separation bath 121. In other respects, the structure here is the same as in the sixth embodiment. The centrifugal force separator 140 has an inner cylinder 131 that forms an inner chamber 134 having the shape of a truncated cone of which the cross sectional area is largest at the bottom and decreases upward. As FIG. 12 shows its details, the inner cylinder 131 has a large number of small holes 131a formed in an upper portion of the peripheral wall thereof. Moreover, the inner cylinder 131 has an inlet 127 formed in a lower portion thereof so as to communicate therewith.

Inside the inner cylinder 131 is arranged an inner pipe 133 of which the upper end is located close to the ceiling surface of the inner cylinder 131 and of which the lower end penetrates the floor surface of the inner cylinder 131 so as to form a drain outlet 133a. Outside the inner cylinder 131 is arranged an outer cylinder 132 that encloses the inner cylinder 131. The outer cylinder 132 has a drain outlet 128 formed in a lower portion thereof so as to communicate therewith.

Figure 11:
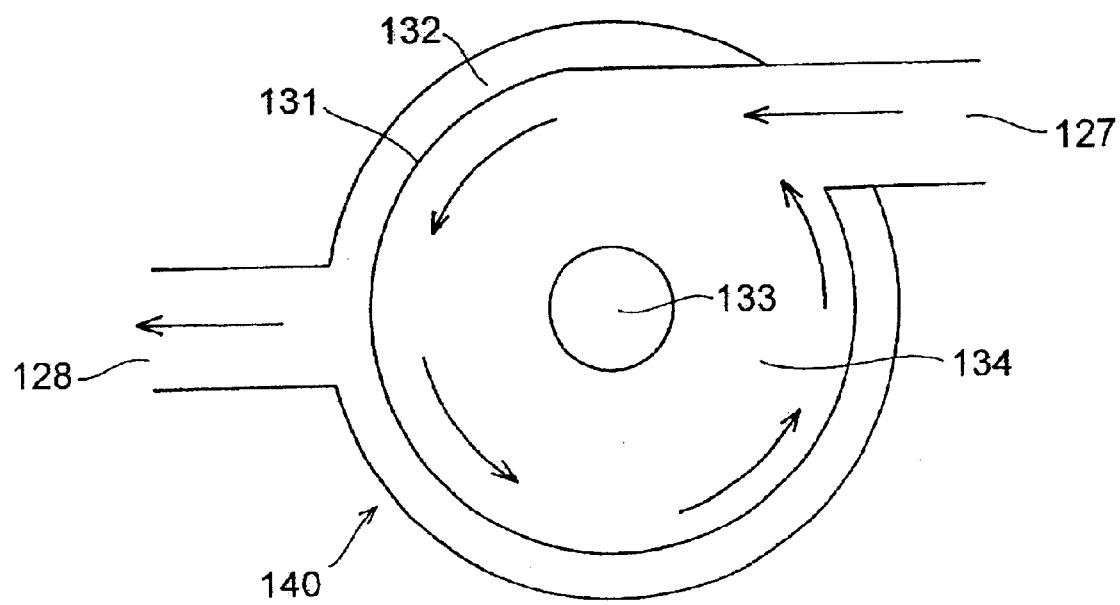
FIG. 11 is a top sectional view showing the centrifugal force filtering device of the washing machine incorporating a polluted water purifier of the eighth embodiment of the invention.

As FIG. 11 shows, the inlet 127 is arranged so as to be tangential to the peripheral surface of the inner cylinder 131. Thus, the polluted water containing the flocks that has passed through the aspirator 5 (see FIG. 8) and flowed through the inlet 127 into the inner chamber 134 rises in the form of a spiraling stream. Here, the spiraling stream produces centrifugal force, which causes bubbles and the flocks, which are lighter than water, to concentrate in a central portion and the water to move outward.

When the polluted water reaches the upper portion of the inner chamber 134, only purified water having the flocks separated therefrom flows out of the inner cylinder 131 through the small holes 131a, and is drained through the drain outlet 128. The bubbles and flocks that have concentrated in the central portion of the inner chamber 134, together with part of the purified water, flow into the inner pipe 133, and is quickly drained through the drain outlet 133a.

In this way, it is possible to extract purified water and flocks separately from polluted water. Thus, no flocks collect inside the centrifugal force separator 140. This eliminates the trouble of removing the flocks by hand, and thus enhances the usability of the polluted water purifier. Moreover, by forming the inner chamber 134 in such a way that its inner diameter decreases from bottom to top, it is possible to gradually increase the pressure on the inner cylinder 131. This increases the volume of purified water drained through the drain outlet 128. It is to be understood that, in the polluted water purifiers 53 to 55 of the third to fifth embodiments (see FIGS. 5 to 7), a centrifugal force separator 140 may be provided instead of the filtering device 107.

<Ninth Embodiment>

Figure 13:
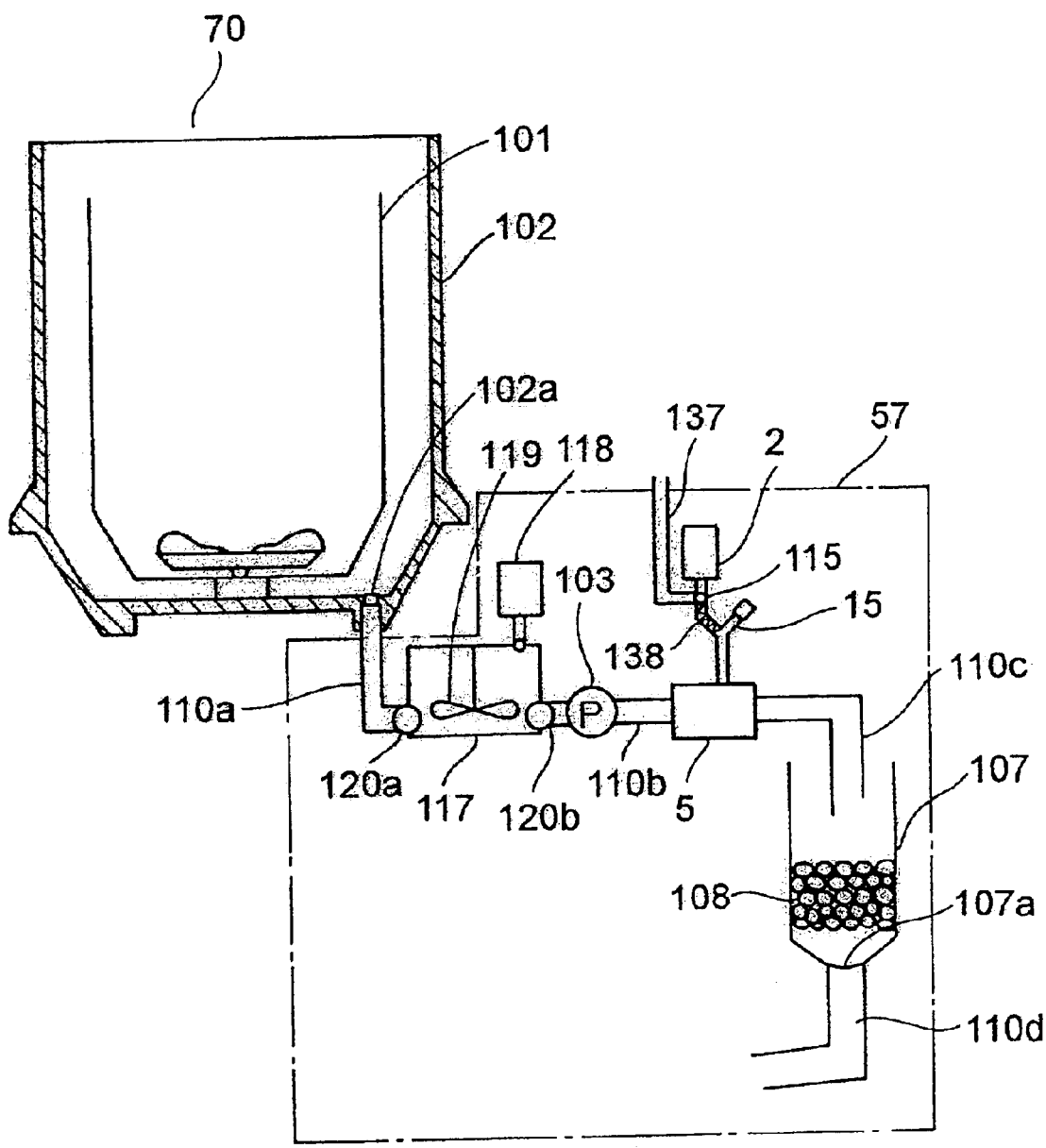
FIG. 13 is a sectional view showing the washing machine incorporating a polluted water purifier of a ninth embodiment of the invention.

FIG. 13 is a schematic sectional view showing a washing machine incorporating the polluted water purifier of a ninth embodiment. Such members as have their counterparts in the fourth embodiment shown in FIG. 6 described earlier are identified with the same reference numerals. In the polluted water purifier 57 of this embodiment, in one of the branches of the suction pipe 15 that communicates with the aspirator 5, a static mixer 138 for producing a turbulent flow is arranged. An injection pipe 137 through which to take in tap water is connected through a flow control valve 115 to between the static mixer 138 and the flocculant tank 2. In other respects, the structure here is the same as in the fourth embodiment.

In the washing machine 70 incorporating the polluted water purifier 57 structured as described above, polluted water, i.e. washing wastewater flows, under its own weight, through the drain outlet 102a of the water tub 102 and through the drain pipe 110a into the mixing bath 117. Here, if the downstream-side flow control valve 120b is closed, by closing the upstream-side flow control valve 120a a predetermined time thereafter, a predetermined volume of polluted water is stored in the mixing bath 117.

After the predetermined volume of polluted water has been stored in the mixing bath 117, the flocculant is added thereto from the auxiliary flocculant tank 118. Moreover, the agitating means 119 is driven, so that the polluted water having the flocculant added thereto is agitated in the mixing bath 117. As a result, the pollutants such as a surfactant present in the polluted water flocculate and form primary flocks.

When the pump 103 is driven with the downstream-side flow control valve 120b open, the polluted water containing the primary flocks flows into the aspirator 5. The aspirator 5 sucks in the flocculant stored in the flocculant tank 2. Simultaneously, tap water is introduced into the suction pipe 15 through the injection pipe 137. Thus, the flocculant is mixed with the tap water uniformly by being agitated in the static mixer 138; that is, the flocculant is diluted and then introduced into the aspirator 5. Moreover, air is sucked in through the suction pipe 15, and thus the first flocks grow larger by holding bubbles and thereby form secondary flocks.

The secondary flocks, together with the polluted water, flow into the filtering device 107, where the secondary flocks are filtered out by the filtering material 108 and are thereby separated. Thus, purified water cleared of the secondary flocks is drained through the drain outlet 107a of the filtering device 107 and the drain pipe 110d.

In this embodiment, it is possible to dilute the flocculant sucked in by the aspirator 5 to a predetermined concentration, and thereby reduce the amount of flocculant used.

An example will be presented below of the results of experiments in which washing wastewater was purified with the washing machine incorporating the polluted water purifier 57 of this embodiment. The experiments were conducted under the same conditions as in the fourth embodiments. Specifically, the flow rate of the polluted water was 5 L/min, the flow rate at which air was sucked in was 3 L/min, and the concentration of the surfactant was 242 mg/L. In the mixing bath 117, as a flocculant, 2 mL of a 33% water solution of polyaluminum chloride (the type PAC300A manufactured by Taki Chemical Co., Ltd., Japan) was added to every 1 L of the washing wastewater, which was then agitated for 30 seconds at 100 rpm and then for 30 seconds at 40 rpm.

To the aspirator 5, a 0.5% water solution of a nonionic polymer flocculant (the type N110 manufactured by Toagosei Co., Ltd., Japan) was supplied, and 3.1 mL of it was mixed with every 1 L of the polluted water. Moreover, the flocculant was diluted with tap water to 1.7 parts, and 2.5 mL of the diluted flocculant was mixed with every 1 L of the polluted water. As a result, in any of the experiments, 95% or more of the flocks were found to be 500 µm across or larger, and thus a sufficient effect was achieved even with the diluted flocculant. It is to be understood that the polluted water purifiers of the third, fifth, and sixth embodiments may be provided with a mechanism for diluting the flocculant.

<Tenth Embodiment>

Figure 14:
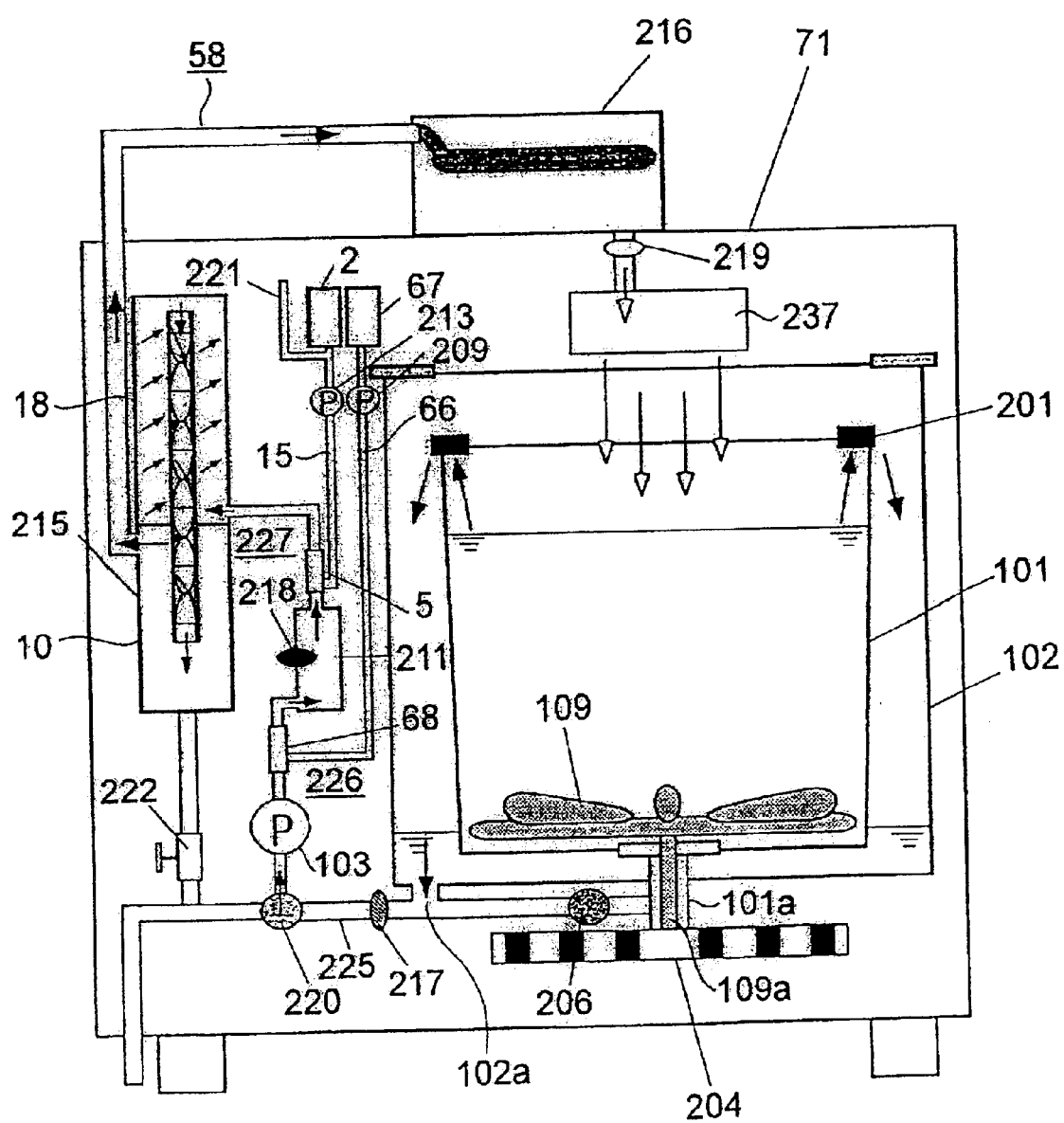
FIG. 14 is a sectional view showing the washing machine incorporating a polluted water purifier of a tenth embodiment of the invention.

FIG. 14 is a schematic sectional view showing a washing machine incorporating the polluted water purifier of a tenth embodiment. For convenience' sake, such members as have their counterparts in the first to fourth embodiments shown in FIGS. 1 to 13 described earlier are identified with the same reference numerals. The washing machine 71 has a washing tub 101 provided inside, at the bottom of which is arranged a pulsator 109 for agitating laundry. The washing tub 101 has a tub shaft 101a fitted to the bottom end thereof, and a pulsator shaft 109a provided integrally with the pulsator 109 is put through the tub shaft 101a.

Outside the washing tub 101 is arranged a water tub 102 for receiving the washing water spewed out of the washing tub 101 during dewatering. To the water tub 102 is fitted a motor 204. As a clutch (not shown) is switched, the motor 204 is coupled with either or both of the tub shaft 101a and the pulsator shaft 109a so as to drive the washing tub 101 and the pulsator 109 to rotate. The washing water inside the washing tub 101 is drained when a drain valve 206 is opened.

The washing machine 71 is provided with a circulation-type polluted water purifier 58. The polluted water purifier 58 uses the washing tub 101 and the water tub 102 as a polluted water tank, and is composed of a pump 103, a first mixer 226, a second mixer 227, a flock development module 215, and a separator 216 that are connected in series in this order so as to form a closed circuit, around which the polluted water is circulated under the pressure exerted thereon by the pump 103.

As the washing tub 101 rotates, the polluted water containing detergent and dirt inside the washing tub 101 flows over the rim thereof into the water tub 102 through dewatering holes (not shown) formed in a balancer 201 provided on top of the washing tub 101. When the drain valve 206 is open, the polluted water inside the washing tub 101 flows into a pipe 225, and the polluted water that has flowed into the water tub 102 flows through the drain outlet 102a into the pipe 225. A three-way valve 220 provided in the pipe 225 is so switched that the polluted water flows into the pump 103.

The pump 103 is connected to the first mixer 226. To the first mixer 226 are serially connected an auxiliary aspirator 68 for mixing the polluted water with a flocculant and an agitation cylinder 211. To the auxiliary aspirator 68, an auxiliary flocculant tank 67 for storing a flocculant is connected through a flocculant feed pump 209.

Figure 15:
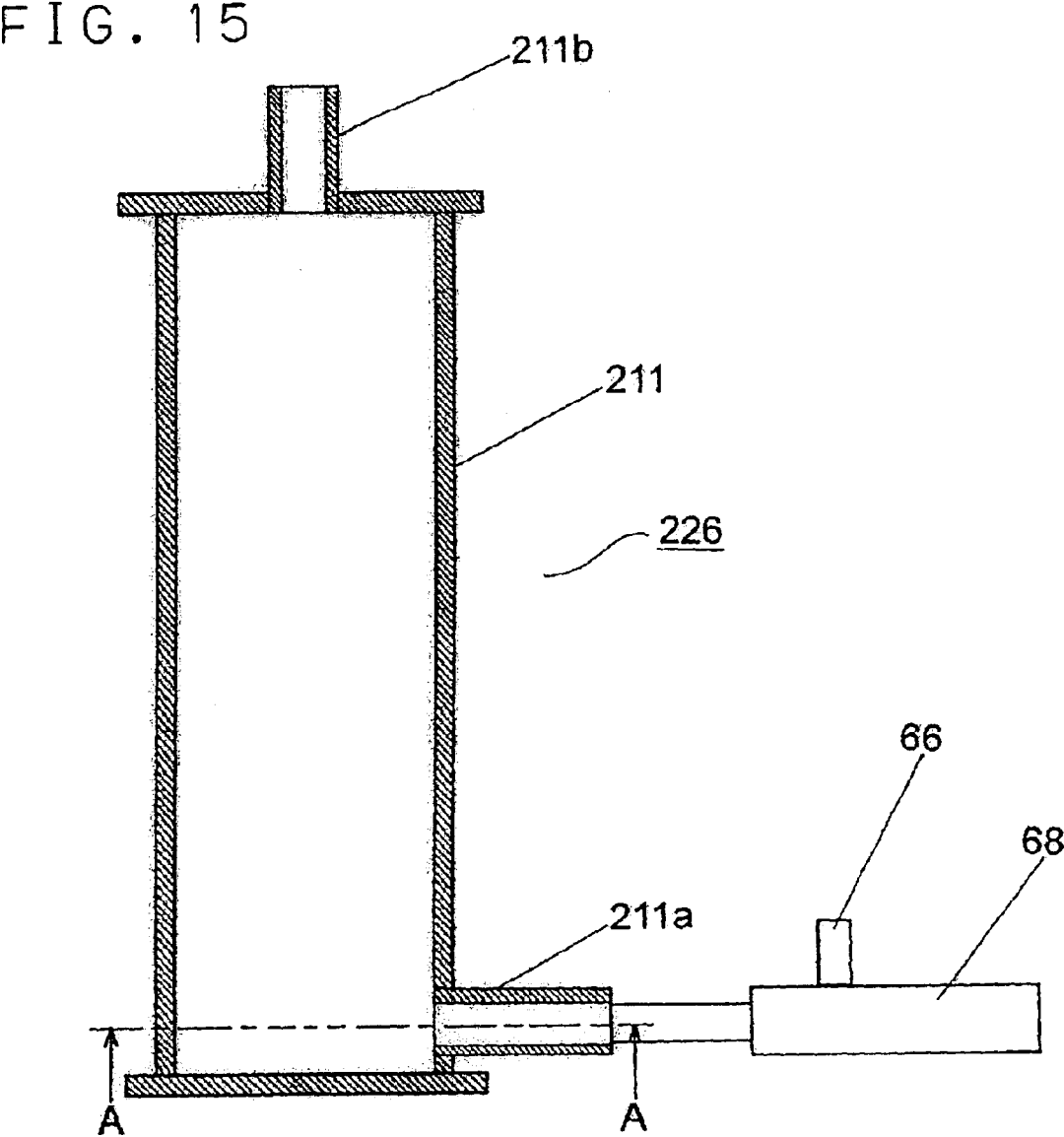
FIG. 15 is a side sectional view showing the first mixer of the washing machine incorporating a polluted water purifier of the tenth embodiment of the invention.
Figure 16:
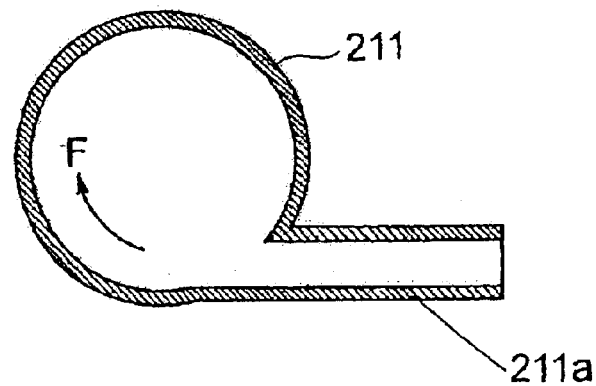
FIG. 16 is a sectional view taken along line A-A shown in FIG. 15.

FIG. 15 is a side sectional view showing a portion of the first mixer 226. FIG. 16 is a sectional view taken along line A-A shown in FIG. 15. The auxiliary aspirator 68 has the same structure as the aspirator described earlier and shown in FIG. 2. As the polluted water passes through the auxiliary aspirator 68, the flocculant is sucked in through the suction pipe 66 and is mixed with the flocculant.

The polluted water containing the flocculant flows into the agitation cylinder 211 through an inlet 211a. As FIG. 16 shows, the inlet 211a is arranged so as to be tangential to the peripheral surface of the agitation cylinder 211. Thus, the polluted water introduced into the agitation cylinder 211 is made into a spiraling stream that flows in the direction indicated by arrow F and is thereby agitated. The flocculant causes the pollutants such as a surfactant present in the polluted water to flocculate and form primary flocks about tens of micrometers across, and the polluted water flows out of the agitation cylinder 211 through an outlet 211b.

The flocculant may be of any type as long as it can neutralize the electric charge of the pollutants such as a surfactant and thereby make them flocculate. Thus, as in the embodiments describe earlier, it is possible to use an inorganic flocculant such as PAC or a cationic polymer flocculant.

The first mixer 226 is coupled to the second mixer 227. The second mixer 227 has an aspirator 5 that is coupled to the outlet 211b of the agitation cylinder 211. To the aspirator 5, a flocculant tank 2 for storing a flocculant is connected through a suction pipe 15, with a flocculant feed pump 213 provided on the way. An air suction line 221 branches off the suction pipe 15.

The aspirator 5 has the same structure as that of the first embodiment shown in FIG. 2 described earlier. As the polluted water passes through the aspirator 5, a flocculant and air are sucked in through the suction pipe 15 and are mixed with the polluted water.

The air suction line 221 may be arranged in any other position as long as it can feed air to the aspirator 5 at the same time that the flocculant is fed thereto. For example, the air suction line 221 may be provided between the aspirator 5 and the flocculant feed pump 213, or may be connected directly to the aspirator 5.

Figure 17:
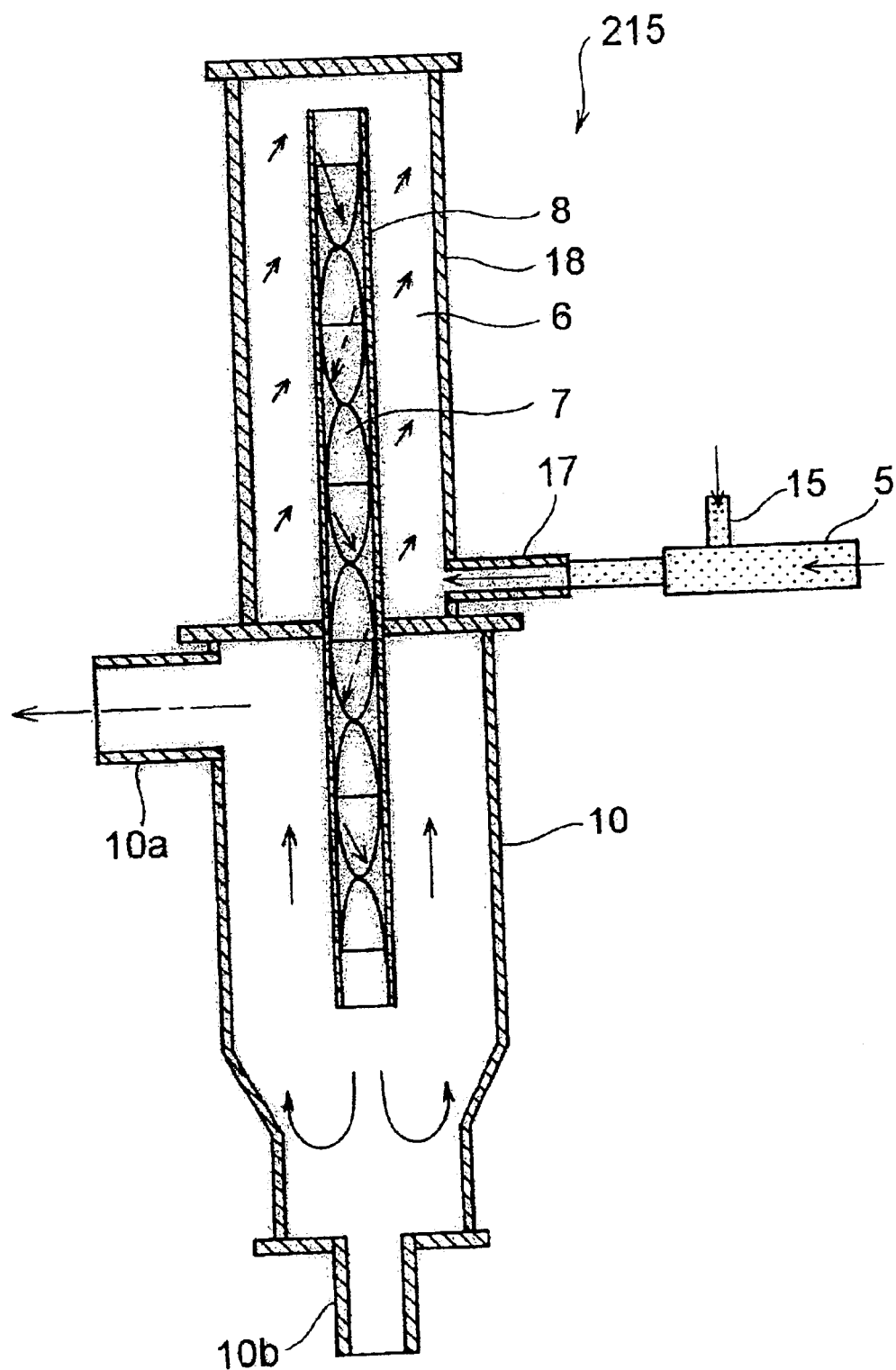
FIG. 17 is a side sectional view showing the second mixer of the washing machine incorporating a polluted water purifier of the tenth embodiment of the invention.

To the second mixer 227, a flock development module 215 for making the flocks grow is coupled. FIG. 17 is a side sectional view showing portions of the flock development module 215 and the second mixer 227. The flock development module 215 has an agitation cylinder 18 and a reservoir section 10 similar to those used in the first embodiment shown FIG. 1 described earlier.

Thus, as the polluted water introduced through the introduction pipe 17 is made into a spiraling stream the flocks flocculate, and, as the polluted water flows down the mixing cylinder 8, the flocks grow larger by holding bubbles and thereby form secondary flocks. Then, the polluted water is discharged into the reservoir section 10. As the polluted water is discharged into the reservoir section 10, its flow rate lowers. Thus, the secondary flocks holding bubbles, as they are temporarily stored in the reservoir section 10, remain large without being crushed by the polluted water flowing in the form of a jet.

In the bottom surface of the reservoir section 10, a drain outlet 10b is formed so that, when a valve 222 (see FIG. 14) is open, the polluted water stored in the reservoir section 10 is drained. This helps prevent the growth of bacteria and the development of freeze-fractures around the flock development module 215.

It is preferable that the flocculant supplied to the aspirator 5 is of a type that acts like adhesive that flocculates the primary flocks by attaching them to one another. For example, it is possible to use an anionic or nonionic polymer flocculant such as polyacrylamide.

The agitation cylinder 211 (see FIG. 15) and the flock development module 215 are so structured as to achieve agitation without the use of an external power source such as a motor. This helps simplify the structure and thereby reduce the size of the circulation-type polluted water purifier 58 as compared with conventional types.

Figure 18:
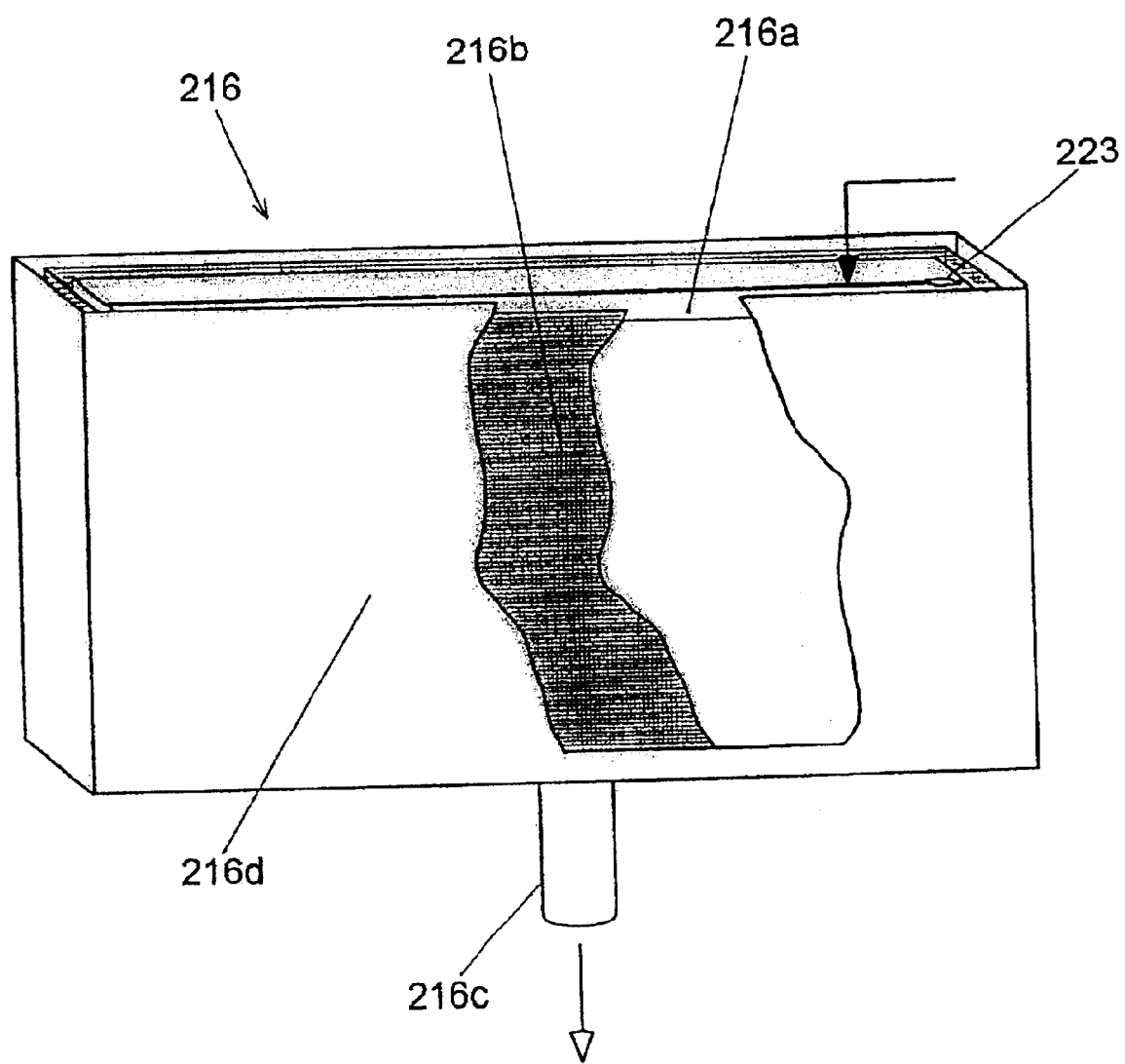
FIG. 18 is a perspective view showing the separator of the washing machine incorporating a polluted water purifier of the tenth embodiment of the invention.

On the top face of the washing machine 71 is arranged a separator 216 that is connected to the flock development module 215. FIG. 18 is a perspective view showing the separator 216. The separator 216 has a bag-shaped net 216a fitted therein as the innermost layer thereof. A fastener 223 provided in the top face of the net 261a is opened, and the polluted water containing the secondary flocks holding bubbles is introduced into the net 216a.

In this way, the secondary flocks are filtered out in the form of easy-to-drain, porous flocks separated from bubbles, or in the form of flocks holding bubbles and thus floating on the water surface. This makes the net 216a less prone to clogging, and thus permits purified water to be drained at a substantially constant flow rate. The purified water cleared of the flocks flows through a support frame 216b provided outside the net 216a to inside an outermost frame 216d. Then, the purified water flows down naturally under its own weight through a purified water drain outlet 216c provided at the bottom of the outermost frame 216d, and flows through a discharge outlet 237 (see FIG. 14) into the washing tub 101.

It is preferable that the net 216a have meshes of about 300 μm. For example, it is possible to use a net made of polyester fiber as used in a commercially available washing net for delicate pieces of laundry, after forming the net into the shape of a bag. Such a net can be used again after disposing of the flocks collected therein and then cleaning it.

Figure 19:
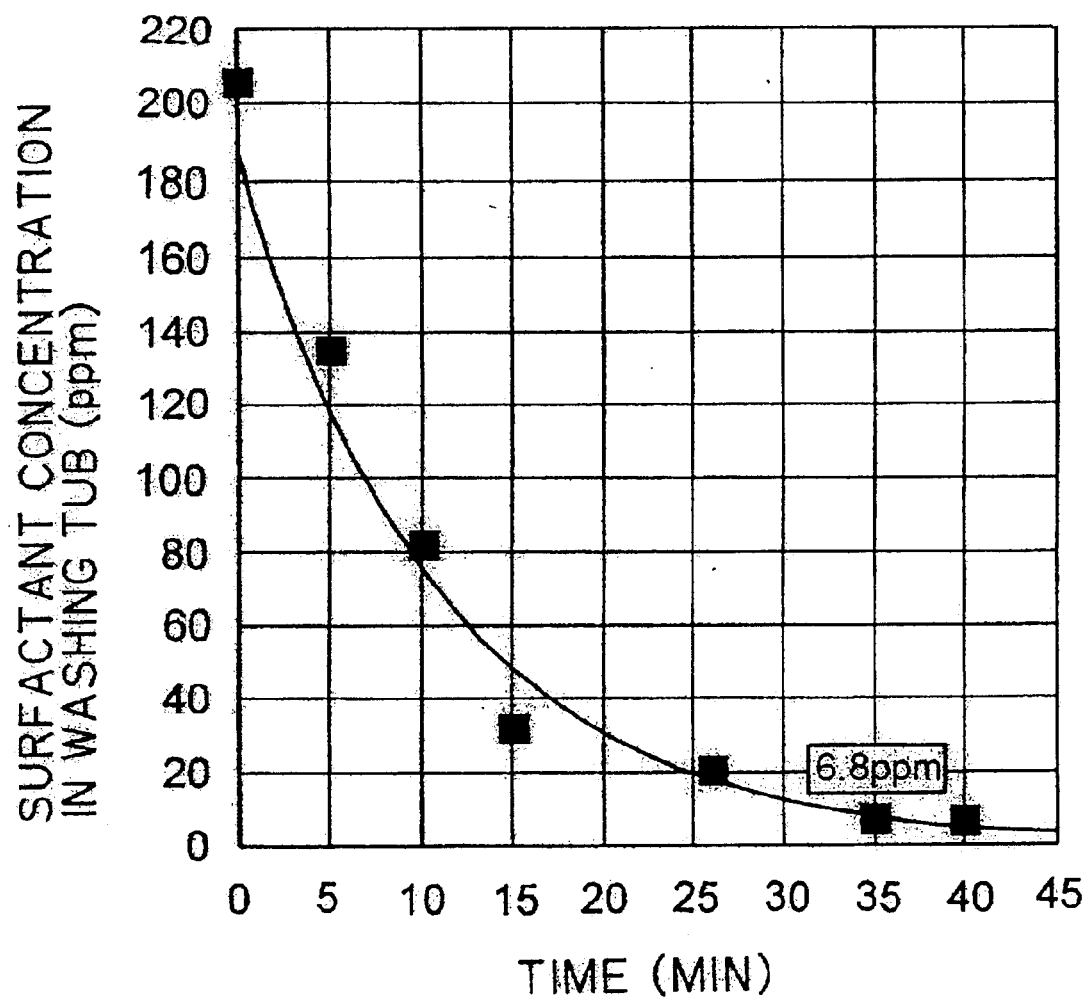
FIG. 19 is a graph showing the results of purification experiments conducted with the washing machine incorporating a polluted water purifier of the tenth embodiment of the invention.

FIG. 19 shows the results of experiments conducted to test the water-purifying performance of the washing machine 71 incorporating the polluted water purifier 58 of this embodiment. Along the vertical axis is taken the surfactant concentration (in ppm) in the washing tub, and along the horizontal axis is taken the lapse of time (in minutes). First, an adequate amount of a commercially available synthetic detergent was added to 48 L of washing water (so that the surfactant concentration is about 200 ppm). Then, purification operation was performed while the washing water was circulated at a flow rate of 5 L/min (the volume of the agitation cylinder 211 was about 0.5 L, and the volume of the flock development module was about 1.5 L), and meanwhile the surfactant concentration in the washing tub 101 was measured in relation to the lapse of time.

As the flocculants that were mixed in the first and second mixers 226 and 227, PAC and polyacrylamide, respectively, were used. As a result, in about 25 minutes after the start of purification operation, the surfactant concentration in the washing tub dropped to 20 ppm, and in about 35 minutes, to 6.8 ppm. Thus, sufficient purification performance was achieved. This purification performance makes it possible to end rinsing just when purification operation is complete; that is, it is possible to complete washing without using any more water than has initially been thrown in.

It is also possible to additionally use a sensor for measuring the pollutant concentration or the degree of purification of the polluted water. Specifically, by arranging a sensor for measuring the pollutant concentration, the turbidity, the pH value, or the like of the polluted water in an appropriate position in the circulation-type polluted water purifier, it is possible to measure the pollutant concentration or the degree of purification of the polluted water and properly control the amounts in which to add the flocculants.

For example, in the example described above, a source water concentration sensor 217 for measuring the degree of contamination of the water from the washing tub 101 and the water tub 102 is provided. In the agitation cylinder 211, a primary flock concentration sensor 218 for measuring the concentration of primary flocks is provided. At the exit of the separator 216, a purification sensor 219 for measuring the degree of contamination of the purified water is provided. By evaluating the measurement results from these sensors with a microcomputer (not shown) provided in the washing machine 71 and controlling the operation of the flocculant feed pump 209 and the flocculant feed pump 213 accordingly, it is possible to minimize the waste of the flocculants.

<Eleventh Embodiment>

Figure 20:
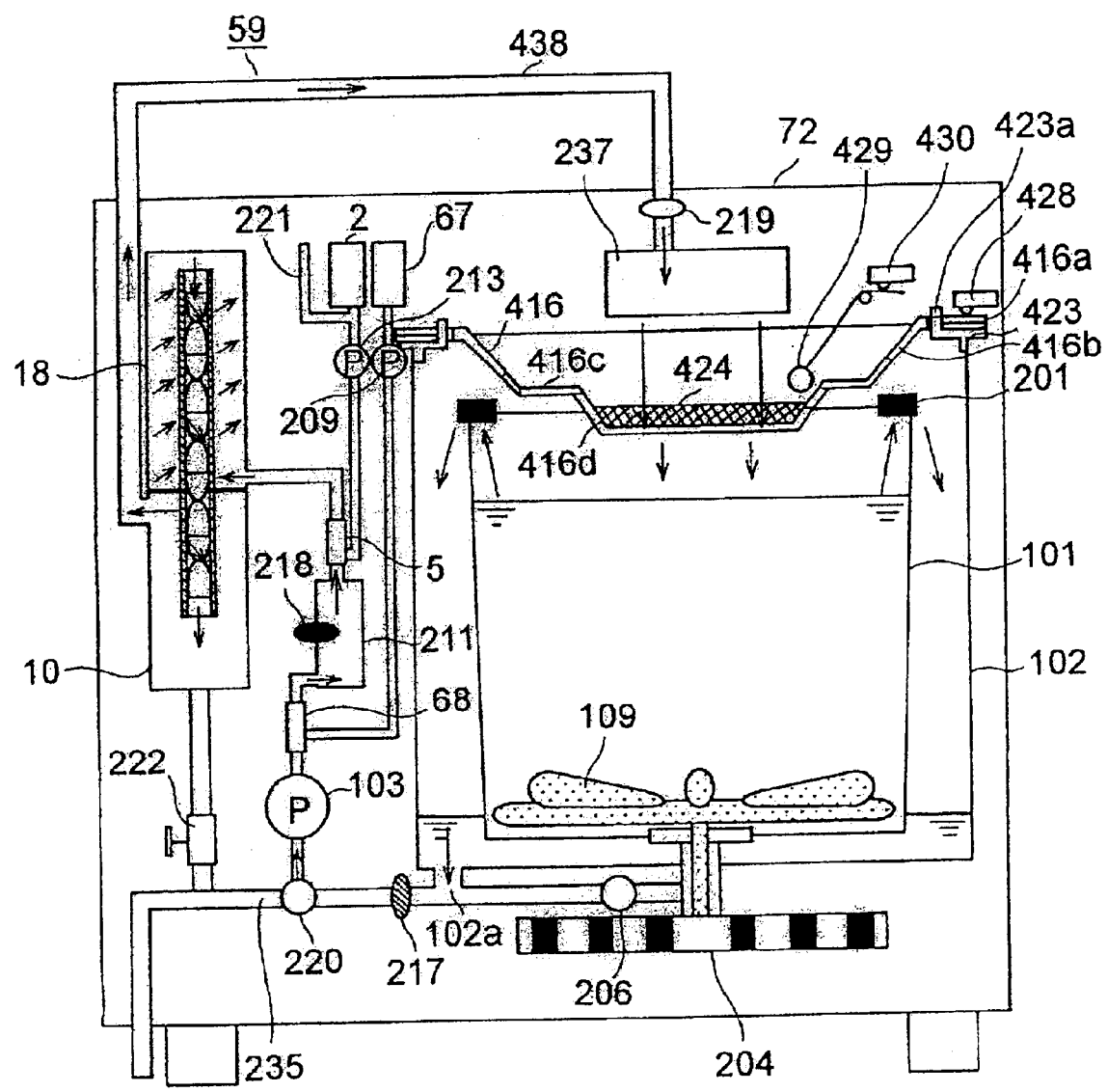
FIG. 20 is a sectional view showing the washing machine incorporating a polluted water purifier of an eleventh embodiment of the invention.

FIG. 20 is a side sectional view showing a washing machine incorporating the polluted water purifier of an eleventh embodiment. For convenience' sake, such members as find their counterparts in the tenth embodiment shown in FIGS. 14 to 17 described above are identified with the same reference numerals. The polluted water purifier 59 of this embodiment has the same structure as that of the tenth embodiment described above except that the former has a differently structured separator 416 for filtering out and separating flocks. In other respects, the structure here is the same as in the tenth embodiment.

The separator 416 is detachably fitted, at locking portions 416a thereof, to hook portions 423a of a water tub cover 423. It is preferable that the separator 416 and the water tub cover 423 be formed as a single member so that they can be integrally fitted to and detached from the water tub 102. This helps reduce the number of components.

In the washing machine structured as described above, first the separator 416 is detached, then laundry is put in the washing tub 101, and then the separator 416 is fitted back. This starts washing operation. At the locking portions 416a of the separator 416, a separator presence sensor 428 is provided so that washing operation is not started unless the separator 416 is found to be fitted.

In this way, as will be described later, it is possible to prevent the flocks 424 flocculated by the polluted water purifier 59 from flowing into the washing tub 101. Alternatively, when the separator presence sensor 428 does not detect the presence of the separator 416, the three-way valve 220 may be so switched that polluted water, i.e. washing wastewater, does not flow into the polluted water purifier 59 but is drained through a drain pipe 235.

When washing operation is started, tap water is supplied to the washing tub 101 through a water feed inlet (not shown). When the water reaches a predetermined level, the supply of water is stopped, and the motor 204 is driven to rotate the pulsator 109 so that a washing process is performed. When a predetermined time has elapsed and the washing process is complete, the drain valve 206 is opened and the washing wastewater flows into the drain pipe 235. Alternatively, the motor 204 may be so driven as to rotate the washing tub 101 at a high rotation rate so that the washing wastewater flows over the rim of the washing tub 101 into the water tub 102 through the dewatering holes (not shown) formed in the fluid balancer 201 and then flows through the drain outlet 102a into the drain pipe 235.

The three-way valve 220 is so switched that the polluted water is supplied to the pump 103 so as to be delivered to the auxiliary aspirator 68. The flocculant stored in the auxiliary flocculant tank 67 is sucked into the auxiliary aspirator 68. The flocculant and the polluted water are mixed in the auxiliary aspirator 68, and are then introduced into the agitation cylinder 211. The polluted water and the flocculant introduced into the agitation cylinder 211 are made into a spiraling stream that flows in the direction indicated by arrow F shown in FIG. 17 described earlier and are thereby agitated. As a result, primary flocks about tens of micrometers across are formed and are delivered through the outlet to the aspirator 5.

The aspirator 5 sucks in the flocculant stored in the flocculant tank 2 and air through the air suction line 221. The air and the polluted water containing the flocculant are mixed in the aspirator 5, and are then introduced through the introduction pipe 17 (se FIG. 17) into the flock development module 215.

Inside the agitation cylinder 18, as the polluted water is made into a spiraling stream, the flocks flocculate, and, as the polluted water flows down the mixing cylinder 8 (see FIG. the flocks grow larger by holding bubbles and thereby form secondary flocks. Then, the polluted water is discharged into the reservoir section 10, and is drained through an outlet 10a.

The polluted water that has flowed out of the flock development module 215 flows through a coupling pipe 438, and is then discharged through the discharge outlet 237 into the separator 416. The separator 416 is composed of a frame portion 416b and a filter portion 416c fitted therein. The frame portion 416b is formed as a resin molding, and the filter portion 416c is made of polyester fiber or the like as used in a commercially available washing net for clothing.

As the polluted water passes through the filter portion 416c, the secondary flocks are collected, and thus purified water cleared of the secondary flocks is fed into the washing tub 101. Since the filter portion 416c is so formed as to cover the opening of the washing tub 101, the secondary flocks can be collected over a wide area. This helps prevent clogging in the separator 416 and thereby reduce the frequency of the troublesome disposal of the flocks. In this way, it is possible to enhance the usability of the washing machine.

When a sufficient volume of purified water has been stored in the washing tub 101, the motor 204 is driven to rotate the pulsator 109 so that a rinsing process is performed. When a predetermined time has elapsed and the rinsing process is complete, the drain valve 206 is opened, and the three-way valve 220 is so switched that polluted water, i.e. washing wastewater, is drained through the drain pipe 235 to outside. After the rinsing process, a finish rinsing process may be performed with tap water fed into the 101.

When the washing water inside the washing tub 101 has been drained, the motor 204 is driven to rotate the washing tub 101 at a high rotation rate so that a dewatering process is performed. As the washing tub 101 is rotated at a high rotation rate, the washing water (purified water) inside the washing tub 101 flows over the rim thereof into the water tub 102 through the dewatering holes (not shown) formed in the fluid balancer 201 and then flows through the drain outlet 102a into the drain pipe 235. In this way, the laundry is dewatered, and now the washing thereof is complete.

Above the separator 416, a flock detecting switch 430 having a float 429 is provided. When more than a predetermined volume of flocks 424 has been accumulated in the filter portion 416c, the flock detecting switch 430 detects it, and an alerting member (not shown) such as a buzzer or an indicator lamp alerts the user. The user then detaches the separator 416 and disposes of the flocks 424.

In the washing, rinsing, and dewatering processes, as the pulsator 109 and the washing tub 101 rotate, the water tub 102 vibrates. Since the separator 416 is formed integrally with the water tub 102, the vibration of the water tub 102 is transmitted to the separator 416, and thus the secondary flocks collected in the separator 416 vibrate. Since the separator 416 is arranged over a wide area above the water tub 102, the vibration permits the flocks 424 to move freely on the filter portion 416c.

Thus, the secondary flocks can easily be dewatered so as to be dried. Since the secondary flocks contain bubbles, they dry easily, forming porous flocks as they dry. Thus, the disposal of the flocks 424 does not require separation from water. This makes the disposal of the flocks easy.

Moreover, substantially in a central portion of the separator 416, a recess 416d is formed. The vibration transmitted to the separator 416 causes the secondary flocks or the porous flocks to collect in the recess 416d. This makes the disposal of the flocks 424 easier. Moreover, in the dewatering process, the high-rate rotation of the washing tub 101 produces a spiraling flow of air. Since the recess 416d protrudes into the washing tub 101, this flow of air makes contact with the secondary flocks in the recess 416d and thereby prompts the drying of the secondary flocks.

<Twelfth Embodiment>

Figure 21:
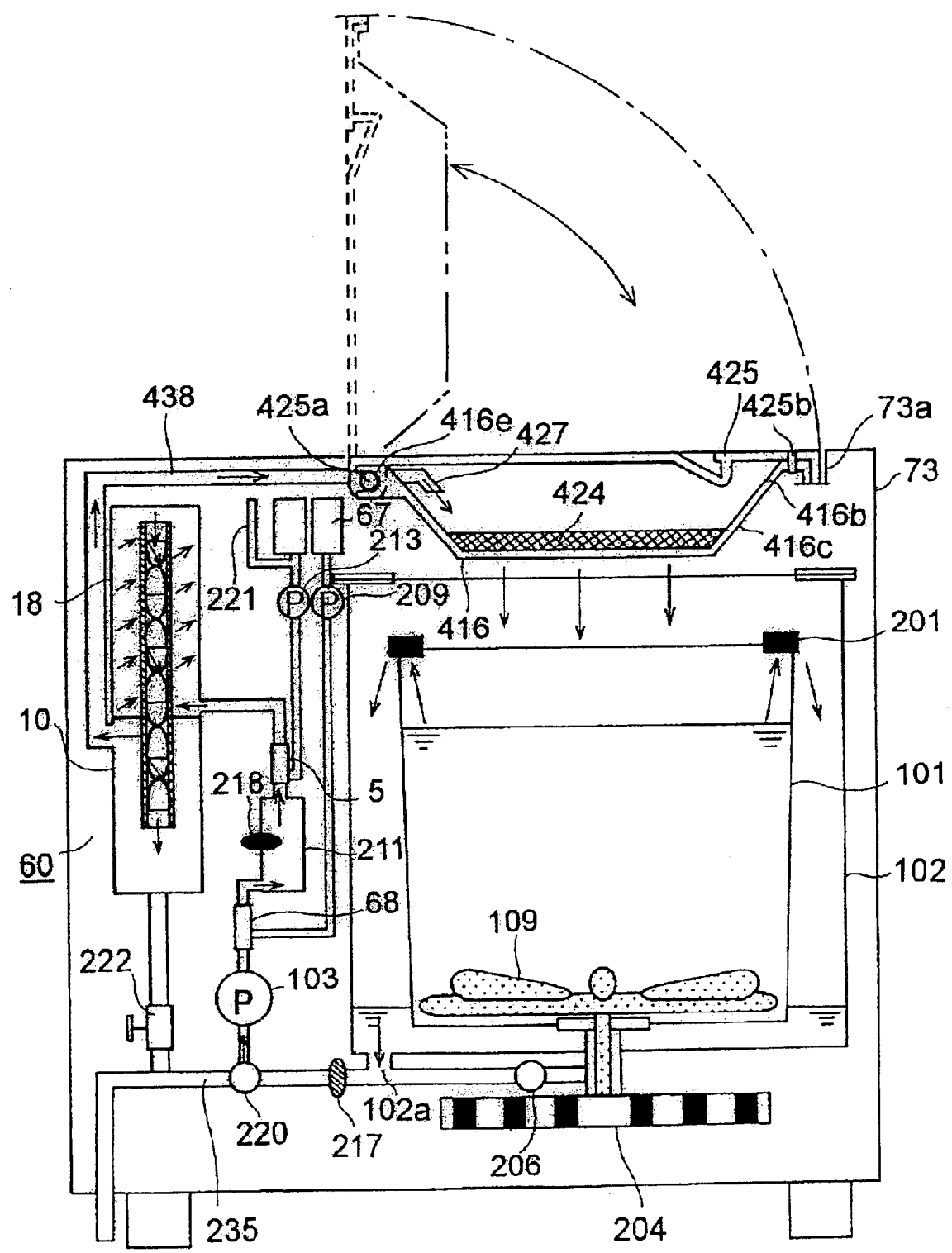
FIG. 21 is a sectional view showing the washing machine incorporating a polluted water purifier of a twelfth embodiment of the invention.

FIG. 21 is a side sectional view showing a washing machine incorporating the polluted water purifier 60 of a twelfth embodiment. For convenience' sake, such members as find their counterparts in the eleventh embodiment shown in FIG. 20 described above are identified with the same reference numerals. The only difference from the eleventh embodiment is that the separator 416 can be detachably fitted to a lid 425 for opening and closing the space above the water tub 102. In other respects, the structure here is the same as in the eleventh embodiment.

The lid 425 is pivoted, at a shaft portion 425a thereof, on the body of the washing machine 73. The separator 416 has one end thereof formed into a fit-on portion 416e that is fit on the shaft portion 425a, and has the opposite end thereof locked onto a locking portion 425b that is provided on the lid 425. This permits the separator 416 to rotate together with the lid 425. When laundry is put in the washing tub 101 and the lid 425 is closed, the separator 416 is put into position by a stopper 73a provided in the washing machine 73, and washing operation is started.

As in the tenth and eleventh embodiments, the polluted water purifier 60 flocculates the pollutants present in the polluted water, and as a result the polluted water containing the secondary flocks is discharged through a discharge outlet 427 into the separator 416. The secondary flocks are collected by the filter portion 416c, and accumulate thereon. The locking portion 425b of the lid 425 locks the separator 416 with a relatively weak force, and therefore, when the flocks 424 accumulated in the separator 416 amounts to a predetermined volume, their weight unlocks the separator 416.

Thus, with the flocks 424 accumulated in the separator 416, even when the lid 425 is opened on completion of washing operation, the separator 416 does not rotate together, but remains on the body of the washing machine 73. Then, the user detaches the separator 416 from the shaft portion 425a and disposes of the flocks 424.

In this embodiment, as in the eleventh embodiment, the flocks can be collected over a wide area. This helps prevent clogging in the separator 416 and thereby reduce the frequency of the troublesome disposal of the flocks. Moreover, since the flocks 424 can move freely on the separator 416, they are dewatered by the vibration transmitted from the body of the washing machine, and thus can be dried before being disposed of, though with a lower effect than in the eleventh embodiment. Furthermore, as long as the volume of accumulated flocks 424 is small, it is not necessary to detach the separator 416. This enhances the usability of the washing machine 73.

The polluted water purifier 60 here is of a type that flocculates the detergent components and dirt present in the washing wastewater by adding a flocculant thereto. However, it may be of a type that flocculates detergent components and dirt by dissolving a metal electrode through electrolysis.

<Thirteenth Embodiment>

Figure 22:
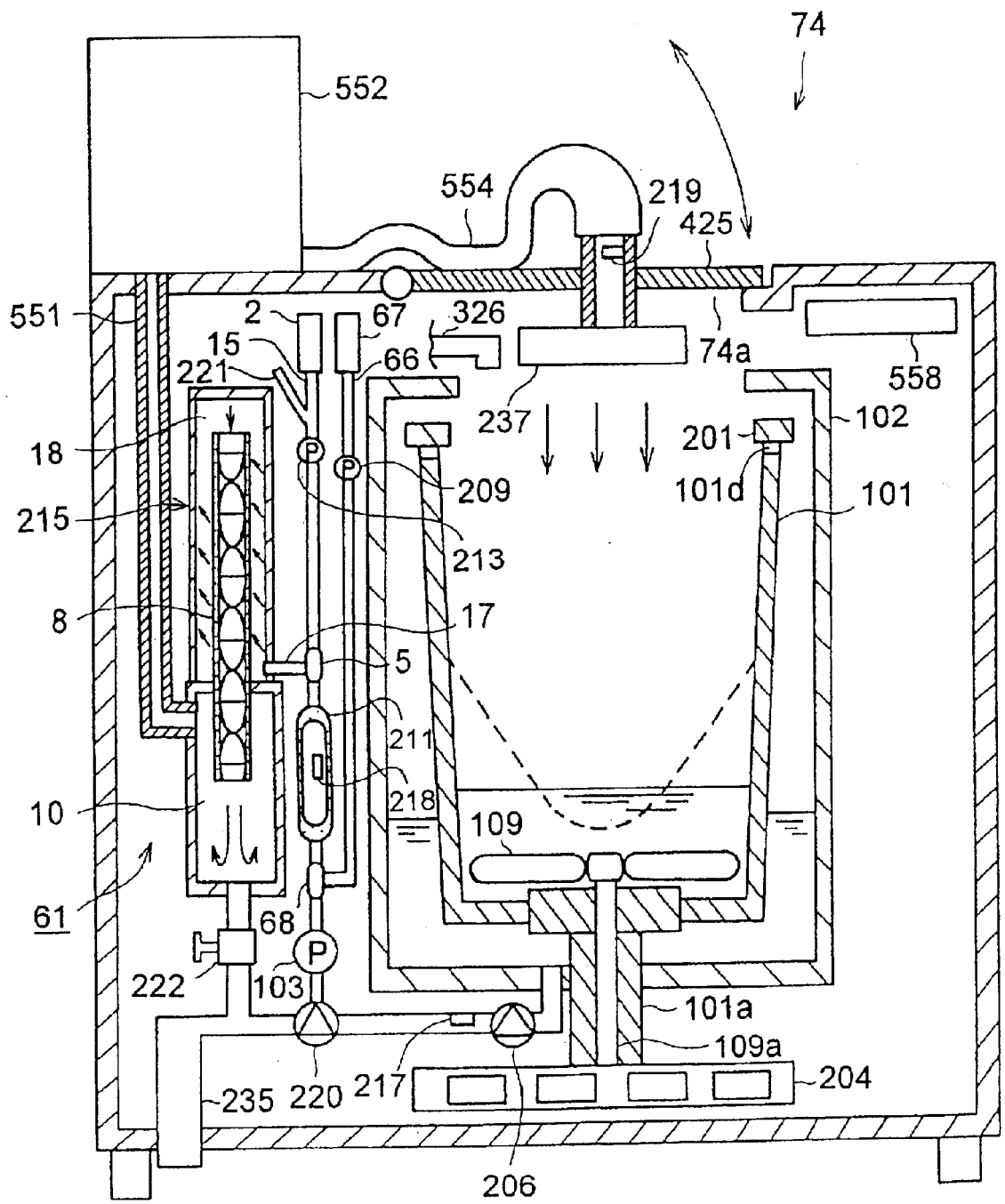
FIG. 22 is a sectional view showing the washing machine incorporating a polluted water purifier of a thirteenth embodiment of the invention.

FIG. 22 is a side sectional view showing a washing machine incorporating the polluted water purifier of a thirteenth embodiment. For convenience' sake, such members as find their counterparts in the tenth to twelfth embodiments shown in FIGS. 14 to 21 described earlier are identified with the same reference numerals. The polluted water purifier 61 of this embodiment has the same structure as the polluted water purifier 58 of the tenth embodiment except that the former has a separator 552, for separating flocks, arranged in a rear portion of the top face of the washing machine 74. The separator 552 is coupled to the flock development module 215 by a coupling pipe 55l. The discharge outlet 237 is arranged so as to face substantially the center of the washing tub 101, and is coupled to the separator 552 by a flexible hose 554. In other respects, the structure here is the same as in the tenth embodiment.

Next, the operation of the washing machine 74 will be described. The lid 425 is opened, and laundry is put in the washing tub 101 through a laundry inlet 74a. When the lid 425 is closed and a start switch (not shown) is pressed, an adequate volume of tap water for the volume of laundry is supplied from a water feeder 326. From a detergent adder (not shown) attached to the water feeder 326, a predetermined amount of detergent is fed, together with the tap water, into the washing tub 101. When the water in the washing tub 101 reaches a predetermined level, a washing process is started. Specifically, the pulsator 109 is rotated in the forward and reverse directions according to a predetermined operation pattern so as to agitate the washing water having the detergent dissolved into it and thereby achieve the washing of the laundry.

When a predetermined time has elapsed in the washing process, the washing water flows out of the water tub 102 into the drain pipe 235, and starts being circulated. That is, midway through the washing process, the washing tub 101 starts rotating. Here, the pulsator 109 rotates together in synchronism. When the washing tub 101 rotates, the water surface inside the washing tub 101 becomes cup-shaped as indicated by a broken line in FIG. 22, with the center sinking and the periphery rising along the inner wall of the washing tub 101.

When the rotation rate of the washing tub 101 becomes sufficiently high, the water overflows through discharge openings 101d formed around the upper end of the washing tub 101. Under centrifugal force, the washing water that has overflowed pounds on the inner wall of the water tub 102 and flows into the space between the washing tub 101 and the water tub 102.

The washing water moves from the washing tub 101 to the water tub 102, and never moves in the opposite direction. The washing water that has flowed into the space between the washing tub 101 and the 102 collects there without flowing back into the washing tub 101. When a predetermined volume of water has accumulated, the drain valve 206 is opened, and the three-way valve 220 is so switched as to lead to the pump 103, which then starts being driven.

When the water starts flowing from the pump 103 to the agitation cylinder 211, the sucking action of the auxiliary aspirator 68 produces a sucking force in the suction pipe 66, and thus the flocculant (for example, polyaluminum chloride) stored in the auxiliary flocculant tank 67 is added to the washing water. The amount of flocculant added per unit time is controlled by the flocculant feed pump 209. The washing water is, together with the flocculant, agitated in the agitation cylinder 211, with the result that the electric charge of surfactant and dirt components is neutralized, and primary flocks tens of micrometers across are formed.

The washing water that has flowed out of the agitation cylinder 211 flows into the aspirator 5, and the flocculant (for example, polyacrylamide) stored in the auxiliary flocculant tank 67 is added thereto through the suction pipe 15. The amount of flocculant added per unit time is controlled by the flocculant feed pump 213. Here, air is sucked in through the air suction line 221 so that the flocculant is, in the formed of a mixture with air, added to the washing water.

The water, after the secondary flocculant mixed with air has been added thereto, flows through the introduction pipe 17 into the agitation cylinder 18. Inside the agitation cylinder 18, the flocks grow into secondary flocks holding bubbles and hundreds of micrometers across. The water containing the secondary flocks is fed through the coupling pipe 551 to the separator 552, where the secondary flocks are collected by a net (not shown) provided in the separator 552. Thus, only purified washing water flows through the hose 554, and is discharged through the discharge outlet 237 to a central portion of the washing tub 101. In this way, the washing water is circulated.

As a result of the washing water being circulated as described above, the laundry is rinsed gradually. In the rinsing process, the washing tub 101 rotates intermittently so that, every time it rotates, the water inside the washing tub 101 moves to the water tub 102. In the space between the washing tub 101 and the water tub 102, a fixed volume of water is stored, and this water is agitated every time the washing tub 101 rotates. This permits the detergent and dirt components present in the washing wastewater fed to the polluted water purifier 61 to spread uniformly, and thus helps stabilize the purification operation.

Figure 23:
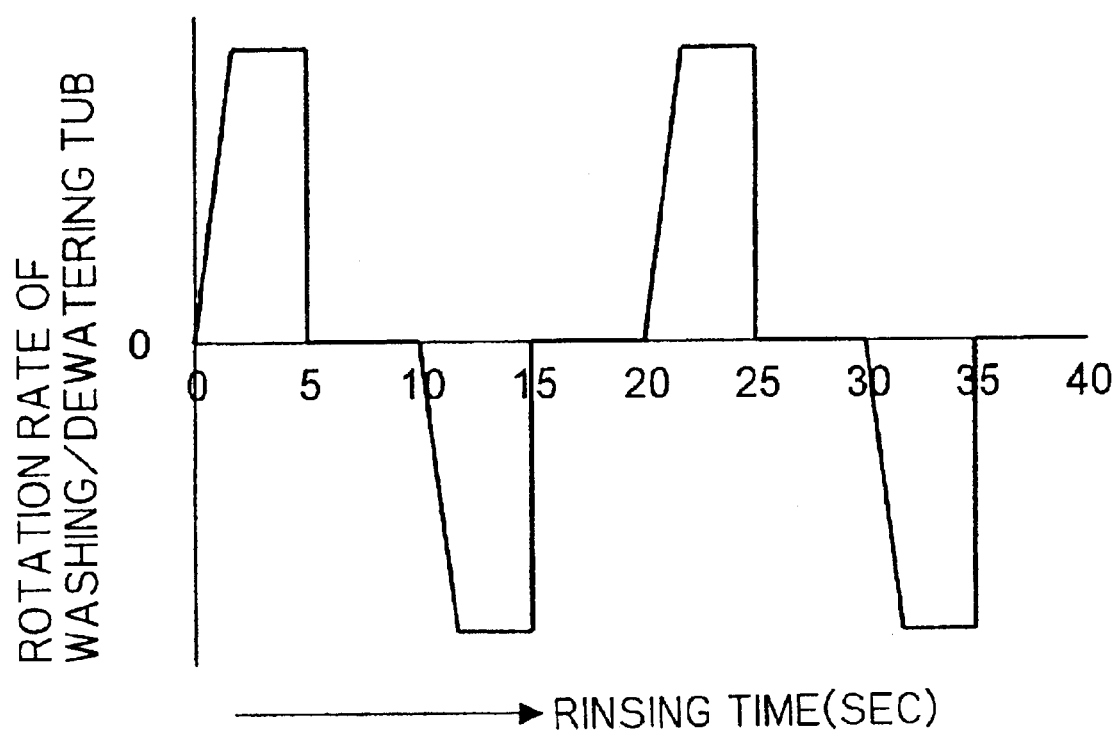
FIG. 23 is a graph showing the rotation conditions of the washing tub of the washing machine incorporating a polluted water purifier of the thirteenth embodiment of the invention

FIG. 23 shows the pattern of rotation of the washing tub 101 in the rinsing process. Along the vertical axis is taken the rotation rate of the washing tub 101, with rotation rates in the forward direction plotted above zero and rotation rates in the reverse direction plotted below zero. Along the horizontal axis is taken the time of rinsing. This rotation pattern will be described below, together with an example of the values actually adopted in the washing machine.

If it is assumed that the washing machine 74 has a washing capacity of 8 kg and that the laundry weighs 5.6 kg, washing is performed with about 42 L of water. To store part of this water in the space between the washing tub 101 and the water tub 102, the washing tub 101 is rotated clockwise for five seconds at a maximum rotation rate of about 140 rpm, is then kept at rest for five seconds, is then rotated counter-clockwise for five seconds at the same maximum rotation rate, and this sequence is repeated.

As a result, the water periodically rises up the inner wall of the washing tub 101 and overflows through the discharge openings 101*d*. The water that has overflowed is fed to the polluted water purifier 61 at a flow rate of about 5 L/min by the action of the pump 103 so as to be continuously purified and returned to the washing tub 101. In this way, the water in the washing tub 101 is gradually diluted with the purified water, and thus rinsing is achieved.

As the washing tub 101 rotates, the pulsator 109 rotates together in synchronism. Thus, in the rinsing process, the pulsator 109 does not agitate the laundry; that is, rinsing is achieved by water simply passing through the laundry. This helps prevent damage to the laundry resulting from the friction with the pulsator 109.

Moreover, as the washing tub 101 rotates, the laundry is held in a raised position along the inner wall of the washing tub 101. Since the washing tub 101 is of the so-called holeless type that is closed all over its peripheral surface, the purified water discharged to the central portion of the washing tub 101 raises evenly along the inner wall of the washing tub 101, and thus have an even rinsing effect on the laundry sticking to the inner wall.

The rotation of the washing tub 101 is controlled in the following special manner. When the rotation of the washing tub 101 is inverted from the forward to the reverse direction and vice versa, the washing tub 101 is brought to a sudden rest by hard braking. This makes the flow of water inside the washing tub 101 dynamic and thereby enhances the efficiency of rinsing.

When rinsing has progressed sufficiently, specifically when the turbidity detected by the source water concentration sensor 217 has fallen below a predetermined pollutant concentration, under the control of a controller 558, the pump 103 is stopped and the three-way valve 220 is switched to the position for draining. Now, the water stored in the space between the washing tub 101 and the water tub 102 is no longer circulated but is drained through the drain pipe 235. Since this water has been purified through the polluted water purifier 61, it can be discharged to the sewage system without increasing the burden on the environment. Simultaneously, the washing tub 101 is rotated for dewatering so that the laundry is dewatered. The water removed from the laundry here also has already been purified, and thus does not increase the burden on the environment. After a predetermined time of dewatering, the rotation of the washing tub 101 is stopped. Now, all the washing processes are complete.

Rinsing may be ended with rinsing using the purified water obtained from the polluted water purifier 61. Alternatively, finish rinsing may be additionally performed by stopping the circulation of rinsing water at the end of rinsing and then switching the three-way valve 220 to the draining position with tap water supplied from the water feeder 326. Finish rinsing is achieved here by shower dewatering, but may be achieved by any other rinsing method. This further enhances the cleanliness inside the washing tub 101.

Figures 24, 25:
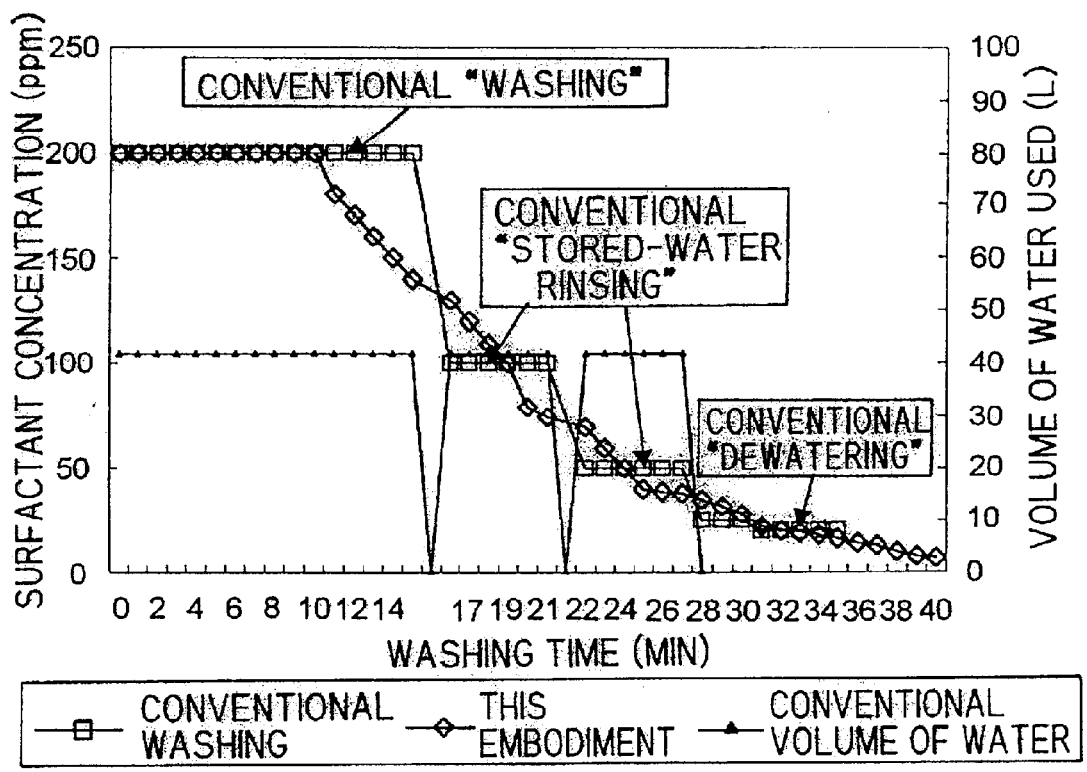
FIG. 24 is a graph showing the results of purification experiments conducted with the washing machine incorporating a polluted water purifier of the thirteenth embodiment of the invention.
FIG. 25 is a table showing the results of purification experiments conducted with the washing machine incorporating a polluted water purifier of the thirteenth embodiment of the invention.

FIG. 24 shows the results of experiments conducted to compare washing performed with the washing machine of this embodiment and washing performed with a conventional washing machine that is not provided with a polluted water purifier. Along the horizontal axis is taken the time of washing (in minutes), and along the vertical axis is taken the concentration (in ppm) of the surfactant that is the principal ingredient of the detergent.

Shown together in the figure is the volume of water (in L) used in conventional washing. In "conventional washing," rinsing was achieved by "stored-water rinsing," meaning that water was supplied and drained for every session of rinsing. This required a large volume of water. By contrast, in rinsing according to "this embodiment," the water used in washing was used again in rinsing. Thus, rinsing was achieved with a smaller volume of water than in "conventional washing" but nevertheless with efficacy comparable to stored-water rinsing.

FIG. 25 shows the results of measurement of the concentration of the surfactant present in the water drained during final dewatering, as compared between in conventional rinsing and in rinsing using the washing machine of this embodiment. As these results show, "rinsing with purified water" according to this embodiment resulted in a lower surfactant concentration, and was thus more effective in removing detergent components from laundry than "conventional rinsing." With respect also to the turbidity of the water drained during final dewatering, which was measured simultaneously, the former resulted in a far lower value than the latter. This indicates that "rinsing with purified water" according to this embodiment caused almost no fraying of fiber as results from friction in "conventional rinsing."

In the structure of this embodiment, various modifications are possible. For example, a holeless-type washing tub is not the only means to permit the movement of water from the washing tub to the water tub and prevent its movement in the opposite direction. The washing tub may have a plurality of dewatering holes formed in the peripheral wall thereof, with each of those dewatering holes fitted with a check valve that opens outward under centrifugal force.

When this washing tub is rotated at a high rotation rate, the check valves open and permit the water inside the washing tub to be discharged out of it; when the washing tub is at rest, the check valves close the holes and prevent the water from flowing from the water tub back into the washing tub. Purification of water may be achieved by any other method than by collecting pollutants by flocculating them with a flocculant. For example, it is possible to select an appropriate one among various methods used to purify water in general, such as those using a filter, activated carbon, a reverse osmosis membrane, and the like.

<Fourteenth Embodiment>

Figure 26:
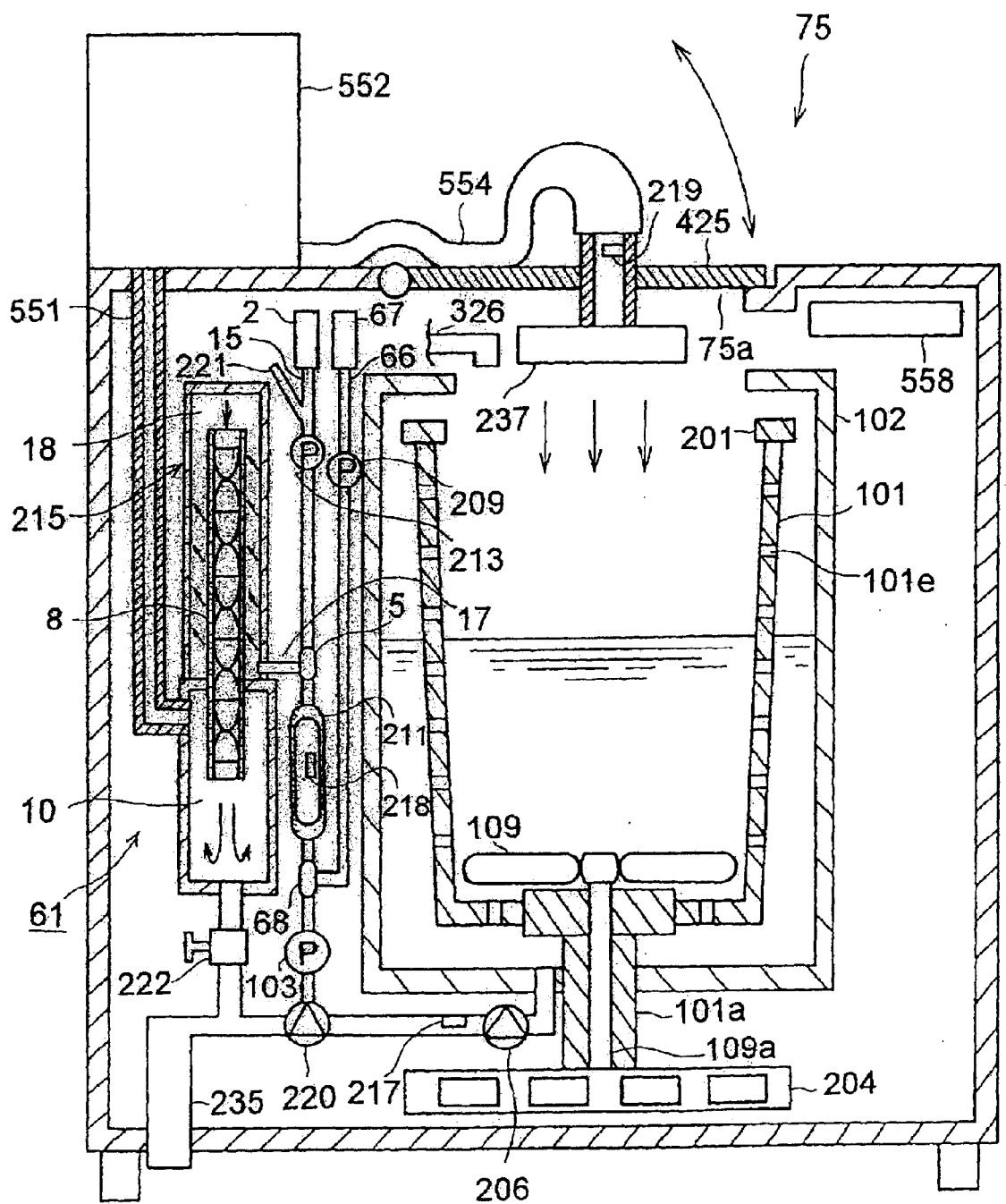
FIG. 26 is a sectional view showing the washing machine incorporating a polluted water purifier of a fourteenth embodiment of the invention.

FIG. 26 is a side sectional view showing a washing machine incorporating the polluted water purifier of a fourteenth embodiment. For convenience' sake, such members as find their counterparts in the thirteenth embodiment shown in FIG. 22 described earlier are identified with the same reference numerals. The washing machine 75 of this embodiment incorporates the same polluted water purifier 61 as that used in the thirteenth embodiment, but the washing tub 101 has a large number of dewatering holes 101*e* formed in the peripheral and bottom walls thereof. The spaces inside and outside the washing tub 101 communicate with each other through these dewatering holes 101*e*. Thus, as long as the washing tub 101 and the pulsator 109 are at rest, the water surfaces inside and outside the washing tub 101 are at equal levels.

The operation of the washing machine 75 of this embodiment will be described below. The lid 425 is opened, and laundry is put in the washing tub 101 through the laundry inlet 75*a*. When the lid 425 is closed and the start switch (not shown) is pressed, an adequate volume of tap water for the volume of the laundry is supplied from the water feeder 326. From the detergent adder (not shown) attached to the water feeder 326, a predetermined amount of detergent is fed, in the form mixed with the tap water, into the washing tub 101. When the water in the washing tub 101 reaches a predetermined level, a washing process is started. Specifically, the pulsator 109 is rotated in the forward and reverse directions according to a predetermined operation pattern so as to agitate the washing water having the detergent dissolved into it and thereby achieve the washing of the laundry.

When a predetermined time has elapsed in the washing process, the drain valve 206 is opened and the three-way valve 220 is so switched as to lead to the pump 103 so that the water starts being circulated for purification. Purified water is discharged to the central portion of the washing tub 101. The water receives detergent and dirt components from the laundry, and then flows through the dewatering holes 101e out of the washing tub 101. To enhance the efficiency of rinsing, the pulsator 109 or the washing tub 101 is rotated at a low rotation rate in the forward and reverse directions so as to shake the laundry. As the washing water is purified while it is circulated in this way, the water in the washing tub 101 and the water tub 102 is gradually diluted with the purified water.

When the turbidity detected by the source water concentration sensor 217 has fallen below a predetermined pollutant concentration, under the control of the controller 558, the rinsing process is ended, and the circulation of the water is stopped. The three-way valve 220 is switched to the position for draining, and thus the water in the washing tub 101 and the water tub 102 is drained. After draining, the washing tub 101 starts rotating for dewatering so that the laundry is dewatered. After rotating for dewatering for a predetermined time, the washing tub 101 stops rotating. Now, all the washing processes are complete. A finish rinsing process using tap water may be performed at the last stage of the rinsing process.

The washing machines of the tenth to twelfth embodiments may be so structured that, as in the fourteenth embodiment, the washing tub 101 has a large number of dewatering holes formed in the peripheral surface thereof. In this case, the washing and rinsing processes are performed with washing water stored in the water tub 102, and the dewatering process is performed by rotating the washing tub 101 so that the washing water is drained through the dewatering holes. These washing machines achieve the same effects as described above. Moreover, the washing machines of the tenth to fourteenth embodiments may be so structured that the washing and rinsing processes are performed by using the pulsator arranged in the water tub 102 with washing water stored in the water tub 102, and that the dewatering process is performed by using a different type of dewatering device. These washing machines achieve the same effects as described above.

<Fifteenth Embodiment>

Figure 27:
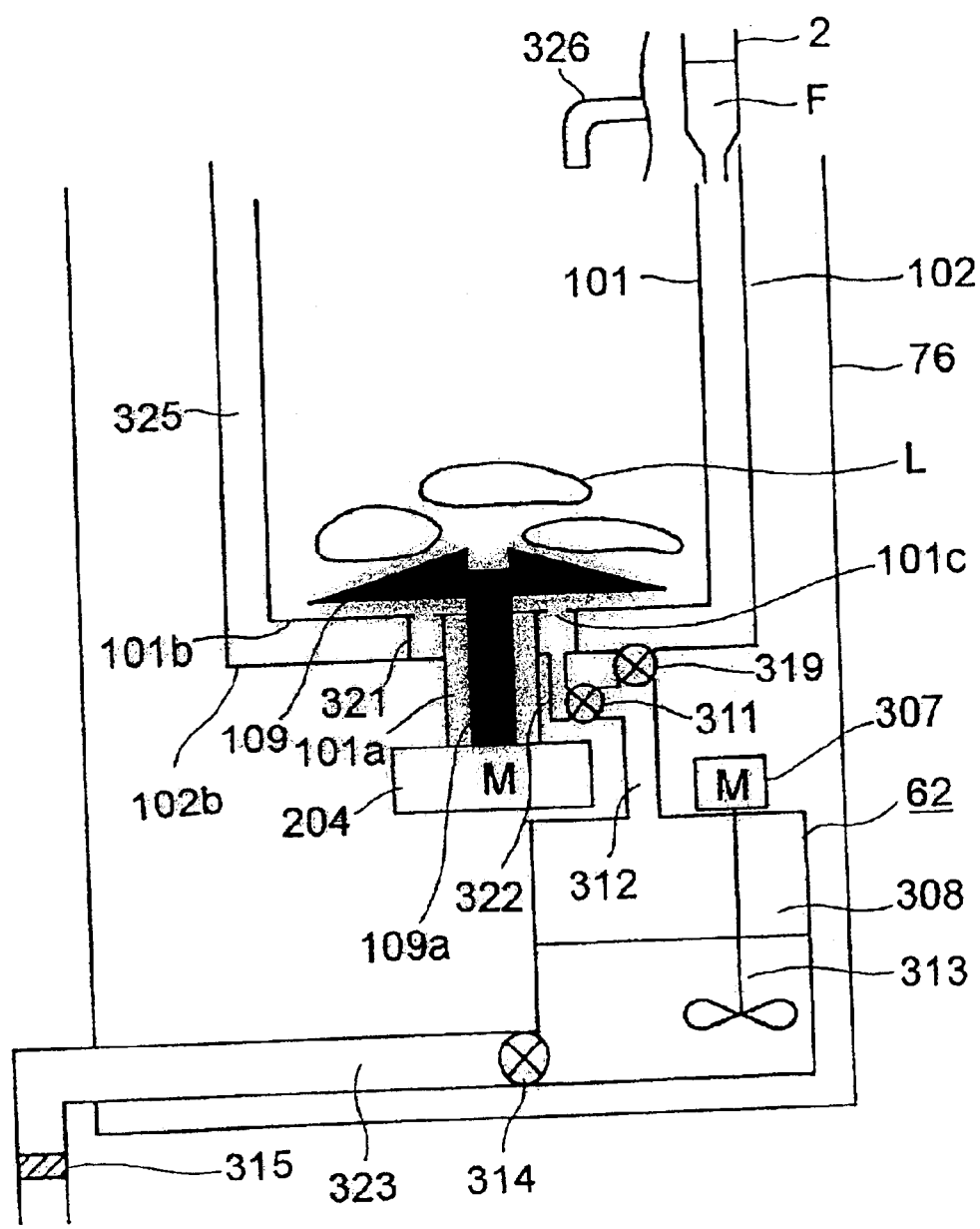
FIG. 27 is a sectional view showing the washing machine incorporating a polluted water purifier of a fifteenth embodiment of the invention.

FIG. 27 is a diagram schematically showing the structure of a washing machine incorporating the polluted water purifier of a fifteenth embodiment. Inside an outer casing, a water tub 102 is arranged, and inside the water tub 102, a washing tub 101 having the shape of a bottomed cylinder is rotatably supported. At the bottom of the washing tub 101, a pulsator 109 for producing a flow of water inside the washing tub 101 is arranged. The pulsator 109 has its pulsator shaft 109a rotatably put through the tub shaft 101a of the washing tub 101. As a clutch (not show) provided below the tub shaft 101a is switched, the pulsator 109 or the washing tub 101 is driven to rotate by a motor 204.

Substantially at the center of the bottom of the water tub 102, a drain chamber 321 is provided that communicates with the washing tub 101 through an opening 101c. In the bottom surface 102a of the water tub 102, a drain duct 312 is provided that is opened and closed by a valve 319. In the bottom surface of the drain chamber 321, a drain duct 322 is provided that is opened and closed by a valve 311 and that communicates with the drain duct 312. The drain duct 312 is coupled to a reservoir bath 308. To prevent leakage of water, seals (not shown) are applied to between the bottom plate 101b of the washing tub 101 and the pulsator shaft 109a and between the tub shaft 101a and the bottom plate 102a of the water tub 102.

The reservoir bath 308 is so structured that its contents can be agitated by an agitator 313 that is driven to rotate by an agitating motor 307. From the bottom of the reservoir bath 308 runs a drain pipe 323 that can be opened and closed by a valve 314 so as to permit the water stored in the reservoir bath 308 to be discharged out of it. On the way along the drain pipe 323, a filter 315 is detachably provided.

Above the water tub 102, a flocculant tank 2 is provided that supplies a flocculant F, from above, to the space 325 between the outer wall of the washing tub 101 and the inner wall of the water tub 102. In this way, a polluted water purifier 62 is formed that adds the flocculant to washing wastewater and flocculates the pollutants present therein in the reservoir bath 308. Moreover, a water feeder 326 is provided that feeds tap water into the washing tub 101.

In the washing machine structured as described above, when the starting of washing is requested with laundry L and detergent containing a surfactant put in the washing tub 101, washing operation starts being performed. Now, a description of washing operation will be given, interspersed with the results of measurement of the volume of washing water used and the concentration of the surfactant observed in each process.

Figure 28:
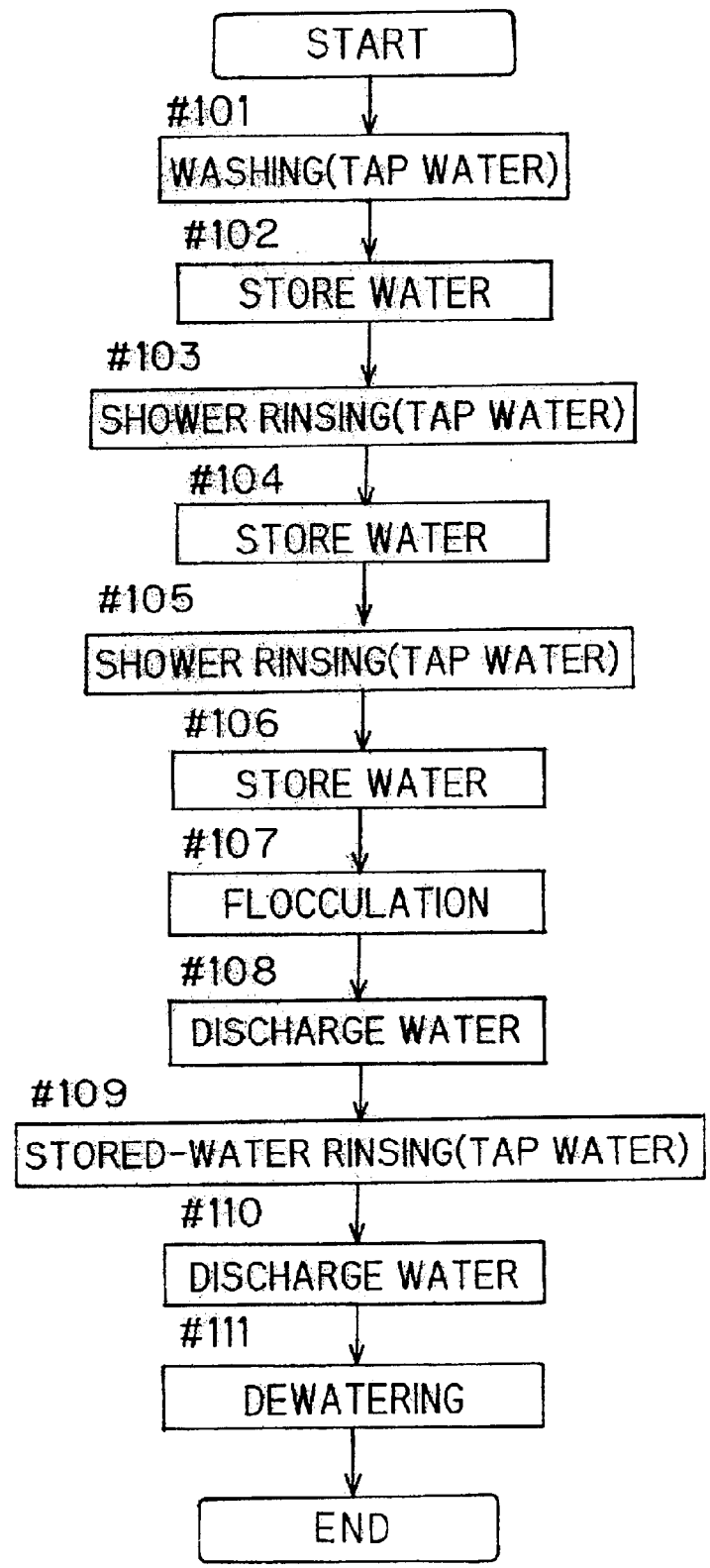
FIG. 28 is a flow chart showing the operation of the washing machine incorporating a polluted water purifier of the fifteenth embodiment of the invention.

Washing operation is performed as shown in a flow chart in FIG. 28. First, in step #101, a washing process is performed. In the washing process, the valve 311 is closed, and tap water is supplied from the water feeder 326 into the washing tub 101. If it is assumed that the laundry weighs 8 kg, 53 L of tap water is supplied into the washing tub 101. Then, the motor 204 is driven so as to rotate the pulsator 109 and thereby produce a flow of water in the washing tub so that the laundry is washed.

When a predetermined time has elapsed and the washing process is complete, then, in step #102, the valve 311 is opened, and the washing water in the washing tub 101 is drained through the drain chamber 321 and the drain ducts 322 and 312 so as to be stored in the reservoir bath 308. Here, the valve 314 is closed, and 37 L of the washing water having a surfactant concentration of 200 ppm is stored in the reservoir bath 308.

When the washing water has been drained out of the washing tub 101, then, in step #103, a shower rinsing process (first rinsing process) is performed. In the shower rinsing process, the valve 319 is closed, and, with tap water kept supplied from the water feeder 326, the washing tub 101 is rotated at a high rotation rate. Under centrifugal force, the rinsing water passes through the laundry, rises up the inner wall of the washing tub 101, and is discharged into the space 325 between the outer wall of the washing tub 101 and the inner wall of the water tub 102. In this way, the detergent present in the laundry is efficiently removed. To prevent the rinsing water from splashing upward, a guard (not shown) is provided around the upper end, i.e. the rim, of the washing tub 101.

In the space 325, 6 L of the rinsing water having a surfactant concentration of 107 ppm is stored. Then, in step #104, the valve 319 is opened, and thus the rinsing water in the space 325 is drained through the drain duct 312 so as to be stored in the reservoir bath 308. In step #105, for further removal of the detergent, shower rinsing (the first rinsing process) is performed again in the same manner as before. Then, in step #106, 6 L of the rinsing water having a surfactant concentration of 84 ppm is stored in the reservoir bath 308.

Thus, in total, 49 L of the washing and rinsing water is stored in the reservoir bath 308. Then, in step #107, the detergent and dirt components present in the water stored in the reservoir bath 308 are made to flocculate. Their flocculation is achieved by supplying 80 mL of the flocculant F from the flocculant tank 2 into the space 325. The flocculant F flows through the drain duct 312 into the reservoir bath 308, where it is agitated by the agitator 313.

As a result, the detergent and dirt components present in the stored water flocculate and form flocks, which then deposit, lowering the surfactant concentration of the stored water to 10 ppm. Then, in step #108, the valve 314 is opened, so that the stored water flows through the drain pipe 323 and the filter 315, where the flocks are filtered out, and is then drained as purified water.

As the flocculant F is used a 10% water solution of polyaluminum chloride on an aluminum oxide basis. Instead, aluminum sulfate, aluminum chloride, iron(II) sulfate, iron(III) sulfate, or the like may be used. Alternatively, using a polymer flocculant based on polyacrylamide, sodium polyacrylate, a copolymer thereof, or the like helps form large flocks. This is further preferable because large flocks are easy to filter out and help prevent clogging of the filter 315 and reduce the time required for draining.

Next, in step #109, the valve 311 is closed, tap water is supplied from the water feeder 326 into the washing tub, and the pulsator 109 is rotated so that a stored-water rinsing process (second rinsing process) is performed. When a predetermined time has elapsed and the stored-water rinsing process is complete, then, in step #110, the valves 311 and 314 are opened, so that the rinsing water in the washing tub 101 is drained through the drain ducts 322 and 312, the reservoir bath 308, and the drain pipe 323.

Thereafter, in step #111, the washing tub 101 is rotated at a high rotation rate to discharge the rinsing water from the laundry. The rinsing water discharged from the laundry either flows through the drain duct 322 into reservoir bath 308 or rises up the inner wall of the washing tub 101 and then flows from the space 325 through the drain duct 312 into the reservoir bath 309. The rinsing water is then drained through the drain pipe 323 to outside. In steps #110 and #111, the rinsing water is low in dirt and detergent content, and therefore need not be purified.

In this embodiment, the washing water and the rinsing water is stored in the reservoir bath 308, is purified therein, and is then drained. Thus, the flocks do not adhere back to the laundry. Moreover, the washing water used in the washing process and the rinsing water used in the shower rinsing process is purified simultaneously. This not only helps reduce the time required for the purification and draining of the washing water and thus the time required for washing, but also helps simply the operation of the polluted water purifier.

<Sixteenth Embodiment>

Figure 29:
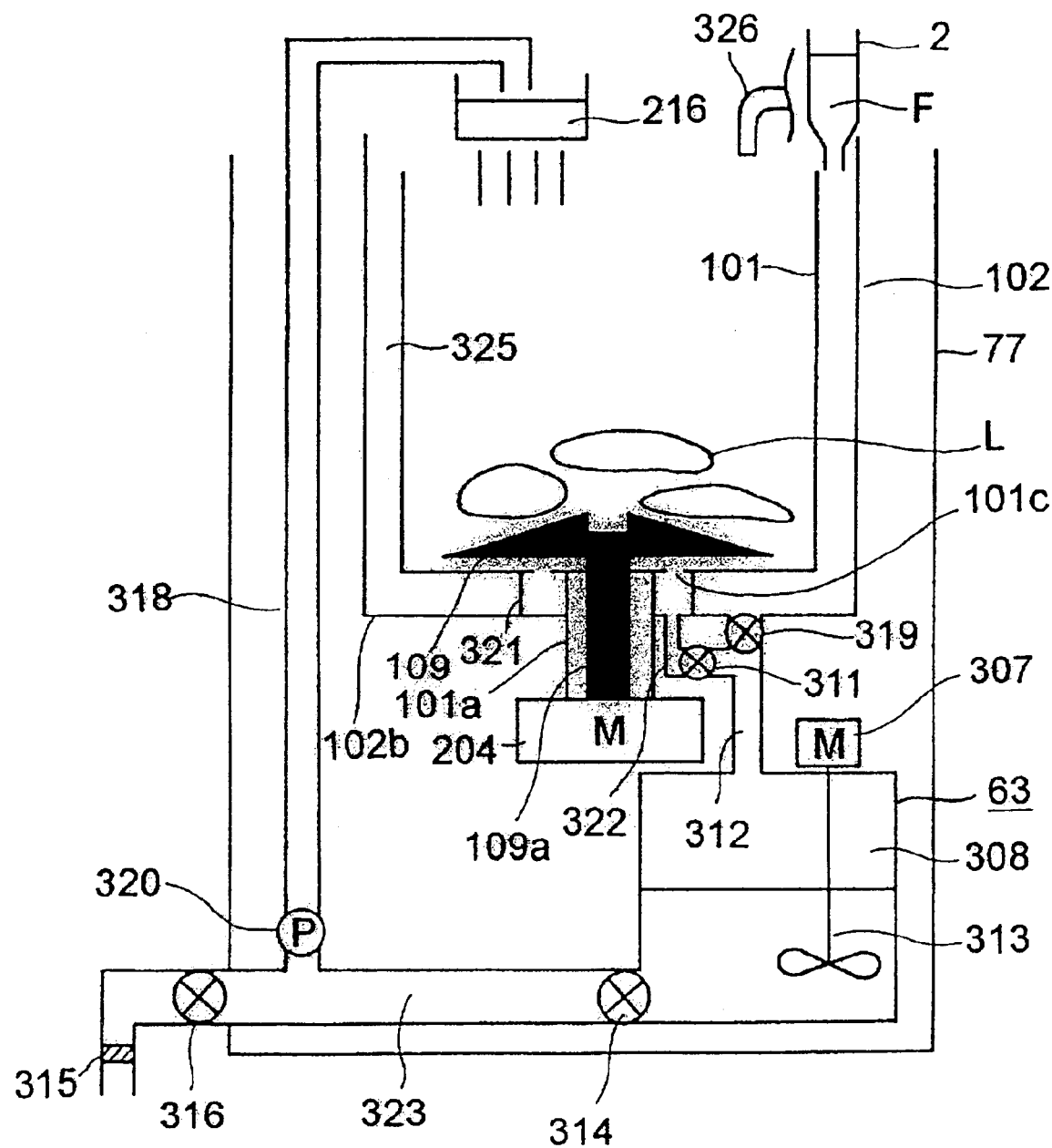
FIG. 29 is a sectional view showing the washing machine incorporating a polluted water purifier of a sixteenth embodiment of the invention.

FIG. 29 is a diagram schematically showing the structure of a washing machine incorporating the polluted water purifier of a sixteenth embodiment. For convenience' sake, such members as have their counterparts in the fifteenth embodiment shown in FIG. 27 described earlier are identified with the same reference numerals. In this embodiment, the polluted water purifier 63 has a separator 216 arranged above the washing tub 101, and to the separator 216 is connected a circulation path 318 that branches off and communicates with the drain pipe 323. Moreover, a circulation pump 320 is provided on the way along the circulation path 318, and a valve 316 is provided in the drain pipe 323 on the downstream side of the circulation path 318. In other respects, the structure here is the same as in the fifteenth embodiment.

In the washing machine structured as described above, when the starting of washing is requested with laundry L and detergent containing a surfactant put in the washing tub 101, washing operation starts being performed. Now, a description of washing operation will be given, interspersed with the results of measurement of the volume of washing water used and the concentration of the surfactant observed in each process. Washing operation is performed as shown in a flow chart in FIG. 30. Here, steps #201 to #207 are the same as steps #101 to #107 in the flow chart in FIG. 28 described above, and therefore their explanations will be omitted.

In step #208, the valves 311 and 316 are closed, the valve 314 is opened, and the circulation pump 320 is driven. As a result, the water stored in the reservoir bath 308, in which flock have formed, is supplied through the circulation path 318 to the separator 216. The separator 216 is provided with a filter formed of a net-shaped member such as a washing net, nonwoven fabric, or the like to collect the flocks. Then, purified water having a surfactant concentration of 10 ppm is fed into the washing tub 101, and the pulsator 109 is rotated so that a stored-water rinsing process (second rinsing process) is performed.

When a predetermined time has elapsed and the stored-water rinsing process is complete, then, in step #209, the valves 311, 314, and 316 are opened, so that the rinsing water in the washing tub 101 is drained. Here, the washing water has a surfactant concentration of 25 ppm, and thus can be discharged to the sewage system with little effect on the water pollution in the environment.

A dewatering process may be performed subsequently. However, here, in step #210, the washing tub 101 is rotated at a high rotation rate with tap water kept supplied from the water feeder 326 so that a shower rinsing process (third rinsing process) is performed. This lowers the surfactant concentration in the wastewater to 20 ppm; that is, it is possible to further reduce the dirt and detergent remaining in the laundry and thereby make it cleaner.

Thereafter, in step #211, a dewatering process is performed, in which the washing tub 101 is rotated at a high rotation rate so that the rinsing water contained in the laundry is discharged. The rinsing water discharged from the laundry either flows through the drain duct 322 into the reservoir bath 308 or rises up the inner wall of the washing tub 101 and then flows from the space 325 through the drain duct 312 into reservoir bath 308. The rinsing water is then discharged through the drain pipe 323 to outside.

In this embodiment, the washing water and the rinsing water is stored in the reservoir bath 308 and is then purified. This makes it possible to add only the amount of flocculant necessary to form flocks in the stored water according to the volume thereof. As a result, even when purified water is used in stored-water rinsing, only a very small amount of flocculant flows into the washing tub 101. Thus, no flocks form in the washing tub 101 during the stored-water rinsing. This prevents flocks from adhering to laundry. Moreover, the washing water used in the washing process and the rinsing water used in the shower rinsing process is purified simultaneously. This not only helps reduce the time required for the purification and draining of the washing water and thus the time required for washing, but also helps simply the operation of the polluted water purifier 63.

<Seventeenth Embodiment>

Figure 30:
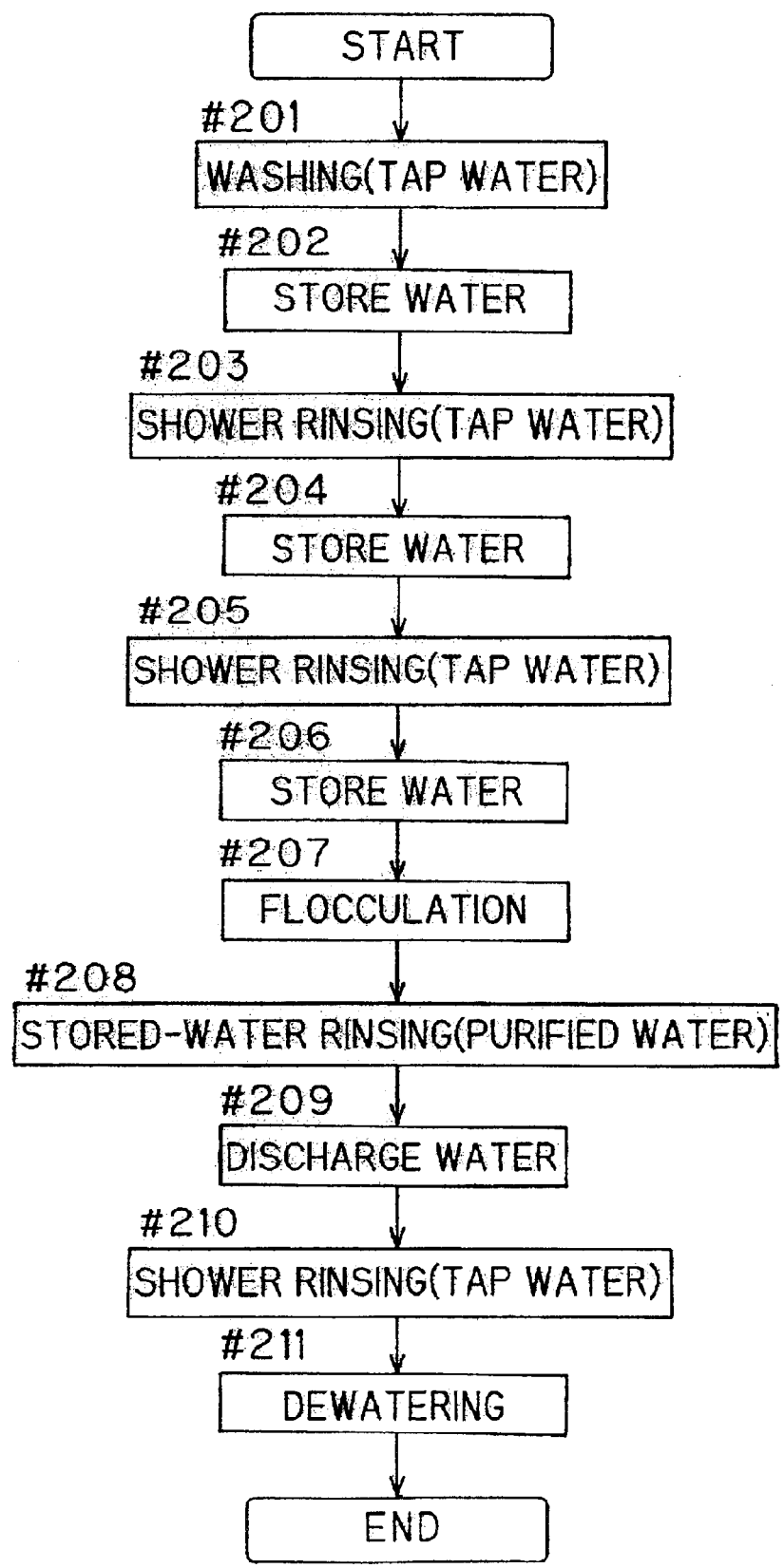
FIG. 30 is a flow chart showing the operation of the washing machine incorporating a polluted water purifier of the sixteenth embodiment of the invention.
Figure 31:
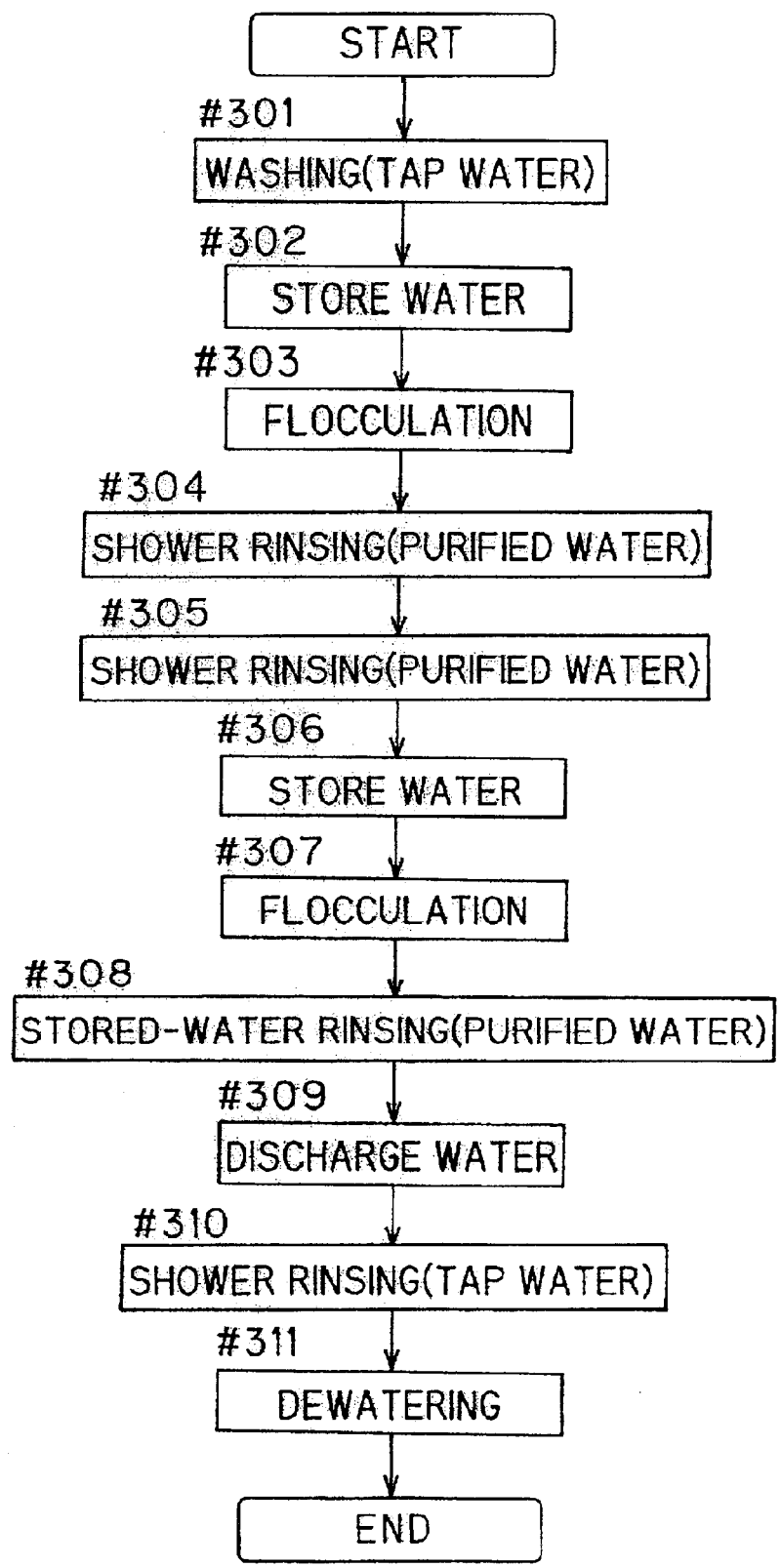
FIG. 31 is a flow chart showing the operation of the washing machine incorporating a polluted water purifier of a seventeenth embodiment of the invention.

Next, a seventeenth embodiment will be described. The structure of this embodiment is the same as that of the sixteenth embodiment shown in FIG. 29 described above. However, here, washing operation is performed as shown in a flow chart in FIG. 31. In FIG. 31, the only difference from the sixteenth embodiment shown in FIG. 30 is that the shower rinsing, prior to the stored-water rinsing, is performed by using purified water.

First, as in the sixteenth embodiment, a washing process is performed in step #301. In the washing process, the valve 311 is closed, and tap water is supplied from the water feeder 326 into the washing tub 101. If it is assumed that the laundry weighs 8 kg, 53 L of tap water is supplied into the washing tub 101. Then, the motor 204 is driven so as to rotate the pulsator 109 and thereby produce a flow of water in the washing tub so that the laundry is washed.

When a predetermined time has elapsed and the washing process is complete, then, in step #302, the valve 311 is opened, and the washing water in the washing tub 101 is drained through the drain chamber 321 and the drain ducts 322 and 312 so as to be stored in the reservoir bath 308. Here, the valve 314 is closed, and 37 L of the washing water having a surfactant concentration of 200 ppm is stored in the reservoir bath 308.

When the washing water has been drained out of the washing tub 101, then, in step #303, the detergent and dirt components present in the washing water stored in the reservoir bath 308 are made to flocculate. Their flocculation is achieved by supplying 60 mL of the flocculant F from the flocculant tank 2 into the space 325. The flocculant F flows through the drain duct 312 into the reservoir bath 308, where it is agitated by the agitator 313. As a result, the detergent and dirt components present in the stored water flocculate and form flocks, which then deposit, lowering the surfactant concentration of the stored water to 10 ppm.

Then, in step #304, a shower rinsing process (first rinsing process) is performed. In the shower rinsing process, the valve 314 is opened, the valves 311, 316, and 319 are closed, the circulation pump 320 is driven so that 6 L of the washing water stored in the reservoir bath 308 is pumped up, and then the valve 314 is closed. The washing water containing the flocks flows through the circulation path 318 into a flock separator 216, where the flocks are removed. In this way, purified water is, as rinsing water, fed into the washing tub 101.

In this state, the washing tub 101 is rotated at a high rotation rate. Thus, under centrifugal force, the rinsing water passes through the laundry, rises up the inner wall of the washing tub 101, and is discharged into the space 325 between the outer wall of the washing tub 101 and the inner wall of the water tub 102. In this way, the detergent present in the laundry is efficiently removed, and 6 L of the rinsing water having a surfactant concentration of 117 ppm is stored in the space 325 and the drain chamber 321.

In step #305, to further remove the detergent, 6 L of the washing water containing flocks is pumped up again in the same manner as before, and shower rinsing is performed again. Then, 6 L of the rinsing water having a surfactant concentration of 94 ppm is fed to the space 325 and the drain chamber 321. In step #306, the valves 311 and 319 are opened, so that 12 L of the rinsing water in the space 325 and the drain chamber 321 flows through the drain duct 312 and is stored in the reservoir bath 308.

The following steps #307 to #311 are performed in the same manner as steps #207 to #211 shown in the flow chart in FIG. 30 described earlier. Specifically, in step #307, 26 mL of the flocculant F is fed to the reservoir bath 308, where 49 L of the washing and rinsing water is stored. As a result, the detergent and dirt components present in the water stored in the reservoir bath 308 flocculate, lowering the surfactant concentration of the stored water to 10 ppm.

In step #308, the valve 314 is opened and the circulation pump 320 is driven. As a result, the water stored in the reservoir bath 308, in which flocks have formed, is fed through the circulation path 318 to the separator 216, where the flocks are collected. Then, purified water having a surfactant concentration of 10 ppm is fed into the washing tub 101, and the pulsator 109 is rotated so that a stored-water rinsing process (second rinsing process) is performed.

When a predetermined time has elapsed and the stored-water rinsing process is complete, then, in step #309, the valves 311, 314, and 316 are opened, so that the rinsing water in the washing tub 101 is drained. Here, the washing water has a surfactant concentration of 30 ppm, and thus can be discharged to the sewage system with little effect on the water pollution in the environment.

A dewatering process may be performed subsequently. However, here, in step #310, the washing tub 101 is rotated at a high rotation rate with tap water kept supplied from the water feeder 326 so that a shower rinsing process (third rinsing process) is performed. This lowers the surfactant concentration in the wastewater to 25 ppm; that is, it is possible to further reduce the dirt and detergent remaining in the laundry and thereby make it cleaner.

Thereafter, in step #311, a dewatering process is performed, in which the washing tub 101 is rotated at a high rotation rate so that the rinsing water contained in the laundry is discharged. The rinsing water discharged from the laundry either flows through the drain duct 322 into the reservoir bath 308 or rises up the inner wall of the washing tub 101 and then flows from the space 325 through the drain duct 312 into reservoir bath 308. The rinsing water is then discharged through the drain pipe 323 to outside.

In this embodiment, purified water is used also in the shower rinsing process prior to the stored-water rinsing process. This helps save tap water. Moreover, using a polymer flocculant as described earlier in addition to the flocculant F makes filtration easier, and thus helps increase the flow rate from the separator 216. In this way, it is possible to enhance the detergent removal effect of shower rinsing.

<Eighteenth Embodiment>

Figure 32:
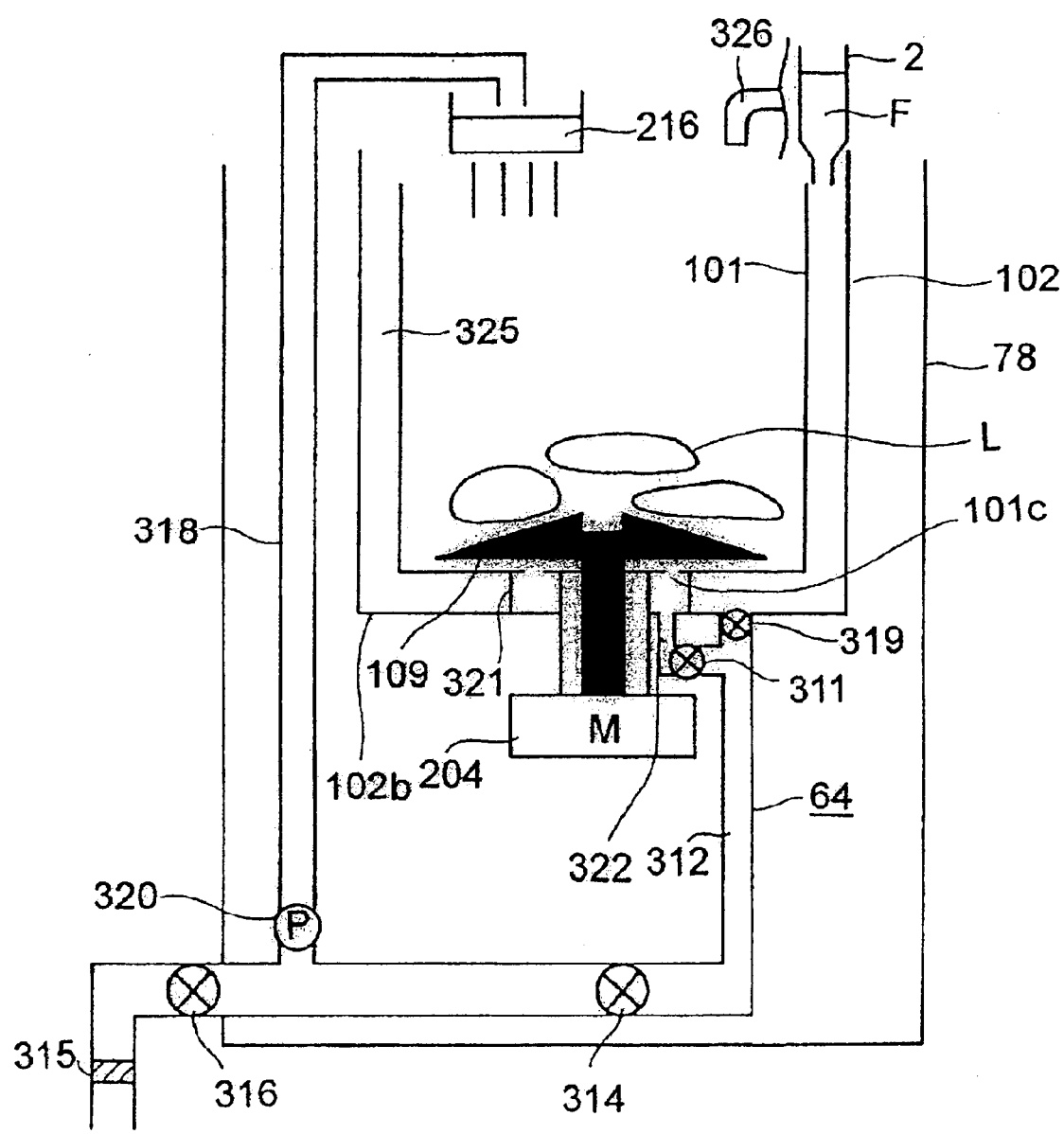
FIG. 32 is a sectional view showing the washing machine incorporating a polluted water purifier of an eighteenth embodiment of the invention.

FIG. 32 is a diagram schematically showing the structure of the washing machine of an eighteenth embodiment. Here, such members as have their counterparts in the sixteenth and seventeenth embodiments shown in FIG. 29 described above are identified with the same reference numerals. The difference from the sixteenth and seventeenth embodiments is that the reservoir bath 308, the agitating motor 307, and the agitator 313 are omitted. In other respects, the structure here is the same as in the sixteenth and seventeenth embodiments.

In this embodiment, after completion of the washing process, the valve 319 is closed and the washing tub 101 is rotated at a high rotation rate, so that the washing water in the washing tub 101 rises up the inner wall of the washing tub 101 and is discharged into the space 325. In this way, the washing water is stored in the space 325. Moreover, the rinsing water discharged into the space 325 in the shower rinsing process is also kept stored in the space 325. Then, the flocculant F is fed from the flocculant tank 2 into the space 325, and the washing tub 101 is driven to rotate, so that the water stored in the space 325 is agitated and the dirt and detergent components present therein flocculate.

In this embodiment, the space 325, which is secured to collect the rinsing water discharged from the washing tub 101 under centrifugal force in the shower rinsing and dewatering processes, is used as a reservoir bath. This eliminates the need to provide the reservoir bath 308 separately, and thus helps achieve space saving and cost saving in the washing machine.

The fifteenth to eighteenth embodiments described above deal with washing machines having a rotatable washing tub 101. However, the same effects can be achieved with washing machines having a fixed washing tub 101. In such a case, in the eighteenth embodiment, a closable opening that permits the washing tub 101 and the water tub 102 to communicate with each other is formed at the bottom of the washing tub 101 so as to permit water to be stored in the space 325.

The first to eighteenth embodiments described above deal with cases in which pollutants are made to flocculate by using a low-molecular-weight inorganic flocculant or a polymer flocculant as a flocculant. However, it is also possible to use a flocculant that is a mixture of such flocculants. Moreover, adding an acid to polluted water so as to lower the pH value thereof helps prompt flocculation/coagulation of pollutants composed of organic substances, in particular an anionic surfactant, and thereby increase the removal rate of such pollutants. This will be described in detail below.

As described earlier, aluminum chloride ($AlCl_3$) is an inorganic flocculant with a relatively low molecular weight, and therefore, whereas it effectively makes small molecules of a surfactant present in wastewater precipitate as flocks, the flocks thus produced tend to be extremely fine particles. As a result, the flocks that have precipitated are suspended in the wastewater, and therefore separating and removing them requires much time and a filter with fine pores.

By contrast, a polymer flocculant with high basicity such as polyaluminum chloride (PAC) tends to make a surfactant in a solution precipitate as large flocks. For this reason, PAC excels $AlCl_3$ in surfactant flocculation/removal performance.

PAC is an inorganic substance with a molecular weight of 600 to 1,400, and its basicity is given by the general formula (Formula 1) noted below. Here, n represents an arbitrary positive number, and m represents an arbitrary positive number fulfilling m<3n.

$$Al_n(OH)_mCl_{3n-m}$$ (Formula 1)

To an aluminum ion ($Al^{3+}$), hydroxide ions ($OH^-$) and chloride ions ($Cl^-$) are bonded. The proportion of $OH^-$ among these anions, i.e. the value of m/3n in Formula 1, is called the basicity. In water solution, PAC forms a basic polynuclear complex, called chelate, bridged by $OH^-$. Therefore, the higher the basicity, the greater the value of m in Formula 1, and thus the higher the molecular weight of the produced chelate as a whole.

Since the chelate of PAC with high basicity has a high molecular weight, it is not effective against small molecules of a surfactant dissolved in water. Thus, a large amount of PAC needs to be added, which leads to secondary pollution. Moreover, PAC exhibits poor solubility in water and poor preservation stability under cold conditions, and is therefore unsuitable for the treatment of washing wastewater in winter. With these facts in mind, the following experiments were conducted.

(1) Preparation of Source Water for Testing

The critical micelle concentration of a typical anionic surfactant is 100 to 200 mg/L, and therefore, in most cases, the concentration of an anionic surfactant present in wastewater after washing falls within the range of 150 to 400 mg/L. Hence, as source water for testing, a water solution of a household powder detergent manufactured by Kao Corp., Japan, sold under the trade name "Attack" was used; specifically, experiments were conducted with a water solution of that detergent in a standard concentration for washing (667 mg/L, of which the surfactant content was 240 mg/L).

(2) Flocculant Solution

To prepare flocculant solutions, two types of inorganic flocculant solutions shown in Table 1 manufactured by Taki Chemical Co., Ltd., Japan, sold under the trade names "Takibine #1500" and "Takibine #100" respectively, were used singly or in the form of a mixture.

As FIG. 33 shows, Takibine #1500 is a water solution of PAC with a basicity of 83, and its concentration on an aluminum oxide ($Al_2O_3$) basis is 23.2%. On the other hand, Takibine #100 has a basicity of 0; that is, it is a water solution of aluminum chloride ($AlCl_3$), and its concentration on an $Al_2O_3$ basis is 11.5%.

By mixing adequate amounts of Takibine #1500 and Takibine #100 having these characteristics, a plurality of types of flocculant solutions, each having a different composition, were prepared. Here, three sample solutions were prepared that contained PAC of Takibine #1500 and $AlCl_3$ of Takibine #100 in ratios of 6:1, 2:1, and 2:3 respectively on an $Al_2O_3$ basis. These sample solutions will be referred to as SA-1, SA-2, and SA-3 respectively.

(3) Source Water Treatment Experiments Practical Examples 1, 2, and 3>

In three tall beakers, 500 mL of the above-described source water for testing at 5° C. is put each, and the above-described flocculant solutions SA-1, SA-2, and SA-3 are respectively added little by little until 95% or more of the surfactant content present in the source water was removed by flocculation-precipitation treatment. Then, the volumes (mL/L) of the flocculant solutions SA-1, SA-2, and SA-3 added were recorded, and the total weights (mg/L) of the flocculants, on an $Al_2O_3$ basis, mixed with the source water at that time were calculated on the basis of the composition, concentration, and added volume of those flocculant solutions. These are called Practical Examples 1, 2, and 3 respectively.

Comparative Examples 1 and 2

By the same process as described above, the source water for testing was treated with Takibine #1500 and Takibine #100 used singly as flocculant solutions (referred to as RE-1 and RE-2 respectively). Then, the volumes (mL/L) of these flocculant solutions added were recorded, and the total weights (mg/L) of the flocculants, on an $Al_2O_3$ basis, mixed with the source water at that time were calculated on the basis of the composition, concentration, and added volume of those flocculant solutions. These are called Comparative Examples 1 and 2 respectively.

FIG. 34 shows the results of these experiments. In this figure, "○" denotes that, in five minutes after the start of flocculation, the supernatant liquid had a turbidity of 2 NTU or lower, and "×" denotes that it had a turbidity higher than 2 NTU.

In Comparative Example 1, in which RE-1 was used as a flocculant solution, RE-1 had to be added so that a comparatively large amount of PAC, specifically 230 mg/L on an $Al_2O_3$ basis, was mixed with the source water. Nevertheless, relatively large flocks formed and quickly precipitated in the source water at 5° C., and thus the turbidity of the supernatant liquid in the source water treated readily fell to 2 NTU or lower. Thus, by filtering the treated source water with a filter having coarse pores, it was possible to remove flocks efficiently and obtain a clear supernatant liquid.

In Comparison Example 2, in which RE-2 alone was used, adding a relatively small amount of $AlCl_3$ so that 60 mg/L of $AlCl_3$ on an $Al_2O_3$ basis was mixed with the source water resulted in removing almost all of the surfactant present in the source water at 5° C. However, the flocks produced were small, and it was difficult to separate the supernatant liquid from the precipitate. Thus, it was impossible to reduce the turbidity of the supernatant liquid in the treated source water to 2 NTU or lower.

Accordingly, in this case, the wastewater needs to be filtered with a filter having fine pores, and therefore the flocks tend to clog the filter. Once the filter is clogged, the flow rate of the wastewater passing through the filter drops significantly, leading to lower treatment efficiency. As a result, the filter needs to be regenerated by frequent cleaning and replacement, which requires much trouble and cost.

On the other hand, in Practical Examples 1 to 3, where the mixed solutions SA-1, SA-2, and SA-3 of Takibine #1500 and Takibine #100 were used, irrespective of the ratio in which they were mixed, with a smaller amount of flocculant (on an $Al_2O_3$ basis) than when the source water at 5° C. was treated with RE-1 alone, it was possible to readily reduce the turbidity of the supernatant liquid in the treated source water to 2 NTU or lower. In this case, simply by filtering the treated source water with a filter having coarse pores, it is possible to remove the flocks efficiently and obtain a clear supernatant liquid.

In this way, by mixing two types of flocculant solutions, it is possible to achieve the same wastewater treatment performance as achieved with a given amount of Takibine #1500 alone with a smaller amount of flocculant (on an $Al_2O_3$ basis). The reason is considered to be as follows.

In general, with an aluminum-based flocculant as represented by PAC, it is preferable that, after treatment, the solution have a pH value of 5.5 to 6.5. However, in cases where the wastewater is alkaline, with a pH value of 9.5 to 10.5, it is difficult to lower the pH value with high-basicity PAC alone. In general, an anionic surfactant exhibits higher cleaning power in an alkaline water solution, and therefore washing water is typically so prepared as to have a pH value of around 10.

When high-basicity PAC is used together with an inorganic flocculant, such as $AlCl_3$, that exerts a strong effect of lowering the pH value, the latter alleviates the alkalinity of the wastewater to a certain degree and thereby makes the flocculating power of PAC itself higher than when it is used singly. This is considered to be the reason for the aforementioned reduction achieved in the amount of flocculant required.

Comparative Example 3

For further comparison, instead of Takibine #1500, an inorganic polymer flocculant with a basicity of about 50, the type "PAC250 AD" manufactured by Taki Chemical Co., Ltd., Japan, was mixed with Takibine #100 in the same ratios as in the Practical Examples 1 to 3, and the above-described source water for testing was treated therewith. In these experiments, irrespective of the mixing ratio, the surfactant present in cold water at 5° C. flocculated poorly, and thus it was impossible to reduce the turbidity to 2 NTU or lower.

(4) Evaluation of the Stability of Flocculant Solutions

Separately, the stability of mixed flocculant solutions was evaluated. When Takibine #1500 and Takibine #100 were mixed in a ratio by weight of 2:1 to 2:3 on an $Al_2O_3$ basis, when the solution had a concentration of 20% on an $Al_2O_3$ basis, it became milky and exhibited significantly lower flocculating performance against the surfactant present in the source water. When they were mixed in a ratio of 4:1 to 6:1, even when the solution had a concentration of 20% on an $Al_2O_3$ basis, it did not become milky, proving that the mixture could be preserved stably in the form of a water solution.

By mixing a low-molecular-weight inorganic flocculant and an inorganic polymer flocculant, it is possible to form large flocks under cold conditions and thereby reduce the turbidity after treatment. Thereafter, for example as in the fourth embodiment (see FIG. 7), by proceeding with further flocculation with a polyacrylamide-based inorganic polymer flocculant, the flocks can be made still larger so as to be easier to remove. The flocculants described above according to the present invention can be used to treat not only washing wastewater but also polluted water containing surfactant components of any other type (such as a detergent for cleaning eating utensils or a detergent for cleaning hair).

Next, the effects of lowering the pH value of polluted water will be described. Here, it is assumed, for example, that the pollutant composed of an organic substance is a linear alkylbenzenesulfonate (hereinafter "LAS"), which is a type of anionic surfactant, that the flocculant is aluminum chloride, which is a cationic inorganic flocculant, and that the acid is hydrochloric acid. Then, they react as follows.

In wastewater, sodium alkylbenzenesulfonate usually ionizes to an anionic surfactant component (hereinafter "LAS") and $Na^+$, and is dissolved. In this state, the surfactant component cannot be removed. However, when the surfactant component forms an insoluble salt with the cation contained in the inorganic flocculant, it can be made to precipitate and flocculate and thereby removed. The reactions that take place here are represented by Formulae 2 to 4 below.

$AlCl_3 \rightarrow Al^{3+} + 3Cl^-$ (Formula 2)

$3(LAS^-Na^+) \rightarrow 3LAS^- + 3Na^+$ (Formula 3)

$3LAS^- + Al^{3+} \rightarrow (LAS)^-_3 A^{3+}$ (Formula 4)

According to Formulae 2 to 4 above, 3 moles of LAS is removed by every 1 mole of $Al^{3+}$ added. In reality, however, an excess amount of $Al^{3+}$ is added, and thus, in addition to the reactions noted above, reactions involving water also take place according to Formula 2 above and Formulae 5 and 6 below.

$H_2O \rightarrow H^+ + OH^-$ (Formula 5)

$AlCl_3 + 3H_2O \rightarrow Al(OH)_3 + 3H^+ + 3Cl^-$ (Formula 6)

The reaction represented by Formula 6 above causes much of $Al^{3+}$ added to form insoluble $Al(OH)_3$ instead of reacting with LAS. Al(OH)₃ precipitates as flocks. Formulae 2 to 6 above can be integrated into Formula 7 below, which can then be rearranged as Formula 8 below.

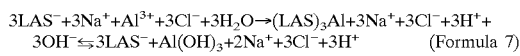

(Formula 7)

(Formula 8)

In Formula 8 above, as the concentration of OH⁻ lowers, equilibrium shifts leftward. Thus, as the pH value of the wastewater is lowered, the proportion of $Al^{3+}$ that reacts with LAS increases, and thus the removal rate of LAS increases. In practice, when the pH value of the wastewater was controlled so as to be in the range from 3 to 4, the removal rate of LAS was as high as 97.5% or higher.

In this way, it is possible to increase the removal rate of dissolved organic pollutants by controlling the pH value of polluted water. Moreover, this does not lead to an increase in the volume of the flocks formed, and thus it is possible to purify even wastewater containing a high concentration, in the order of several hundred ppm, of organic pollutants in an optimum manner.

Accordingly, for example, by feeding a predetermined acid into the mixing bath 117 of the polluted water purifier 54 of the fourth embodiment shown in FIG. 6 described earlier, it is possible to realize a polluted water purifier with high pollutant removal performance. As a flocculating/coagulating means for flocculating or coagulating pollutants, it is possible to use an electrolyzer that flocculates them by electrolysis. It is preferable, however, to use an adder that adds a flocculant to polluted water.

Pollutants include anionic surfactants and the like, for example, carboxylates such as laurates, strearates, and oleates; sulfuric ester salts such as higher alcohol sulfuric ester salts, higher alkyl ether sulfuric ester salts, sulfated fatty acid esters, and sulfated olefins; sulfonates such as alkylbenzenesulfonates, alkylnaphthalenesulfonates, and paraffinsulfonates; and phosphoric ester salts such as higher alcohol phosphoric ester salts.

As the flocculant is used a cationic inorganic flocculant. Cationic inorganic flocculants include trivalent aluminum salts, trivalent iron salts, salts containing both aluminum and iron, and divalent magnesium salt. More specifically, it is possible to use aluminum sulfate, polyaluminum chloride (PAC), iron(III) chloride, magnesium chloride, or the like.

As the acid is used hydrochloric acid, sulfuric acid, nitric acid, phosphoric acid, or an organic acid such as acetic acid or citric acid, or the like. As long as wastewater is treated appropriately, it is particularly preferable to use hydrochloric acid or the like.

The concentration of pollutants in polluted water is, preferably, 400 ppm or lower and, further preferably, in the range from 150 to 400 ppm. As long as the concentration of an anionic surfactant in polluted water is 400 ppm or lower, it is possible to flocculate or coagulate and thereby remove the anionic surfactant satisfactorily in the polluted water purifier.

When the pH value of polluted water is controlled so as to be in the range from 3 to 6, it is possible to remove pollutants very effectively. In particular, if the pH value is kept in the range from 3 to 4, it is possible to remove pollutants with a removal rate of 97% or higher. When the pH value of polluted water is higher than 6, the removal rate of pollutants becomes so low that it is impossible to remove organic pollutants satisfactorily from wastewater. On the other hand, if the pH value of polluted water is lower than 3, the volume of flocks formed reduces, but the turbidity increases. Moreover, neutralization or the like is required after the removal of pollutants, which complicates the process of purification.

The results of experiments conducted with an acid actually added to polluted water will be presented below. Wastewater (with a surfactant concentration of 240 ppm) used in washing in a washing machine is fed to the polluted water purifier 54 mentioned above, and, as an inorganic flocculant, 1.75 mL of PAC (PAC300A manufactured by Taki Chemical Co., Ltd., Japan) was added constantly to every 1 L of the polluted water. Moreover, as an acid, 0 mL, 0.25 mL, or 0.5 mL of a 35% water solution of hydrochloric acid was added to every 1 L of the polluted water. The results of measurement of the pH value of the polluted water and the removal rate of the surfactant in these experiments are shown in FIG. 35.

According to the figure, as the amount of hydrochloric acid added increases from 0, the pH value decreases, and the removal rate of the surfactant increases. When 0.5 mL/L of hydrochloric acid was added to the polluted water, the pH value was 3.6, and the removal rate of the surfactant was as high as 97.9%. When more than 0.5 mL/L of hydrochloric acid was added to the polluted water to make the pH value still lower, the volume of flocks formed reduced, but the turbidity increased.

Thus, as compared with attempting a higher removal rate by increasing the amount of PAC added, adding an adequate amount of hydrochloric acid helps reduce the amount of PAC used and thereby reduce the cost of the chemical used. Moreover, whereas much of $Al^{3+}$ present as a cation in PAC precipitates as flocks, and therefore, as more PAC is added, the volume of flocks formed increases, the hydroxide of $H^+$ present as a cation in hydrochloric acid is $H_2O$, and therefore, addition of hydrochloric acid does not invite an increase in the volume of flocks formed.

It is to be understood that the present invention may be practiced in any other manner than specifically described above as embodiments, and various modifications are possible within the scope of the invention. For example, although the embodiments deal with cases in which washing wastewater is used as polluted water, it is also possible to achieve the same effects with wastewater from a household cleaning system such as a dish washer. Moreover, the present invention may be applied to purification treatment of cleaning wastewater discharged from a cleaning system such as those installed in food and cleaning factories.

Industrial Applicability

As described above, according to the present invention, a wastewater treatment agent is produced by mixing a flocculant composed of a low-molecular-weight substance, such as aluminum chloride, and a flocculant composed of a high-molecular-weight substance, such as polyaluminum chloride. This makes it possible to make pollutants such as a surfactant present in polluted water precipitate as large flocks so that the pollutants can be removed easily. Moreover, it is also possible to reduce the amount of flocculant needed to flocculate and remove a surfactant. Thereafter, by proceeding with further flocculation with an organic polymer flocculant, it is possible to make the flocks larger and thereby make their removal easier.

When polyaluminum chloride and aluminum chloride are mixed in a ratio by weight of 4:1 to 6:1 on an aluminum oxide basis, satisfactory flocculating performance is obtained even in cold wastewater, and the water solution of the wastewater treatment agent exhibits improved preservation stability.

According to the present invention, a polluted water purifier, or a washing machine, is provided with: a mixer for mixing the polluted water with the flocculant and air; an agitator for agitating the polluted water, containing the flocculant and the air, that flows into a cylindrical agitation chamber along the inner surface thereof by making the polluted water into a spiraling stream so that the flocks formed by the flocculant hold bubbles; and a separator, connected to the agitator, for temporarily storing the polluted water and for separating the flocks holding the bubbles. This makes it possible to form large flocks containing air. Moreover, since the flocks are temporarily stored in a reservoir section, it is possible to prevent the flocks that have grown larger from being crushed into fine particles by a jet. Thus, it is easy to separate the flocks in the separator.

According to the present invention, in a polluted water purifier, or a washing machine, a mixing cylinder having a spiral fin is provided in an agitation chamber. This makes it easy for flocks flowing down inside the mixing cylinder to hold bubbles.

According to the present invention, in a polluted water purifier, or a washing machine, a separator and an agitation chamber are provided integrally, and therefore there is no need to provide piping to couple them together. This makes the polluted water purifier as a whole compact and suitable to be incorporated in a household washing machine or the like to achieve space saving. Thus, it is possible to purify a large volume of water efficiently and discharge purified water.

According to the present invention, in a polluted water purifier, or a washing machine, a polluted water tank, a first mixer, a second mixer, an agitator, and a separator are coupled in this order to form a circulation path that leads back to the polluted water tank. This makes it possible to flocculate pollutants such as a surfactant in polluted water as large flocks without making the polluted water purifier so large as it has conventionally been. Moreover, according to the present invention, in the first mixer, pollutants such as a surfactant in polluted water are formed into primary flocks by being mixed with a flocculant, and then, in the second mixer, they are formed into secondary flocks holding bubbles by being mixed with a flocculant and air. This makes it possible to collect the flocks with a filter having coarse pores and thereby lower the concentration of the pollutants quickly.

According to the present invention, a polluted water purifier, or a washing machine, or a polluted water purification method, is provided with a pH value controller for lowering the pH value of polluted water by adding an acid thereto. This helps increase the removal rate, through flocculation and coagulation, of pollutants composed of organic substances, in particular an anionic surfactant. This, when incorporated in a household washing machine or in an industrial cleaning system, helps reduce the burden on the environment, and makes it possible to purify the wastewater from a cleaning system at low running cost.

According to the present invention, a polluted water purifier, or a washing machine, is provided with: an aspirator for sucking in a flocculant and air to mix the flocculant and the air with polluted water and thereby produce flocks holding bubbles; and a separator for separating the flocks holding the bubbles from the polluted water. Thus, by mixing a flocculant and air with domestic wastewater such as washing wastewater containing pollutants such as a surfactant drained from a household, it is possible to flocculate the pollutants and form flocks therefrom within the drainage path. Moreover, it is possible to obtain flocks that tend to float up and that have large diameters, and therefore it is easy to remove the flocks and drain purified water.

According to the present invention, in a washing machine, a separator for filtering out flocks is detachably fitted to a water tub. Thus, the vibration of the water tub is transmitted to the separator, and therefore the flocks collected in the separator are vibrated. This makes it easy to dewater and dry the flocks. In this way, it is possible to dispose of the flocks easily without separating them from water at the time of disposal. This enhances the usability of the washing machine.

According to the present invention, in a washing machine, a separator for filtering out flocks is fitted so as to cover a water tub from above the opening thereof, or at this opening. This makes it possible to collect flocks over a large area. This helps prevent clogging in the separator and reduce the frequency of the troublesome disposal of the flocks. Moreover, this permits the flocks to move freely on the separator and thus prompts the drying of the flocks.

According to the present invention, in a washing machine, a tub cover and a separator are formed as a single member. This helps reduce the number of components.

According to the present invention, in a washing machine, a separator is fitted to a lid. This eliminates the need to attach and detach the separator every time washing is performed, and thus enhances the usability of the washing machine.

According to the present invention, in a washing machine, a recess is formed substantially at the center of a separator. This permits flocks to be collected in the recess by the vibration transmitted to the separator, and thus makes the disposal of the flocks easy. Moreover, the flow of air that is produced as a result of a washing tub rotating at a high rate during a dewatering process makes contact with the separator. This prompts the drying of the flocks. Moreover, making the separator protrude into the washing tub makes it easy to bring the flow of air into contact with the flocks.

According to the present invention, in a washing machine, the operation of the washing machine is controlled on the basis of the results of detection of the presence of a separator by a separator presence detector for detecting the presence of the separator. This prevents the flocks collected by the polluted water purifier form flowing back into a washing tub.

According to the present invention, a washing machine is provided with a flock detector for detecting the volume of the flocks collected and an alerting means. This permits the user to recognize easily the time to dispose of the flocks, and thereby prevents clogging in a separator.

According to the present invention, in a washing machine, midway through a washing process, washing water is circulated so that it flows from a washing tub through a polluted water purifier and then back to the washing tub. This eliminates the need for a purifying means with so large a capacity as to receive all the water in the water tub enclosing the washing tub. Thus, it is possible to incorporate a polluted water purifier in a washing machine without making the outer frame of the washing machine unduly large.

Moreover, here, the water that has passed through the polluted water purifier immediately starts being used in rinsing as opposed to a batch treatment method in which purification is started after all the water has been fed in a polluted water purifier and rinsing is started after all the water has been purified. This saves time. Moreover, from midway through a washing process, purified water is introduced so that rinsing is performed continuously. This prevents laundry from sticking fast to the inner wall of the washing tub as in ordinary shower dewatering, and thus eliminates the trouble required to peel the laundry off Moreover, by using all the purified water in rinsing, it is possible to perform rinsing with ample water.

According to the present invention, in a washing machine, a washing tub and an outer tub enclosing it are so structured that water can move from the water tub to the outer tub but not in the opposite direction, and the water that has flown into the space between the water tub and the outer sub is purified by a polluted water purifier and is then fed back to the washing tub. Thus, it is possible to use the space between the washing tub and the outer tub as a reservoir for the water that is going to be purified and thereby continuously feed the polluted water purifier with the amount of water that suits the purification performance thereof per unit time. Moreover, the water that has removed dirt and detergent components from laundry never return to the washing tub and make the laundry dirty again.

According to the present invention, a washing machine is provided with a holeless-type washing tub so that, as the washing tub is rotated, the water inside rises up the inner wall thereof and is discharged over the rim thereof This makes it easy to realize a structure in which water moves from the washing tub to an outer tub but not in the opposite direction. Moreover, the water, as it so moves, does not damage laundry.

According to the present invention, by controlling the rotation of a holeless-type washing tub, the volume of water discharged out of the washing tub is controlled. This makes it possible to move a controlled volume of water to an outer tub without using a water feeding means such as a combination of a pump and a valve.

According to the present invention, in a washing machine, as water is circulated, a washing tub is rotated in the forward direction, is then brought to a sudden rest, is then rotated in the reverse direction, is then brought to a sudden rest, and this is repeated. This makes it possible to produce a dynamic flow of water inside the washing tub and thereby enhance the efficiency of rinsing.

According to the present invention, in a washing machine, the water that has flown into the space between a washing tub and an outer tub is agitated by the rotating washing tub. This permits uniform distribution of the detergent and dirt components present in the water fed to a polluted water purifier, and thus makes stable purification possible.

According to the present invention, in a washing machine, the water that is fed back into a washing tub is poured substantially onto a central portion of the washing tub. This permits the rinsing water to pass through laundry evenly, and thus makes even rinsing possible.

According to the present invention, in a washing machine, after water stops being circulated, finish rinsing is performed with tap water. This makes it possible to eliminate the residue of detergent and dirt components from a washing tub.

According to the present invention, a washing machine is provided with a polluted water purifier that is of the type that collects pollutants by flocculating them with a flocculant. This prevents the pollutants from being discharged to the environment, and thus helps realize an environment-friendly washing machine.

According to the present invention, in a washing machine, washing water is stored in a reservoir, is then purified therein, and is then discharged. Thus, no flocks form in a washing tub, and thus no flocks adhere back to laundry. Moreover, washing water used in a washing process and rinsing water used in a rinsing process is purified simultaneously. This helps reduce the time required to purify and drain washing water, and thus the time required for washing, and in addition helps simplify the operation of a polluted water purifier.

According to the present invention, in a washing machine, the amount of flocculant that corresponds to the volume of the water stored is added to a reservoir and is agitated so that the flocculant is used to flocculate the dirt and detergent components present in the reservoir. Thus, even if the flocculant flows into a washing tub when purified water is used in a first or second rinsing process, the amount of such flocculant is small. Thus, no flocks form in the washing tub, and no flocks adhere back to laundry. Moreover, by using purified water in a first or second rinsing process, it is possible to save water.

According to the present invention, in a washing machine, a polymer flocculant is added to a reservoir to achieve further flocculation in washing water and thereby form larger flocks. This makes the filtering of the flocks easier, and thus helps prevent clogging of a filter and reduce the time required for draining. Moreover, it is possible to increase the flow rate of rinsing water when it is filtered. This enhances the detergent removal effect of shower rinsing.

According to the present invention, in a washing machine, a third rinsing process is performed with tap water. This helps further remove dirt and detergent components from laundry and make the laundry cleaner.

According to the present invention, in a washing machine, the washing or rinsing water that is discharged out of a washing tub when it is rotated at a high rotation rate is stored in the gap between the washing water and an outer tub. This eliminates the need to provide a reservoir separately, and thus helps achieve space saving and cost saving.

What is claimed is:

1. A washing machine incorporating a purifier for collecting a pollutant present in polluted water by flocculating the pollutant with a flocculant, comprising:

an aspirator for sucking in the flocculant and air to mix the flocculant and the air with the polluted water and thereby produce flocks holding bubbles;

a separator for separating the flocks holding the bubbles from the polluted water; and further comprising a motor for driving a washing tub or a pulsator arranged inside a washing tub to rotate, and the separator has a cylindrical filter that is driven by the motor to rotate, the filter collecting the flocks from the polluted water flowing into the filter by centrifugal force and then discharging the polluted water cleared of the flocks through a peripheral surface of the filter.

2. A washing machine incorporating a purifier, comprising a water tub having a shape of a bottomed cylinder, a polluted water purifier that collects a pollutant present in washing wastewater by flocculating the pollutant to produce flocks and a separator for separating the flocks by filtering the flocks out, wherein the separator is fitted detachably to the water tub.

3. A washing machine incorporating a purifier as claimed in claim 2, wherein the separator is fitted at an opening of the water tub.

4. A washing machine incorporating a purifier as claimed in claim 3, wherein the separator is formed out of a same member as a tub cover for preventing washing water from splashing over a rim of the water tub.

5. A washing machine incorporating a purifier as claimed in claim 3, wherein a recess is formed substantially at a center of the separator.

6. A washing machine incorporating a purifier as claimed in claim 2, wherein a rotatable washing tub is provided inside the water tub, and a flow of air produced as the washing tub is rotated is kept in contact with the separator.

7. A washing machine incorporating a purifier as claimed in claim 6, wherein the separator is so formed as to protrude into the washing tub.

8. A washing machine incorporating a purifier as claimed in claim 2, wherein an attachment detector for detecting attachment of the separator is provided so that operation of the washing machine is controlled according to a result of detection by the attachment detector.

9. A washing machine incorporating a purifier as claimed in claim 2, further comprising:
a flock detector for detecting an amount of the flocks collected in the separator; and
alerting means for giving an alert according to a result of detection by the flock detector.

10. A washing machine incorporating a purifier, comprising a water tub having a shape of a bottomed cylinder and a polluted water purifier that collects a pollutant present in washing wastewater by flocculating the pollutant to produce flocks and a separator for separating the flocks by filtering the flocks out,
wherein the separator is fitted detachably so as to cover the water tub from above an opening thereof.

11. A washing machine incorporating a purifier as claimed in claim 10, wherein a door is provided above the opening of the water tub, and the separator can be fitted to the door.

12. A washing machine incorporating a purifier comprising a polluted water purifier for purifying polluted water drained from a washing tub by removing a pollutant present in the polluted water, including means to circulate washing water halfway through a washing process from the washing tub through the polluted water purifier back to the washing tub, and
wherein an outer tub is provided so as to enclose the washing tub, and the washing water flows from inside the washing tub to a space between the washing tub and the outer tub so as to be purified by the polluted water purifier, with the washing water prevented from flowing from the space between the washing tub and the outer tub back into the washing tub.

13. A washing machine incorporating a purifier as claimed in claim 12, wherein the washing tub has increasing internal diameters toward an open end thereof.

14. A washing machine incorporating a purifier as claimed in claim 13, wherein an amount of washing water discharged from the washing tub is varied by controlling rotation of the washing tub.

15. A washing machine incorporating a purifier as claimed in claim 14, wherein, while the washing water is circulated, the washing tub repeats a cycle of forward rotation, sudden stop, reverse rotation, and sudden stop.

16. A washing machine incorporating a purifier as claimed in claim 12, wherein the washing water that has flowed into the space between the washing tub and the outer tub is agitated by the washing tub as the washing tub is rotated.

17. A washing machine incorporating a purifier as claimed in claim 12, wherein the washing water that returns to the washing tub is poured substantially onto a central portion of the washing tub.

18. A washing machine incorporating a purifier as claimed in claim 12, wherein, after the washing water stops being circulated, final rinsing is performed with tap water.

19. A washing machine incorporating a purifier as claimed in claim 12, wherein the polluted water purifier flocculates the pollutant with a flocculant to produce flocks and then collects the flocks.

20. A washing machine incorporating a purifier and provided with a washing process for removing dirt on laundry with washing water containing a detergent and a first rinsing process for removing the detergent from the laundry, comprising:
a reservoir section for storing washing water drained from said washing machine; and
a polluted water purifier for purifying the washing water by collecting a pollutant present in the washing water stored in the reservoir section by flocculating the pollutant,
wherein the washing water used in the washing process and rinsing water used in the first rinsing process is stored together in the reservoir section and is purified simultaneously by the polluted water purifier.

21. A washing machine incorporating a purifier as claimed in claim 20, wherein the polluted water purifier first flocculates the pollutant with an inorganic flocculant and then flocculates again the flocculated pollutant by adding a polymer flocculant thereto.

22. A washing machine incorporating a purifier as claimed in claim 20, wherein a second rinsing process for performing rinsing with purified water obtained from the polluted water purifier is further provided.

23. A washing machine incorporating a purifier as claimed in claim 22, wherein a third rinsing process for performing, after the second rinsing process, rinsing with tap water is further provided.

24. A washing machine incorporating a purifier as claimed in claim 20, further comprising:
a washing tub that is rotatably supported and in which the laundry is placed; and
an outer tub enclosing the washing tub,
wherein a space between the washing tub and the outer tub constitutes the reservoir section.

25. A washing machine incorporating a purifier and provided with a washing process for removing dirt on laundry with washing water containing a detergent and a first rinsing process for removing the detergent from the laundry, comprising:
a reservoir section for storing washing water drained from said washing machine; and
a polluted water purifier for purifying the washing water by collecting a pollutant present in the washing water stored in the reservoir section by flocculating the pollutant,
wherein the washing water used in the washing process is purified by the polluted water purifier and is then used in the first rinsing process, and then rising water used in the first rinsing process is purified by the polluted water purifier.

26. A washing machine incorporating a purifier as claimed in claim 25, wherein the rinsing water used in the first rinsing process and the washing water used in the washing process and then purified is stored together in the reservoir section and is purified simultaneously by the polluted water purifier.

27. A washing machine incorporating a purifier, comprising a polluted water purifier for collecting a pollutant present in polluted water by flocculating the pollutant with a flocculant, wherein the polluted water purifier comprises:

a mixer for mixing the polluted water with the flocculant and air;

an agitator for agitating the polluted water, containing the flocculant and the air, that flows into a cylindrical agitation chamber along an inner surface thereof by making the polluted water into a spiraling stream so that flocks formed by the flocculant hold bubbles; and a separator, connected to the agitator, for temporarily storing the polluted water and for separating the flocks holding the bubbles.

28. A washing machine incorporating a purifier as claimed in claim 27, wherein the mixer has an aspirator for sucking in the flocculant and the air under a reduced pressure.

29. A washing machine incorporating a purifier as claimed in claim 27, wherein the agitation chamber is arranged upright and has a cylindrical mixing cylinder provided inside, and the polluted water, containing the flocculant and the air, first flows up as the spiraling stream along the inner surface of the agitation chamber and then flows down inside the mixing cylinder.

30. A washing machine incorporating a purifier as claimed in claim 29, wherein the mixing cylinder has a spiral fin composed of a plurality of serially coupled substantially rectangular plate-shaped members each having opposite sides thereof twisted at a predetermined angle.

31. A washing machine incorporating a purifier as claimed in claim 29, wherein the separator is formed integrally with and fitted detachably to the agitation chamber.

32. A washing machine incorporating a purifier as claimed in claim 27, wherein the separator has a reservoir section for temporarily storing the polluted water and discharging the polluted water from a topmost section thereof and a filter section for filtering out the flocks contained in the polluted water that has flowed out of the reservoir section.

33. A washing machine incorporating a purifier as claimed in claim 33, wherein the reservoir section is arranged inside the filter section.

34. A washing machine incorporating a purifier as claimed in claim 33, wherein the filter section collects the flocks with a collecting member composed of a washing net.

35. A washing machine incorporating a purifier as claimed in claim 27, wherein a member arranged in a path of the polluted water has an inner wall thereof treated with non-cohesion treatment.

36. A washing machine incorporating a purifier, comprising a polluted water purifier for collecting a pollutant present in polluted water by flocculating the pollutant with a flocculant, wherein the polluted water purifier comprises:

a polluted water tank for storing the polluted water;

a first mixer for mixing the polluted water with a primary flocculant to produce primary flocks, a second mixer for mixing the polluted water containing the primary flocks with a secondary flocculant and air to produce secondary flocks;

an agitator for agitating the polluted water containing the flocculant and the air so as to make the secondary flocks grow larger, and a separator for separating the secondary flocks thus grown, wherein the polluted water tank, the first mixer, the second mixer, the agitator, and the separator are coupled in this order to form a circulation path that leads back to the polluted water tank.

37. A washing machine incorporating a purifier as claimed in claim 36, wherein the first mixer has an aspirator for sucking in the flocculant, a first adder for adding the flocculant in a predetermined amount, and a first agitating chamber, cylindrical in shape, for agitating the polluted water containing the flocculant by making the polluted water into a spiraling stream.

38. A washing machine incorporating a purifier as claimed in claim 37, wherein the first adder controls the amount in which the flocculant is added according to concentration, turbidity, or a pH value of the polluted water.

39. A washing machine incorporating a purifier as claimed in claim 36, wherein the second mixer has an aspirator for sucking in the flocculant to mix the flocculant with the polluted water containing the flocks, a second adder for adding the flocculant in a predetermined amount, and a sucker for sucking in the air.

40. A washing machine incorporating a purifier as claimed in claim 39, wherein the second adder controls the amount in which the flocculant is added according to concentration, turbidity, or a pH value of the polluted water.

41. A washing machine incorporating a purifier as claimed in claim 36, wherein the agitator is provided with a second agitation chamber cylindrical in shape and arranged upright and a mixing cylinder cylindrical in shape and arranged inside the second agitation chamber, and the polluted water, containing the flocculant and the air, first flows up as a spiraling stream along an inner surface of the second agitation chamber and then flows down inside the mixing cylinder.

42. A washing machine incorporating a purifier as claimed in claim 41, wherein the mixing cylinder has a spiral fin composed of a plurality of serially coupled substantially rectangular plate-shaped members each having opposite sides thereof twisted at a predetermined angle.

43. A washing machine incorporating a purifier as claimed in claim 42, wherein the separator has a reservoir section for storing the polluted water and a bag-shaped net, arranged inside the reservoir section, for collecting the secondary flocks as the secondary flocks float on the polluted water.

* * * * *